US012809694B1

(12) United States Patent
Hoffman et al.

(10) Patent No.: US 12,809,694 B1
(45) Date of Patent: Nov. 24, 2026

(54) SEMAPHORE UPDATING

(71) Applicant: NVIDIA Corporation, Santa Clara, CA (US)

(72) Inventors: Houston Thompson Hoffman, San Jose, CA (US); Raphael Dominique Pierre Boissel, Santa Clara, CA (US); David Anthony Fontaine, Mountain View, CA (US); Jakub Bujak, Warsaw (PL)

(73) Assignee: NVIDIA Corporation, Santa Clara, CA (US)

( * ) Notice: Subject to any disclaimer, the term of this patent is extended or adjusted under 35 U.S.C. 154(b) by 63 days.

(21) Appl. No.: 18/781,912

(22) Filed: Jul. 23, 2024

(51) Int. Cl.
*G06F 9/52* (2006.01)

(52) U.S. Cl.
CPC .................................... *G06F 9/526* (2013.01)

(58) Field of Classification Search
CPC ...................................................... G06F 9/526
USPC .......................................................... 710/200
See application file for complete search history.

(56) References Cited

U.S. PATENT DOCUMENTS

2005/0155034 A1* 7/2005 Jiang .......................... G06F 9/52 712/E9.032
2012/0047092 A1* 2/2012 Morris ............... G06Q 30/0283 705/400
2012/0047512 A1* 2/2012 Morris .................. G06F 9/5027 709/206
2019/0138373 A1* 5/2019 Nicol .................... G06F 9/5038
2019/0171497 A1* 6/2019 Agarwal ............... G06F 9/4887

OTHER PUBLICATIONS

IEEE "IEEE Standard for Floating-Point Arithmetic", Microprocessor Standards Committee of the IEEE Computer Society, IEEE Std 754-2008, dated Jun. 12, 2008, 70 pages.

* cited by examiner

*Primary Examiner* — Christopher B Shin
(74) *Attorney, Agent, or Firm* — Davis Wright Tremaine LLP

(57) ABSTRACT

Apparatuses, systems, and techniques to cause one or more first threads performed by a processor to update one or more semaphores accessible to one or more second threads performed by one or more second processors, wherein the one or more semaphores are stored in memory of the one or more second processors. In at least one embodiment, the one or more second threads depend on the one or more first threads.

20 Claims, 45 Drawing Sheets

SEMAPHORE UPDATING

FIELD

At least one embodiment pertains to techniques for parallel computing. For example, at least one embodiment pertains to processors or computing systems used to perform a dependent thread.

BACKGROUND

Parallel computing programs, when scheduling tasks, may cause one or more tasks of a software graph to depend from one or more other tasks. Tasks are performed according to a category of dependency between tasks.

DETAILED DESCRIPTION

In the following description, numerous specific details are set forth to provide a more thorough understanding of at least one embodiment. However, it will be apparent to one skilled in the art that the inventive concepts may be practiced without one or more of these specific details.

Figure 1:
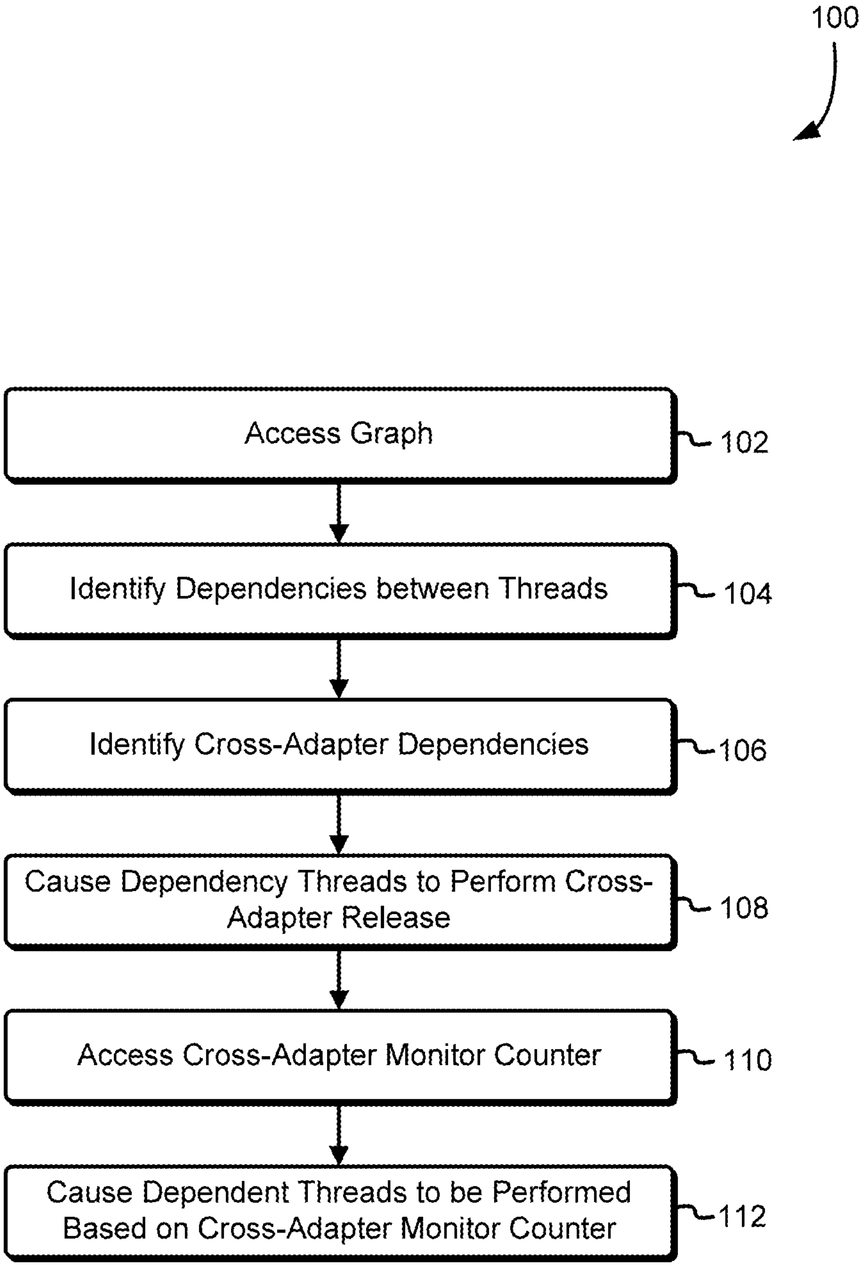
FIG. 1 is an example flowchart illustrating a process to identify dependencies between threads, in accordance with at least one embodiment.
Figure 3:
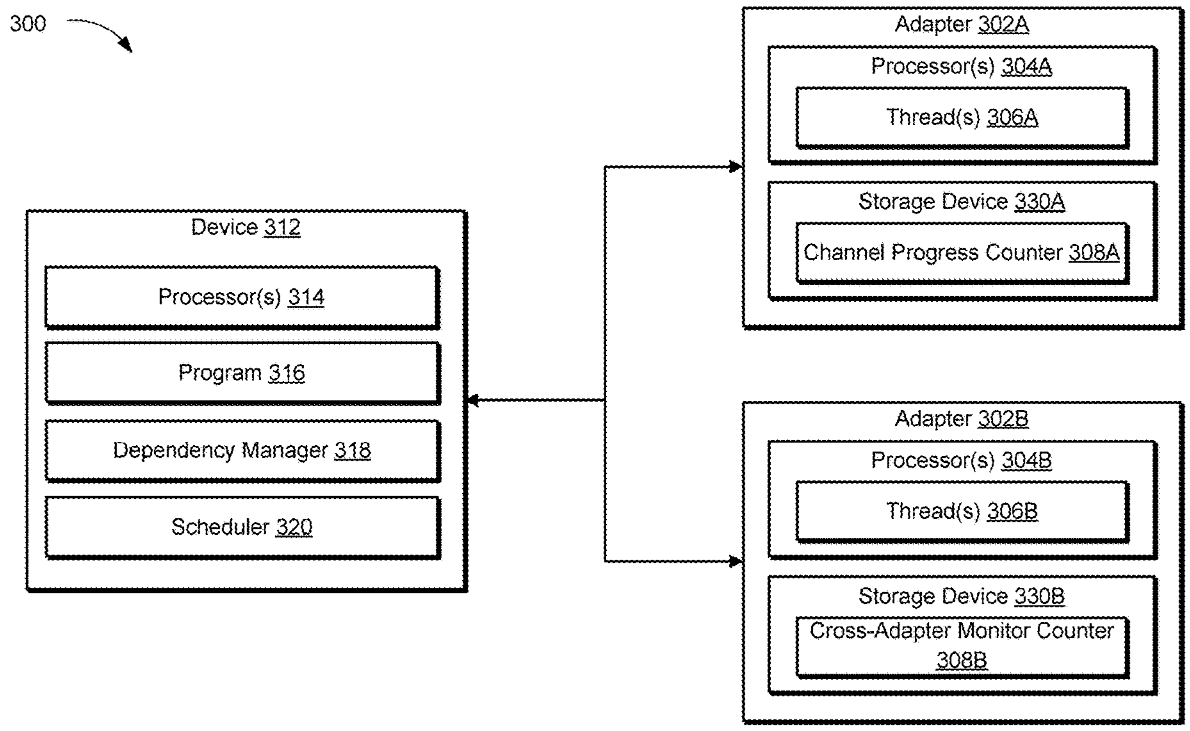
FIG. 3 illustrates an exemplary adapter system, in accordance with at least one embodiment.

FIG. 1 is an example flowchart illustrating a process 100 to identify dependencies between threads, in accordance with at least one embodiment. In at least one embodiment, process 100 may be performed by a system. in at least one embodiment, for example, an adapter system (e.g., as shown in FIG. 3) may perform process 100. In at least one embodiment, although this disclosure describes process 100 comprising a plurality of steps in a specific configuration, this disclosure contemplates process 100 comprising any number of steps in various configurations. In at least one embodiment, while process 100 discuses steps corresponding to one or more elements, such as a thread, process 100 contemplates steps corresponding to one or more other elements, such as one or more of a node, primitives, functions, user instructions, micro-operations, kernels, graph code, and/or any suitable actions.

In at least one embodiment, process 100 starts at step 102, where a system may access a graph. In at least one embodiment, for example, a system may access a CUDA graph. In at least one embodiment, a graph comprises a plurality of nodes and a plurality of edges, where one node of a plurality of nodes may be connected to another node of said plurality of nodes through an edge of said plurality of edges. In at least one embodiment, a graph represents operations to be performed by one or more graphics processing units ("GPUs"), or other parallel processing units ("PPUs"). In at least one embodiment, a graph represent one or more operations to be performed that include one or more of a kernel operation, a CPU function call, a memory copy operation, a memory set operation, an event operation, a semaphore operation, and/or an embedded child graph operation. In at least one embodiment, a graph comprises nodes that represent operations to be performed by one or more GPUs, and edges that represent dependencies between these operations. In at least one embodiment, a graph comprises nodes that represent instructions to be performed by one or more GPUs, and edges that represent dependencies between these instructions. In at least one embodiment, a graph comprises nodes that represent one or more of primitives, functions, user instructions, micro-operations, kernels, threads, graph code, and/or any suitable actions. In at least one embodiment, these dependencies correspond to data flow between operations, such as output from one operation that is provided to another operation. In at least one embodiment, dependencies between nodes of a graph represent a manner in which operations corresponding to these nodes are to be performed. In at least one embodiment, a graph is stored in a computer memory as a data structure that comprises representations of its nodes and edges. In at least one embodiment, a graph is created as described in FIG. 5. In at least one embodiment, a graph is stored after being created to later be accessed by a system. In at least one embodiment, for example, a graph is stored in memory to be accessed by a system.

In at least one embodiment, after step 102, process 100 may continue to step 104, where a system may identify dependencies between threads. In at least one embodiment, a system may identify dependencies between threads using a graph accessed in step 102. In at least one embodiment, a system may analyze a graph to identify edges between nodes that indicate a dependency between those nodes. In at least one embodiment, a system may record dependencies identified in a graph. In at least one embodiment, a system may identify dependencies of nodes on a plurality of adapters. In at least one embodiment, for example, a system may identify dependencies of nodes on a plurality of GPUs or PPUs.

In at least one embodiment, after step 104, process 100 may continue to step 106, where a system may identify cross-adapter dependencies. In at least one embodiment, a system may identify which dependencies of a plurality of dependencies between nodes of a graph are cross-adapter dependencies. In at least one embodiment, for example, a system may identify edges between nodes that are between two different adapters to identify one or more cross-adapter dependencies. In at least one embodiment, a cross-adapter dependency comprises a dependency between two different adapters. In at least one embodiment, for example, a cross-adapter dependency comprises a dependency between two different GPUs, PPUs, or the like.

In at least one embodiment, after step 106, process 100 may continue to step 108, where a system may cause dependency threads to perform a cross-adapter release. In at least one embodiment, dependency threads comprise threads that another thread depends on to be performed. In at least one embodiment, for example, a dependency thread needs to complete an operation prior to a thread dependent on dependency thread can be performed. In at least one embodiment, a system may set or mark one or more threads to perform a cross-adapter release. In at least one embodiment, for example, a system may set or mark a thread on one adapter to perform a cross-adapter release to a different adapter. In at least one embodiment, to perform a cross-adapter release comprises to update a semaphore that is accessible by a dependent thread that depends on a dependency thread. In at least one embodiment, for example, a dependent thread on one GPU may update a semaphore value on another GPU when completing work, an operation, or the like. In at least one embodiment, an adapter may store a semaphore on another adapter. In at least one embodiment, for example, a GPU may store a semaphore on another GPU using direct memory access (DMA) that allows one GPU to read from and write to memory locations on other GPUs. In at least one embodiment, a system may identify one or more adapters that comprise dependent threads that depend on a dependency thread of one adapter. In at least one embodiment, after completion of work, a GPU may perform a cross-adapter release to each of one or more GPUs that comprise a dependent thread that depend on a dependency thread.

In at least one embodiment, after step 108, process 100 may continue to step 110, where a system may access a cross-adapter monitor counter. In at least one embodiment, while process 100 includes step 110 after step 108, step 110 may be performed separately in a different process than process 100. In at least one embodiment, an adapter may be configured to access a cross-adapter monitor counter. In at least one embodiment, one or more threads on one adapter may be configured to access a cross-adapter monitor counter when a system causes dependency threads on another adapter to perform a cross-adapter release to one adapter. In at least one embodiment, for example, a dependent thread on one GPU may access a cross-adapter monitor counter that comprises a semaphore value that corresponds to dependency thread on another GPU. In at least one embodiment, a cross-adapter monitor counter may comprise a semaphore value that indicates work of a dependency thread has been completed such that a dependent thread can perform work. In at least one embodiment, for example, a dependent thread may be dependent on work from a dependency thread and a semaphore value of a cross-adapter monitor counter may notify a dependent thread that work has been completed by dependency thread.

In at least one embodiment, after step 110, process 100 may continue to step 112, where a system may cause dependent threads to be performed based on a cross-adapter monitor counter. In at least one embodiment, after a dependent thread on one GPU accesses a cross-adapter monitor counter and determines that a dependency thread has completed work, a dependent thread may perform work. In at least one embodiment, a semaphore value stored in a cross-adapter monitor counter indicates a dependent thread can perform work.

Figure 2:
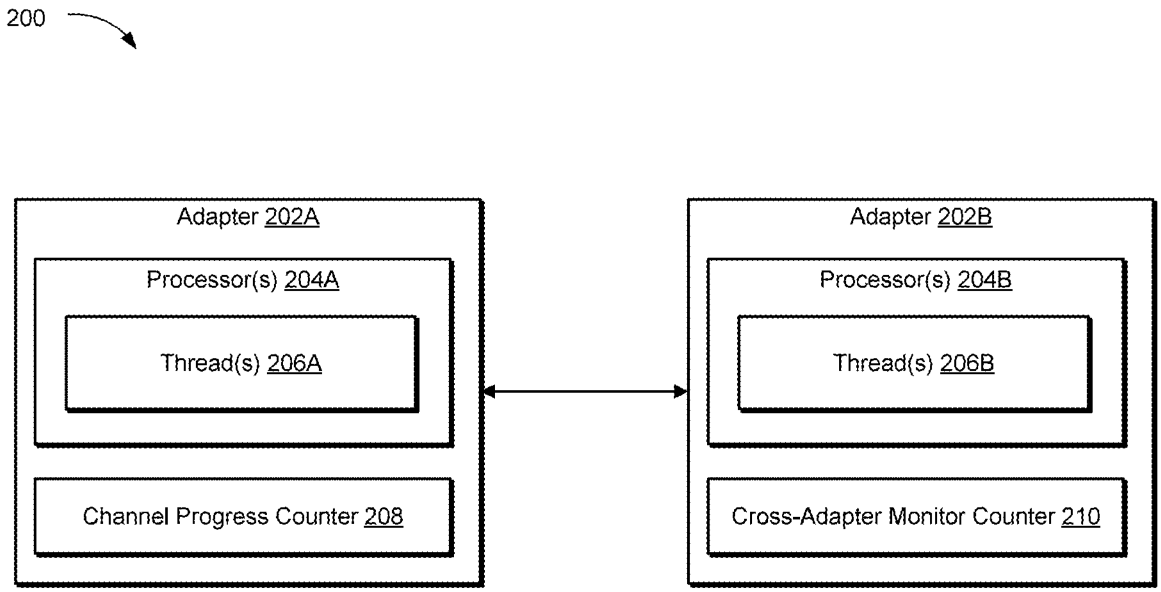
FIG. 2 is an example environment illustrating two adapters, in accordance with at least one embodiment.

FIG. 2 is an example environment 200 illustrating two adapters, in accordance with at least one embodiment. In at least one embodiment, although this disclosure describes an example environment 200 as comprising a number of adapters 202, environment 200 may comprise any number of adapters 202. In at least one embodiment, one or more components of environment 200 are to cause one or more first threads performed by one or more processors to update one or more semaphores accessible to one or more second threads performed by one or more second processors, based, at least in part, on one or more dependencies between said one or more first threads and said one or more second threads. In at least one embodiment, one or more processors of environment 200 are to cause one or more first threads performed by one or more processors to update one or more semaphores accessible to one or more second threads performed by one or more second processors, based, at least in part, on one or more dependencies between said one or more first threads and said one or more second threads.

In at least one embodiment, environment 200 comprises an adapter 202A and/or an adapter 202B. In particular embodiments, adapters 202A, 202B are communicatively coupled. In at least one embodiment, for example, adapters 202A, 202B are coupled in such a way to enable each adapters 202A, 202B to read from and write to memory of both adapters 202A, 202B. In at least one embodiment, adapter 202A comprises a processor(s) 204A and/or a channel progress counter 208. In at least one embodiment, processor(s) 204A comprises thread(s) 206A. In at least one embodiment, adapter 202B comprises processor(s) 204B and/or a cross-adapter monitor counter 210. In at least one embodiment, processor(s) 204B comprises thread(s) 206B. In at least one embodiment, adapter 202A can comprise a plurality of processor(s) 204A, which each comprise one or more respective thread(s) 206A. In at least one embodiment, adapter 202B can comprise a plurality of processor(s) 204B, which each comprise one or more respective thread(s) 206B. In at least one embodiment, adapter 202A and components of adapter 202A may have access to a memory of adapter 202B. In at least one embodiment, adapter 202B and components of adapter 202B may have access to a memory of adapter 202A. In at least one embodiment, adapter 202A and components of adapter 202A may not have access to a memory of adapter 202B. In at least one embodiment, adapter 202B and components of adapter 202B may not have access to a memory of adapter 202A. In at least one embodiment, adapter 202A and adapter 202B may each have a separate memory that may be accessible to both adapters 202A and adapter 202B and components of adapter 202A and components of adapter 202B. In at least one embodiment, adapter 202A and adapter 202B may each have a separate memory that is not accessible to both adapters 202A and components of adapter 202A and adapter 202B and components of adapter 202A, but only accessible to the respective adapters 202A, 202B and their components. In at least one embodiment, adapter 202A and components of adapter 202A may have access to cross-adapter monitor counter 210. In at least one embodiment, adapter 202B and components of adapter 202B may have access to a cross-adapter monitor counter (not shown) on adapter 202A.

In at least one embodiment, a graph may indicate that thread(s) 206B of adapter(s) 202B depends on thread(s) 206A of adapter 202A. In at least one embodiment, for example, a graph may comprise an edge between thread(s) 206A and thread(s) 206B, where edge indicates thread(s) 206B depends on thread(s) 206A. In at least one embodiment, one or more dependencies of thread(s) 206A, 206B are based at least in part on a graph. In at least one embodiment, a system may cause adapter 202A to perform a cross-adapter release to adapter 202B. In at least one embodiment, for example, a system may cause adapter 202A to update cross-adapter monitor counter 210 in response to completion of work by thread(s) 206A. In at least one embodiment, for example, a system may set or mark thread(s) 206A to perform a cross-adapter release to cross-adapter monitor counter 210 after completion of work based on a dependency of thread(s) 206B on thread(s) 206A. In at least one embodiment, thread(s) 206A may release an update to a semaphore value in both a channel progress counter 208 and a cross-adapter monitor counter 210 after completion of work. In at least one embodiment, another thread(s) 206A may access a semaphore value in channel progress counter 208 to determine whether a thread(s) 206A has completed work. In at least one embodiment, thread(s) 206B may access a semaphore value in cross-adapter monitor counter 210 to determine whether a thread(s) 206A has completed work. In at least one embodiment, thread(s) 206B may perform work based at least in part on one or more dependencies between thread(s) 206B and thread(s) 206A. In at least one embodiment, for example, thread(s) 206A may check whether a semaphore value has changed in channel progress counter 208 to determine whether another thread(s) 206A has completed work. In at least one embodiment, for example, thread(s) 206B may check whether a semaphore value has changed in cross-adapter monitor counter 210 to determine whether thread(s) 206A has completed work. In at least one embodiment, once thread(s) 206B determines a change in semaphore value in cross-adapter monitor counter 210 that indicates thread(s) 206A has completed work, thread(s) 206B may perform work.

In at least one embodiment, although adapter 202A is illustrated as having specific components, adapter 202A may comprise one or more other components. In at least one embodiment, for example, adapter 202A may comprise a cross-adapter monitor counter where one or more thread(s) 206A may access cross-adapter monitor counter to determine whether one or more thread(s) 206B have completed work.

In at least one embodiment, although adapter 202B is illustrated as having specific components, adapter 202B may comprise one or more other components. In at least one embodiment, for example, adapter 202B may comprise a channel progress counter where one or more thread(s) 206B may access channel progress counter to determine whether one or more thread(s) have completed work.

FIG. 3 illustrates an exemplary adapter system 300, in accordance with at least one embodiment. In at least one embodiment, adapter system 300 comprises adapter 302A, adapter 302B, and a device 312. In at least one embodiment, adapter 302A comprises processor(s) 304A and storage device 330A. In at least one embodiment, processor(s) 304A comprises thread(s) 306A. In at least one embodiment, storage device 330A comprises a channel progress counter 308A. In at least one embodiment, adapter 302B comprises processor(s) 304B and storage device 330B. In at least one embodiment, processor(s) 304B comprises thread(s) 306B. In at least one embodiment, storage device 330B comprises cross-adapter monitor counter 308B. In at least one embodiment, device 312 comprises processor(s) 314, program 316, dependency manager 318, and scheduler 320. In at least one embodiment, adapter 302A and components of adapter 302A may have access to a memory or storage device 330B of adapter 302B. In at least one embodiment, adapter 302B and components of adapter 302B may have access to a memory or storage device 330A of adapter 302A. In at least one embodiment, adapter 302A and components of adapter 302A may not have access to a memory or storage device 330B of adapter 302B. In at least one embodiment, adapter 302B and components of adapter 302B may not have access to a memory or storage device 330A of adapter 302A. In at least one embodiment, adapter 302A and adapter 302B may each have a separate memory and separate storage devices 330A, 330B that may be accessible to both adapters 302A and components of adapter 302A and adapter 302B and components of adapter 302B. In at least one embodiment, adapter 302A and adapter 302B may each have a separate memory and separate storage devices 330A, 330B that is not accessible to both adapters 302A and components of adapter 302A and adapter 302B and components of adapter 302B, but only accessible to the respective adapters 302A, 302B and their components. In at least one embodiment, one or more components of adapter system 300 are to cause one or more first threads performed by one or more processors to update one or more semaphores accessible to one or more second threads performed by one or more second processors, based, at least in part, on one or more dependencies between said one or more first threads and said one or more second threads. In at least one embodiment, one or more processors of adapter system 300 are to cause one or more first threads performed by one or more processors to update one or more semaphores accessible to one or more second threads performed by one or more second processors, based, at least in part, on one or more dependencies between said one or more first threads and said one or more second threads.

Figure 7:
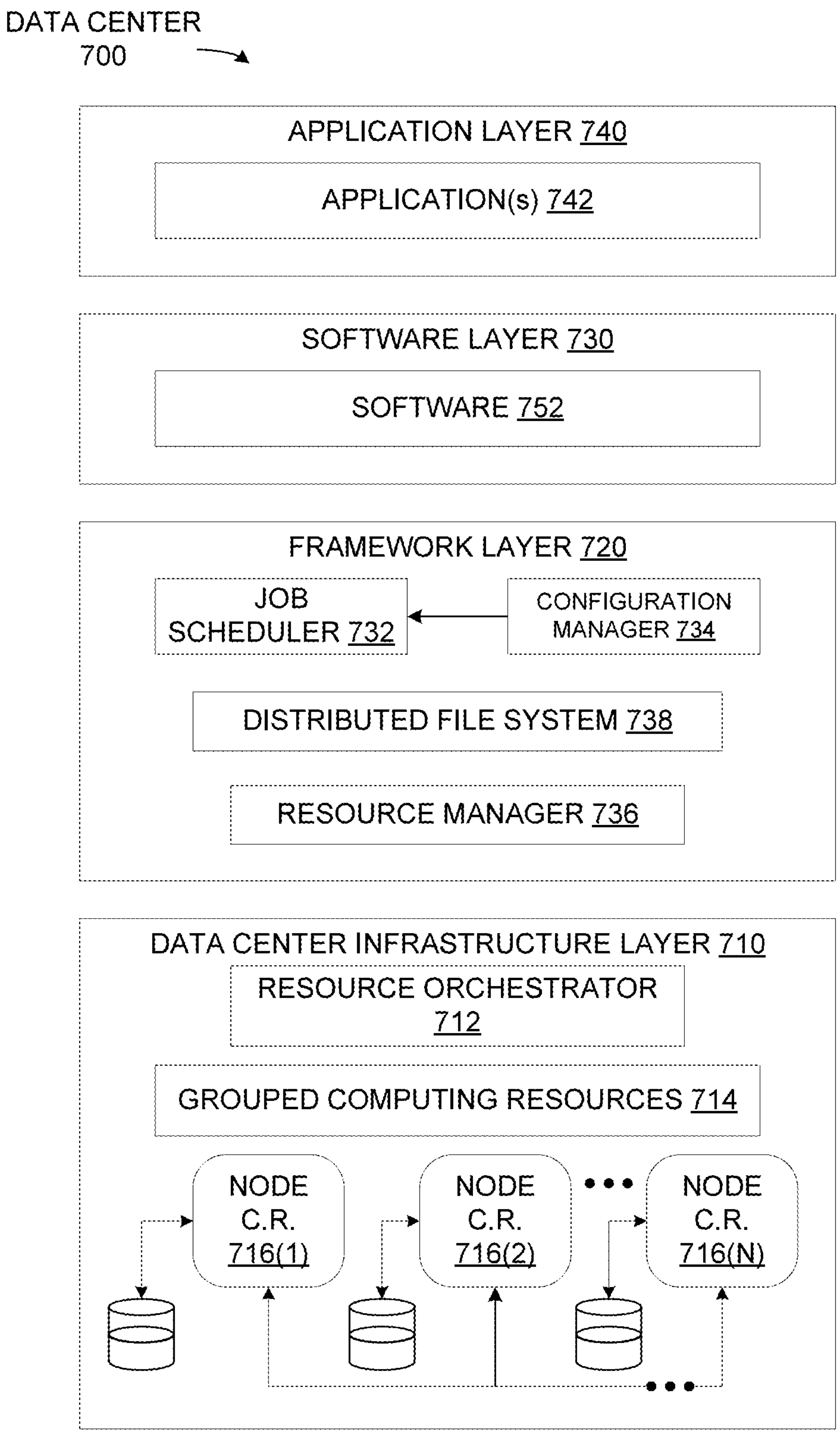
FIG. 7 illustrates an exemplary data center, in accordance with at least one embodiment.

In at least one embodiment, device 312 may use processor(s) 314 to execute program 316. In at least one embodiment, program 316 uses stream capture or graph creation APIs to define a graph in a multi-threaded environment as shown in FIG. 7. In at least one embodiment, processor(s) 314 may access a graph defined by program 316 to identify one or more dependencies between nodes. In at least one embodiment, for example, processor(s) 314 may access a graph defined by program 316 to identify one or more edges between nodes that indicate a node depends on another node. In at least one embodiment, dependency manager 318 may record one or more dependencies between nodes of a graph. In at least one embodiment, scheduler 320 may schedule work for adapter 302A and adapter 302B based on one or more dependencies indicated by dependency manager 318. In at least one embodiment, scheduler 320 may schedule work on thread(s) 306A of adapter 302A and schedule work that depends on completion of work of thread(s) 306A on thread(s) 306B of adapter 302B. In at least one embodiment, dependency manager 318 may set or mark thread(s) 306A that have a dependent thread (e.g., thread(s) 306B) to perform a cross-adapter release to a respective adapter 302B of dependent thread (e.g., thread(s) 306B). In at least one embodiment, when work is completed on thread(s) 306A, thread(s) 306A sends an update to change a semaphore value in channel progress counter 308A and cross-adapter monitor counter 308B. In at least one embodiment, processor(s) 304A may update cross-adapter monitor counter 308B by using DMA to write an updated semaphore value to cross-adapter monitor counter 308B. In at least one embodiment, thread(s) 306B that depends on thread(s) 306A may access cross-adapter monitor counter 308B to determine thread(s) 306A has completed work by detecting a semaphore value stored in cross-adapter monitor counter 308B has changed. In at least one embodiment, thread(s) 306B may update a semaphore value once work has been completed. In at least one embodiment, for example, thread(s) 306B may update a channel progress counter (not shown) of adapter 302B by changing a semaphore value stored in channel progress counter to indicate thread(s) 306B has completed work. In at least one embodiment, results of completed work from thread(s) 306A and thread(s) 306B may be used to execute program 316.

Figure 4:
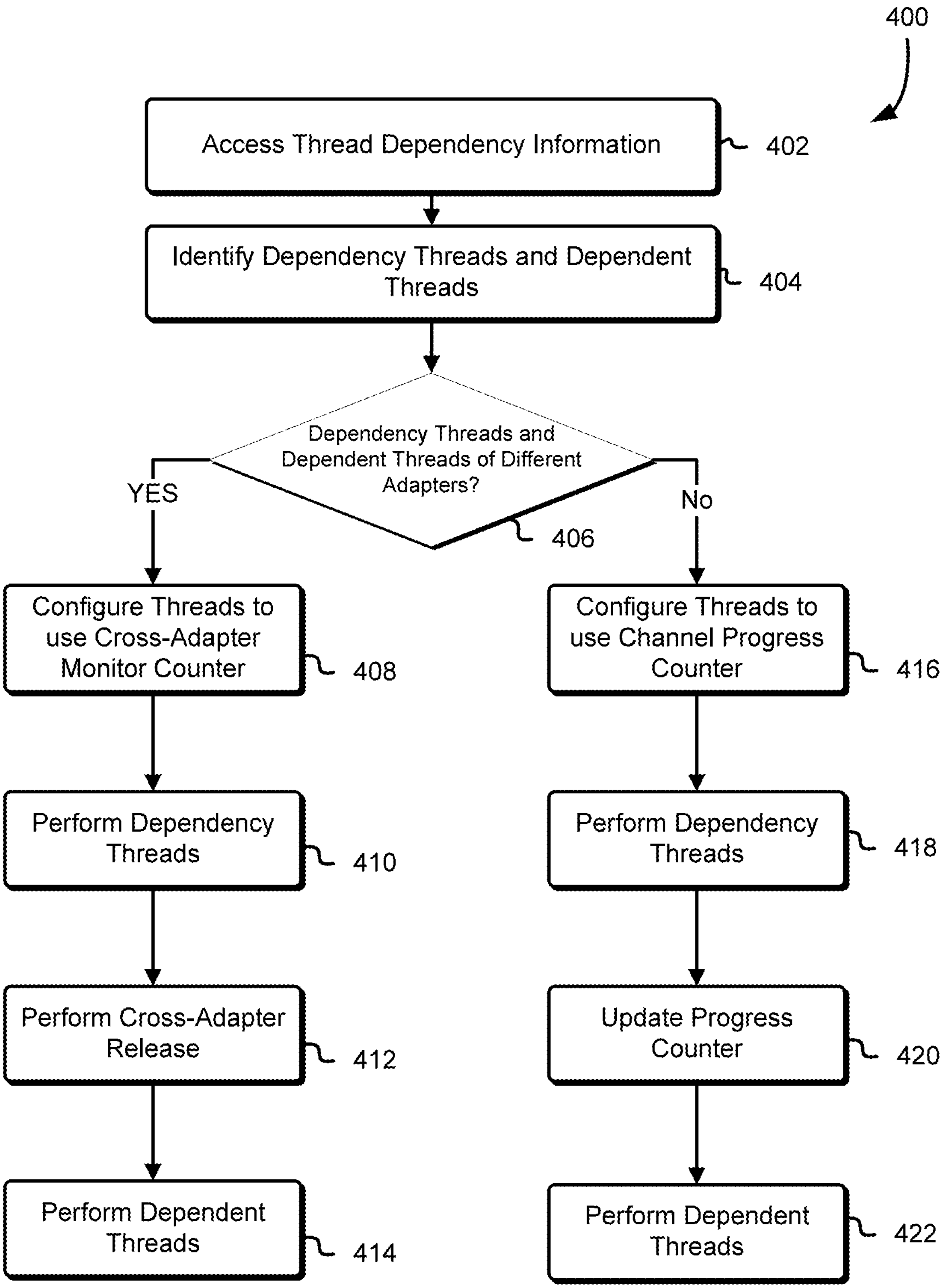
FIG. 4 is an example flowchart illustrating a process to perform dependent threads, in accordance with at least one embodiment.

FIG. 4 is an example flowchart illustrating a process 400 to perform dependent threads, in accordance with at least one embodiment. In at least one embodiment, process 400 may be performed by a system. In at least one embodiment, for example, an adapter system (as shown in FIG. 3) may perform process 400. In at least one embodiment, although this disclosure describes process 400 comprising a plurality of steps in a specific configuration, this disclosure contemplates process 400 comprising any number of steps in various configurations. In at least one embodiment, while process 400 discuses steps corresponding to one or more elements, such as a thread, process 400 contemplates steps corresponding to one or more other elements, such as one or more of a node, primitives, functions, user instructions, micro-operations, kernels, graph code, and/or any suitable actions.

In at least one embodiment, process 400 may start with step 402, where a system may access thread dependency information. In at least one embodiment, for example, a system may access a graph that comprises a plurality of edges and a plurality of nodes. In at least one embodiment, each of a plurality of edges may indicate a dependency between nodes connected by a respective edge. In at least one embodiment, a system may store thread dependency information identified by a graph. In at least one embodiment, for example, a dependency manager of a device may store thread dependency information.

In at least one embodiment, after step 402, process 400 may continue to step 404 where a system may identify dependency threads and dependent threads. In at least one embodiment, for example, a system may use thread dependency information to identify one or more threads that depend on another thread. In at least one embodiment, a dependency thread may comprise a thread that another thread depends on. In at least one embodiment, a dependent thread comprises a thread that depends on another thread.

In at least one embodiment, after step 404, process 400 may continue to step 406 where a system may determine whether dependency threads and dependent threads are of different adapters. In at least one embodiment, for example, a system may determine whether a dependent thread resides in a first adapter and a dependency thread resides in a second adapter. In at least one embodiment, if a system determines a dependency thread and dependent thread are of different adapters, process 400 may continue to step 408 where a system may configure threads to use a cross-adapter monitor counter. In at least one embodiment, for example, a system may configure a dependent thread to use a cross-adapter monitor counter to check whether work of a dependency thread has been completed. In at least one embodiment, for example, a system may set or mark a dependent thread to use a cross-adapter monitor counter to check whether work of a dependency thread has been completed.

In at least one embodiment, after step 408, process 400 may continue to step 410, where a system may perform one or more dependency threads. In at least one embodiment, for example, one or more dependency threads may complete work.

In at least one embodiment, after step 410, process 400 may continue to step 412, where a system may perform a cross-adapter release. In at least one embodiment, for example, a processor of a dependency thread may perform a cross-adapter release to another adapter that comprises a dependent thread that is dependent on completion of work from dependency thread. In at least one embodiment, a processor of a dependency thread may use DMA to write an updated semaphore value in a cross-adapter monitor counter in another adapter, such that dependent threads may access a stored semaphore value in cross-adapter monitor counter to determine work of a dependency thread has been completed.

In at least one embodiment, after step 412, process 400 may continue to step 414, where a system may perform one or more dependent threads. In at least one embodiment, for example, a system may perform one or more dependent threads on a first adapter that depend on dependency thread on a second adapter.

In at least one embodiment, if a system determines a dependency thread and dependent thread are of a same adapter, process 400 may continue to step 416 where a system may configure threads to use a channel progress counter. In at least one embodiment, for example, a system may configure a dependent thread to use a channel progress counter to check whether work of a dependency thread has been completed. In at least one embodiment, for example, a system may set or mark a dependent thread to use a channel progress counter to check whether work of a dependency thread has been completed. In at least one embodiment, a system may default to set or mark a dependent thread to use a channel progress counter to check whether work of a dependency thread has been completed.

In at least one embodiment, after step 416, process 400 may continue to step 418, where a system may perform one or more dependency threads. In at least one embodiment, for example, one or more dependency threads may complete work.

In at least one embodiment, after step 418, process 400 may continue to step 420, where a system may update a progress counter. In at least one embodiment, for example, a processor that comprises a dependency thread may update a progress counter to indicate completion of work of dependency thread. In at least one embodiment, for example, a processor that comprises a dependent thread may update a semaphore value in a progress counter to indicate completion of work of dependency thread.

In at least one embodiment, after step 420, process 400 may continue to step 422, where a system may perform dependent threads. In at least one embodiment, one or more dependent threads that depend on a dependency thread may access a progress counter to detect work has been completed by dependency thread. In at least one embodiment, for example, a dependent thread may access a semaphore value of a progress counter and detect a change in semaphore value. In at least one embodiment, in response to detecting a change in semaphore value, a dependent thread may perform work.

Figure 5:
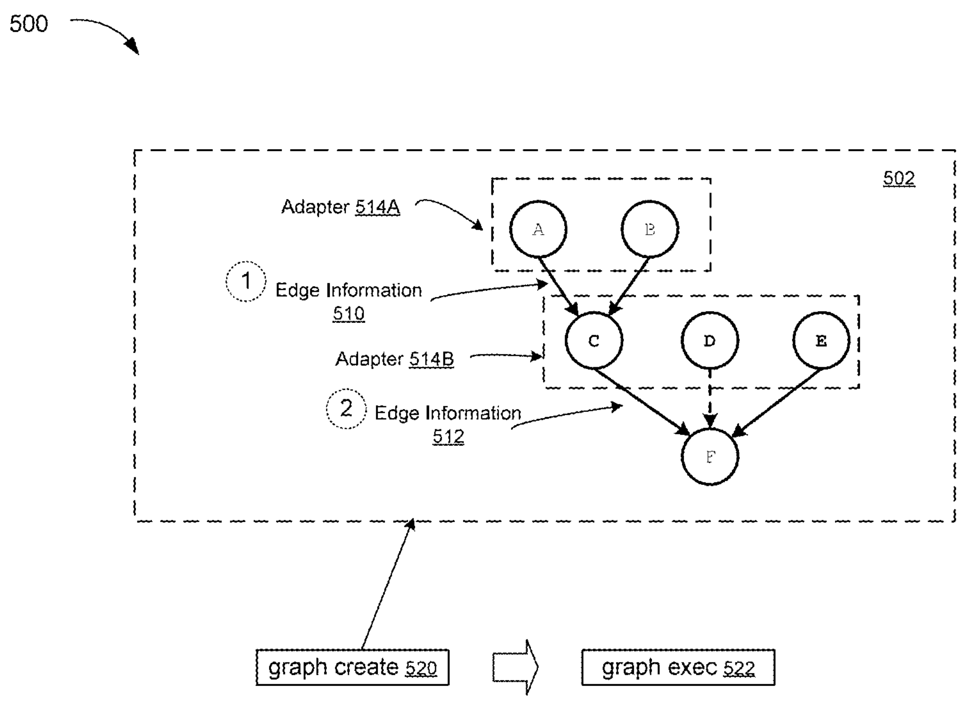
FIG. 5 illustrates graph creation and execution, in accordance with at least one embodiment.

FIG. 5 illustrates cross-adapter graph dependencies, in accordance with at least one embodiment. In at least one embodiment, a processor comprises circuitry to identify a dependency between two or more nodes of a graph. In at least one embodiment, a dependency in a graph is obtained via an application programming interface ("API") that is used to either explicitly define, or to capture information that defines, this graph. In at least one embodiment, an API is to indicate one or more node dependencies of a graph. In at least one embodiment, nodes of a graph may be associated with threads performed by one or more processors. In at least one embodiment, for example, a first node of graph may be associated with a first thread performed using a first processor and a second node of said graph may be associated with a second thread performed using a second processor. In at least one embodiment, a first thread of a graph may be performed using a first thread associated with a first adapter and a second thread of said graph may be performed using a second thread associated with a second adapter.

In at least one embodiment, an example process 500 for creating and using graphs comprises graph create 520 and graph execution 522, where said process 500 comprises generating and executing graph 502.

In at least one embodiment, creating a graph is created by at least one of explicit definition or stream capture. In at least one embodiment, explicit definition of a graph comprises use of one or more application programming interfaces ("APIs") that defines said graph's nodes and edges, where said nodes represent operations to be performed by one or more GPUs or PPUs and said edges represent data flow and/or performance ordering between nodes. In at least one embodiment, stream capture comprises intercepting and recording operations directed to a GPU or PPU. For example, in at least one embodiment, a graph is constructed from stream capture by identifying kernel operations streamed to a GPU and constructing a graph that represents these operations and their dependencies. In at least one embodiment, a kernel represents a function, routine, or other unit of code to be performed by one or more GPUs or PPUs. In at least one embodiment, one or more graphs are used to cause one or more first threads performed by one or more processors to update one or more semaphores accessible to one or more second threads performed by one or more second processors, based, at least in part, on one or more dependencies between said one or more first threads and said one or more second threads. In at least one embodiment, one or more processors are to use one or more graphs to cause one or more first threads performed by one or more processors to update one or more semaphores accessible to one or more second threads performed by one or more second processors, based, at least in part, on one or more dependencies between said one or more first threads and said one or more second threads.

In at least one embodiment, a graph is processed, after its definition, to prepare for execution by one or more GPUs or PPUs. In at least one embodiment, this may include compilation of said graph, applications of various optimizations, or other processing. In at least one embodiment, processing may include communication between a CPU and one or more GPUs or PPUs that are to execute a graph. In at least one embodiment, processing a graph may include identifying one or more dependencies (e.g., cross-adapter dependencies) between two or more nodes. In at least one embodiment, for example, nodes 'A' and 'B' may be performed using adapter 514A while nodes 'C,' 'D,' and 'E' may be performed using adapter 514B, where node 'C' has a cross-adapter dependency from node 'A.' In at least one embodiment, based on identifying a cross-adapter dependency, one or more semaphore values (e.g., channel progress counter 208 and/or cross-adapter monitor counter 210 of FIG. 2) may be updated.

In at least one embodiment, a graph dependency refers to a relationship between nodes of a graph. In at least one embodiment, a graph dependency refers to a relationship in which at least one node relies on completion of at least one other node. In at least one embodiment, for example, a dependency describes a relationship between a dependency node and a dependent node, where said dependency node must complete performance before performing said dependent node. In at least one embodiment, a graph dependency refers to a relationship in which at least one node relies on a launching order of at least one other node. In at least one embodiment, a graph dependency refers to a relationship in which at least one other dependency is prevented between a node and at least one other node. In at least one embodiment, a graph dependency causes one node of a graph to wait until at least one other node is launched before being launched. In at least one embodiment, an order of graph dependencies refers to a sequence in which these relationships were defined. In at least one embodiment, this sequence information is obtained from API calls made to define a graph, whether through an explicit API, stream capture, or other mechanism.

In at least one embodiment, a graph include edge information, such as edge information 510 and/or edge information 512, that corresponding to one or more dependencies between two or more nodes (e.g., such as a cross-adapter dependency between thread(s) 206A and thread(s) 206B as described in FIG. 2). In at least one embodiment, edge information 610 and/or edge information 612 may be used to identify dependencies (e.g., such as steps 104 of FIG. 1 or steps 402, 404 of FIG. 4) between dependency threads and dependent threads. In at least one embodiment, edge information may be calculated, or otherwise determined, based on parameters of corresponding nodes. In at least one embodiment, for example, edge information 510 may indicate a cross-adapter dependency between node 'A' and node 'C' based on one or more parameters of node 'A' indicating that node 'A' is performed using adapter 514A and one or more parameters of node 'C' indicating that node 'C' is performed using adapter 514B. In at least one embodiment, edge information includes information indicating an edge type. In at least one embodiment, an edge type may specify a type of edge and/or a type of dependency associated with a corresponding edge. In at least one embodiment, for example, edge information associated with an edge indicates a cross-adapter dependency for two nodes at a source and destination of this edge. In at least one embodiment, for example, a type of dependency may indicate whether a dependency is a cross-adapter dependency. In at least one embodiment, two nodes that correspond to a cross-adapter dependency may be configured to perform a cross-adapter release and access a cross-adapter monitor counter, respectively, as described in FIGS. 2 and 3. In at least one embodiment, for example, a dependency node (e.g., thread(s) 206A, 306A) may perform a cross-adapter release to a cross-adapter monitor counter (e.g., cross-adapter monitor counter 210, 308B). In at least one embodiment, for example, a dependent node (e.g., thread(s) 206B, 306B) may access a cross-adapter monitor counter (e.g., cross-adapter monitor counter 210, 308B) to determine whether a dependency node has completed work. In at least one embodiment, for example, edge information associated with an edge indicates a launch order dependency for two nodes at a source and destination of this edge. In at least one embodiment, for example, edge information associated with an edge indicates an anti-deadlock dependency for two nodes at a source and destination of this edge. In at least one embodiment, edge information may include one or more port definitions. In at least one embodiment, using an edge type and/or port definitions in an edge information, constraints between two nodes are identified when a graph is created and/or executed.

In at least one embodiment, information collected during graph creation is used to generate and execute graphs. In at least one embodiment, this information comprises edge information, such as edge information 510 and/or edge information 512.

Figure 6:
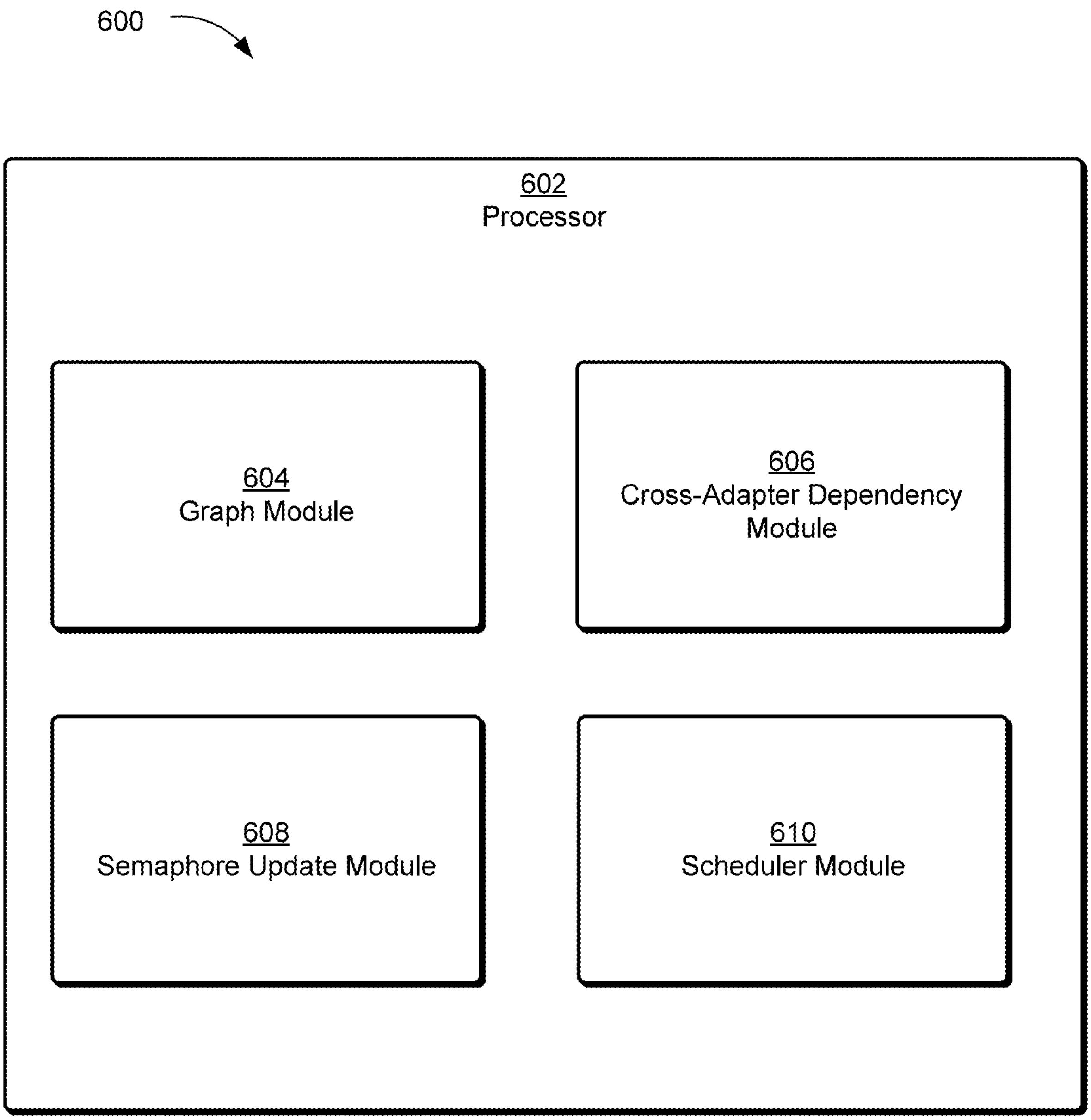
FIG. 6 illustrates an example of a processor, in accordance with at least one embodiment.

FIG. 6 illustrates an example 600 of a processor, according to at least one embodiment. In at least one embodiment, a processor 602 performs one or more processes such as those described herein to perform a dependent thread. In at least one embodiment, processor 602 performs one or more operations and/or processes. In at least one embodiment, processor 602 performs one or more processes such as those described in connection with FIGS. 1-5. In at least one embodiment, example 600 comprises one or more processors with hardware modules. In at least one embodiment, processor 602 may perform one or more program tasks in accordance with systems, components, and subsystems of example environment 200 of FIG. 2 and exemplary adapter system 300 of FIG. 3, such as graph management, cross-adapter dependency management, semaphore update operations, and schedule operations, and other such tasks.

In at least one embodiment, processor 602 comprises one or more processors such as those described in connection with FIGS. 13-15. In at least one embodiment, processor 602 is any suitable processing unit and/or combination of processing units, such as one or more CPUs, GPUs, GPGPUs, PPUs, and/or variations thereof. In at least one embodiment, processor 602 comprises a graph module 604, a cross-adapter dependency module 606, a semaphore update module 608, and/or a scheduler module 610. In at least one embodiment, a graph module 604, a cross-adapter dependency module 606, a semaphore update module 608, and/or a scheduler module 610 are part of processor 602 and/or one or more other processors. In at least one embodiment, a graph module 604, a cross-adapter dependency module 606, a semaphore update module 608, and/or a scheduler module 610 are distributed among multiple processors that communicate over a bus, network, by writing to shared memory, and/or any suitable communication process such as those described herein.

In at least one embodiment, as used in any implementation described herein, unless otherwise clear from context or stated explicitly to contrary, a module refers to any combination of software logic, firmware logic, hardware logic, and/or circuitry configured to provide functionality described herein. In at least one embodiment, software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. In at least one embodiment, modules may, collectively or individually, be embodied as circuitry that forms part of a larger system, for example, an integrated circuit (IC), system on-chip (SoC), and so forth. In at least one embodiment, a module performs one or more processes in connection with any suitable processing unit and/or combination of processing units, such as one or more CPUs, GPUs, GPGPUs, PPUs, and/or variations thereof.

In at least one embodiment, a graph module 604 may perform graph management from creation, definition, storing, and other handling tasks, such as described in FIG. 5. In at least one embodiment, graph module 604 may maintain a plurality of graphs, each containing a plurality of nodes and a plurality of edges connecting nodes. In at least one embodiment, a graph module 604 may access a graph stored in storage, such as step 102 of FIG. 1, combinations of components listed above, and other similar components or entities disclosed within this written description.

In at least one embodiment, a cross-adapter dependency module 606 may handle cross-adapter dependencies between nodes of a graph. In at least one embodiment, for example, cross-adapter dependency module 606 may handle identifying, recording, accessing, and other handling tasks of cross-adapter dependencies, such as described in FIGS. 1-4. In at least one embodiment, cross-adapter dependency module 606 may configure one or more nodes to perform cross-adapter releases upon completion of work. In at least one embodiment, for example, cross-adapter dependency module 606 may configure one or more dependency threads on one adapter to perform a cross-adapter release to a cross-adapter monitor counter on a different adapter to be accessed by one or more dependent threads. In at least one embodiment, for example, cross-adapter dependency module 606 may configure one or more dependent threads on one adapter to access a cross-adapter monitor counter to determine whether work has been completed by a dependency thread on a different adapter. In at least one embodiment, cross-adapter dependency module 606 may configure one or more dependent threads such that performance of one or more dependent threads is dependent on completion of a performance of one or more dependency threads. In at least one embodiment, cross-adapter dependency module 606 may access one or more graphs from graph module 604 to identify one or more edges between nodes and identify cross-adapter dependencies between nodes. In at least one embodiment, for example, cross-adapter dependency module 606 may identify two nodes of a graph on two different adapters connected by an edge. In at least one embodiment, for example, cross-adapter dependency module 606 may identify two nodes of a graph on two different GPUs connected by an edge. In at least one embodiment, cross-adapter dependency module 606 may send dependency information to semaphore update module 608. In at least one embodiment, dependency information may indicate one or more nodes that are dependent on another node. In at least one embodiment, for example, dependency information may indicate one or more threads that are dependent on another thread. In at least one embodiment, cross-adapter dependency module 606 may perform steps 104, 106, 108, 110 of FIG. 1, steps 402, 404, 406, 408, 416 of FIG. 4, combinations of components listed above, and other similar components or entities disclosed within this written description.

In at least one embodiment, a semaphore update module 608 may handle updates to semaphore values stored on adapters. In at least one embodiment, a semaphore update module 608 may handle updates to semaphore values stored on processors. In at least one embodiment, semaphore update module 608 may receive or access dependency information indicating which of one or more dependent nodes depend on a respective dependency node. In at least one embodiment, semaphore update module 608 may process semaphore updates received from one or more nodes, threads, or the like. In at least one embodiment, semaphore update module 608 may receive a request to update a semaphore value after completion of work by a node, thread, or the like. In at least one embodiment, semaphore update module 608 may access dependency information and determine whether a node needs to perform a cross-adapter release. In at least one embodiment, semaphore update module 608 may update semaphore values in both a channel progress counter on one adapter and/or a cross-adapter monitor counter on another adapter based on dependency information. In at least one embodiment, semaphore update module 608 may configure one or more nodes or threads to update semaphore values in both a channel progress counter on one adapter and/or a cross-adapter monitor counter on another adapter based on dependency information. In at least one embodiment, one or more dependency threads may use direct memory access to store one or more semaphores in a memory accessible to one or more dependent threads. In at least one embodiment, for example, one or more semaphores accessible to dependent threads may be stored in one or more storage locations of a processor comprising dependent threads. In at least one embodiment, for example, one or more dependency threads of a first adapter may use direct memory access to store one or more semaphores in a memory of a second adapter comprising one or more dependent threads that depend on dependency threads. In at least one embodiment, one or more dependency threads of a first adapter may store one or more semaphores in a memory of a first adapter accessible to dependent threads on a first adapter. In at least one embodiment, semaphore update module 608 may perform steps 108 of FIG. 1, steps 408, 416 of FIG. 4, combinations of components listed above, and other similar components or entities disclosed within this written description.

In at least one embodiment, scheduler module 610 may schedule work to be completed by one or more nodes. In at least one embodiment, scheduler module 610 may schedule work to be completed by one or more threads. In at least one embodiment, scheduler module 610 may access dependency information from cross-adapter dependency module 606 to schedule work. In at least one embodiment, for example, work for dependency threads may be scheduled prior to work for dependent threads, such that work for dependency threads are completed so dependent threads can perform work after completion of work from dependency threads. In at least one embodiment, one or more dependent nodes or threads may access one or more semaphores accessible to dependent nodes or threads to detect a change in one or more semaphores. In at least one embodiment, in response to detecting a change in one or more semaphores, a respective dependent node or thread may perform an operation or perform work. In at least one embodiment, for example, a dependent thread of a first adapter that depends on a dependency thread of a second adapter may access a semaphore value stored in a cross-adapter monitor counter to detect a change in semaphore values and in response to detecting a change, may perform an operation or perform work. In at least one embodiment, scheduler module 610 may perform steps 110, 112 of FIG. 1, steps 410, 414, 418, 422 of FIG. 4, combinations of components listed above, and other similar components or entities disclosed within this written description.

Data Center

FIG. 7 illustrates an exemplary data center 700, in accordance with at least one embodiment. In at least one embodiment, data center 700 includes, without limitation, a data center infrastructure layer 710, a framework layer 720, a software layer 730 and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays ("FPGAs"), data processing units ("DPUs") in network devices, graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator 712 may include hardware, software or some combination thereof.

In at least one embodiment, as shown in FIG. 7, framework layer 720 includes, without limitation, a job scheduler 732, a configuration manager 734, a resource manager 736 and a distributed file system 738. In at least one embodiment, framework layer 720 may include a framework to support software 752 of software layer 730 and/or one or more application(s) 742 of application layer 740. In at least one embodiment, software 752 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. In at least one embodiment, configuration manager 734 may be capable of configuring different layers such as software layer 730 and framework layer 720, including Spark and distributed file system 738 for supporting large-scale data processing. In at least one embodiment, resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. In at least one embodiment, resource manager 736 may coordinate with resource orchestrator 712 to manage these mapped or allocated computing resources.

In at least one embodiment, software 752 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. In at least one or more types of applications may include, without limitation, CUDA applications.

In at least one embodiment, any of configuration manager 734, resource manager 736, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, at least one component shown or described with respect to FIG. 7 is utilized to implement techniques and/or functions described in connection with FIGS. 1-6. In at least one embodiment, at least one component of FIG. 7 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 7 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Computer-Based Systems

The following figures set forth, without limitation, exemplary computer-based systems that can be used to implement at least one embodiment.

Figure 8:
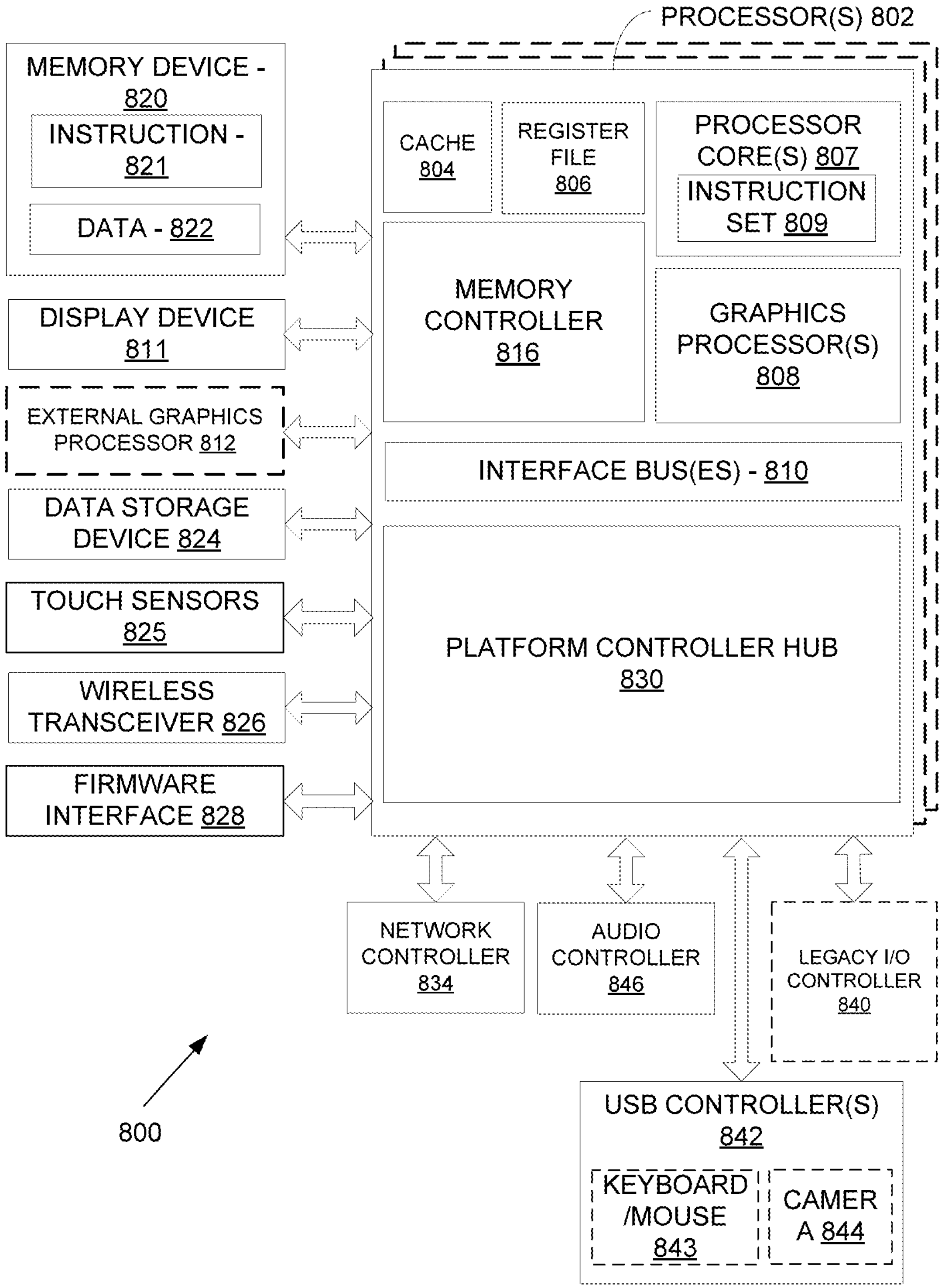
FIG. 8 illustrates a processing system, in accordance with at least one embodiment.

FIG. 8 illustrates a processing system 800, in accordance with at least one embodiment. In at least one embodiment, processing system 800 includes one or more processors 802 and one or more graphics processors 808, and may be a single processor desktop system, a multiprocessor workstation system, or a server system having a large number of processors 802 or processor cores 807. In at least one embodiment, processing system 800 is a processing platform incorporated within a system-on-a-chip ("SoC") integrated circuit for use in mobile, handheld, or embedded devices. In at least one embodiment, a processors core 807 is referred to as a computing unit or compute unit.

In at least one embodiment, processing system 800 can include, or be incorporated within a server-based gaming platform, a game console, a media console, a mobile gaming console, a handheld game console, or an online game console. In at least one embodiment, processing system 800 is a mobile phone, smart phone, tablet computing device or mobile Internet device. In at least one embodiment, processing system 800 can also include, couple with, or be integrated within a wearable device, such as a smart watch wearable device, smart eyewear device, augmented reality device, or virtual reality device. In at least one embodiment, processing system 800 is a television or set top box device having one or more processors 802 and a graphical interface generated by one or more graphics processors 808.

In at least one embodiment, one or more processors 802 each include one or more processor cores 807 to process instructions which, when executed, perform operations for system and user software. In at least one embodiment, each of one or more processor cores 807 is configured to process a specific instruction set 809. In at least one embodiment, instruction set 809 may facilitate Complex Instruction Set Computing ("CISC"), Reduced Instruction Set Computing ("RISC"), or computing via a Very Long Instruction Word ("VLIW"). In at least one embodiment, processor cores 807 may each process a different instruction set 809, which may include instructions to facilitate emulation of other instruction sets. In at least one embodiment, processor core 807 may also include other processing devices, such as a digital signal processor ("DSP").

In at least one embodiment, processor 802 includes cache memory ('cache") 804. In at least one embodiment, processor 802 can have a single internal cache or multiple levels of internal cache. In at least one embodiment, cache memory is shared among various components of processor 802. In at least one embodiment, processor 802 also uses an external cache (e.g., a Level 3 ("L3") cache or Last Level Cache ("LLC")) (not shown), which may be shared among processor cores 807 using known cache coherency techniques. In at least one embodiment, register file 806 is additionally included in processor 802 which may include different types of registers for storing different types of data (e.g., integer registers, floating point registers, status registers, and an instruction pointer register). In at least one embodiment, register file 806 may include general-purpose registers or other registers.

In at least one embodiment, one or more processor(s) 802 are coupled with one or more interface bus(es) 810 to transmit communication signals such as address, data, or control signals between processor 802 and other components in processing system 800. In at least one embodiment interface bus 810, in one embodiment, can be a processor bus, such as a version of a Direct Media Interface ("DMI") bus. In at least one embodiment, interface bus 810 is not limited to a DMI bus, and may include one or more Peripheral Component Interconnect buses (e.g., "PCI," PCI Express ("PCIe")), memory buses, or other types of interface buses. In at least one embodiment processor(s) 802 include an integrated memory controller 816 and a platform controller hub 830. In at least one embodiment, memory controller 816 facilitates communication between a memory device and other components of processing system 800, while platform controller hub ("PCH") 830 provides connections to Input/Output ("I/O") devices via a local I/O bus. In at least one embodiment, one or more Peripheral Component Interconnect buses include PCIe Gen 5, which provides an interface for processors.

In at least one embodiment, memory device 820 can be a dynamic random access memory ("DRAM") device, a static random access memory ("SRAM") device, flash memory device, phase-change memory device, or some other memory device having suitable performance to serve as processor memory. In at least one embodiment memory device 820 can operate as system memory for processing system 800, to store data 822 and instructions 821 for use when one or more processors 802 executes an application or process. In at least one embodiment, memory controller 816 also couples with an optional external graphics processor 812, which may communicate with one or more graphics processors 808 in processors 802 to perform graphics and media operations. In at least one embodiment, a display device 811 can connect to processor(s) 802. In at least one embodiment display device 811 can include one or more of an internal display device, as in a mobile electronic device or a laptop device or an external display device attached via a display interface (e.g., DisplayPort, etc.). In at least one embodiment, display device 811 can include a head mounted display ("HMD") such as a stereoscopic display device for use in virtual reality ("VR") applications or augmented reality ("AR") applications.

In at least one embodiment, platform controller hub 830 enables peripherals to connect to memory device 820 and processor 802 via a high-speed I/O bus. In at least one embodiment, I/O peripherals include, but are not limited to, an audio controller 846, a network controller 834, a firmware interface 828, a wireless transceiver 826, touch sensors 825, a data storage device 824 (e.g., hard disk drive, flash memory, etc.). In at least one embodiment, data storage device 824 can connect via a storage interface (e.g., SATA) or via a peripheral bus, such as PCI, or PCIe. In at least one embodiment, touch sensors 825 can include touch screen sensors, pressure sensors, or fingerprint sensors. In at least one embodiment, wireless transceiver 826 can be a Wi-Fi transceiver, a Bluetooth transceiver, or a mobile network transceiver such as a 3G, 4G, or Long Term Evolution ("LTE") transceiver. In at least one embodiment, firmware interface 828 enables communication with system firmware, and can be, for example, a unified extensible firmware interface ("UEFI"). In at least one embodiment, network controller 834 can enable a network connection to a wired network. In at least one embodiment, a high-performance network controller (not shown) couples with interface bus 810. In at least one embodiment, audio controller 846 is a multi-channel high definition audio controller. In at least one embodiment, processing system 800 includes an optional legacy I/O controller 840 for coupling legacy (e.g., Personal System 2 ("PS/2")) devices to processing system 800. In at least one embodiment, platform controller hub 830 can also connect to one or more Universal Serial Bus ("USB") controllers 842 connect input devices, such as keyboard and mouse 843 combinations, a camera 844, or other USB input devices.

In at least one embodiment, an instance of memory controller 816 and platform controller hub 830 may be integrated into a discreet external graphics processor, such as external graphics processor 812. In at least one embodiment, platform controller hub 830 and/or memory controller 816 may be external to one or more processor(s) 802. In at least one embodiment, for example, processing system 800 can include an external memory controller 816 and platform controller hub 830, which may be configured as a memory controller hub and peripheral controller hub within a system chipset that is in communication with processor(s) 802.

In at least one embodiment, at least one component shown or described with respect to FIG. 8 is utilized to implement techniques and/or functions described in connection with FIGS. 1-6. In at least one embodiment, at least one component of FIG. 8 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 8 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 9:
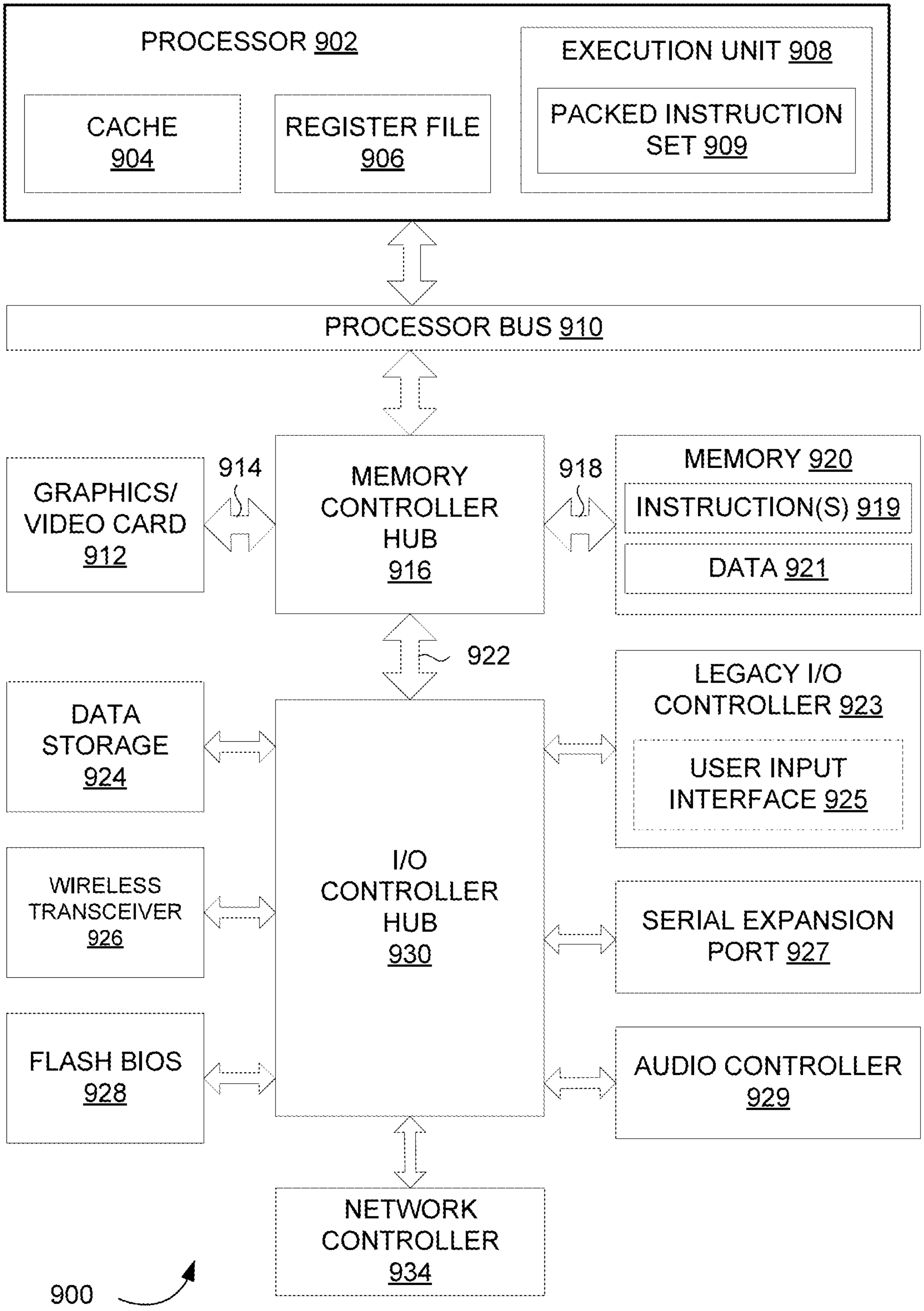
FIG. 9 illustrates a computer system, in accordance with at least one embodiment.

FIG. 9 illustrates a computer system 900, in accordance with at least one embodiment. In at least one embodiment, computer system 900 may be a system with interconnected devices and components, an SOC, or some combination. In at least on embodiment, computer system 900 is formed with a processor 902 that may include execution units to execute an instruction. In at least one embodiment, computer system 900 may include, without limitation, a component, such as processor 902 to employ execution units including logic to perform algorithms for processing data. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

In at least one embodiment, computer system 900 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions.

In at least one embodiment, computer system 900 may include, without limitation, processor 902 that may include, without limitation, one or more execution units 908 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 900 is a single processor desktop or server system. In at least one embodiment, computer system 900 may be a multiprocessor system. In at least one embodiment, processor 902 may include, without limitation, a CISC microprocessor, a RISC microprocessor, a VLIW microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. In at least one embodiment, processor 902 may also include a combination of both internal and external caches. In at least one embodiment, a register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. Processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a DRAM device, an SRAM device, flash memory device, or other memory device. Memory 920 may store instruction(s) 919 and/or data 921 represented by data signals that may be executed by processor 902.

In at least one embodiment, a system logic chip may be coupled to processor bus 910 and memory 920. In at least one embodiment, the system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, a chipset, and processor 902. Examples may include, without limitation, an audio controller 929, a firmware hub ("flash BIOS") 928, a wireless transceiver 926, a data storage 924, a legacy I/O controller 923 containing a user input interface 925 and a keyboard interface, a serial expansion port 927, such as a USB, and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips." In at least one embodiment, FIG. 9 may illustrate an exemplary SoC. In at least one embodiment, devices illustrated in FIG. 9 may be interconnected with proprietary interconnects, standardized interconnects (e.g., PCIe), or some combination thereof. In at least one embodiment, one or more components of system 900 are interconnected using compute express link ("CXL") interconnects.

In at least one embodiment, at least one component shown or described with respect to FIG. 9 is utilized to implement techniques and/or functions described in connection with FIGS. 1-6. In at least one embodiment, at least one component of FIG. 9 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 9 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 10:
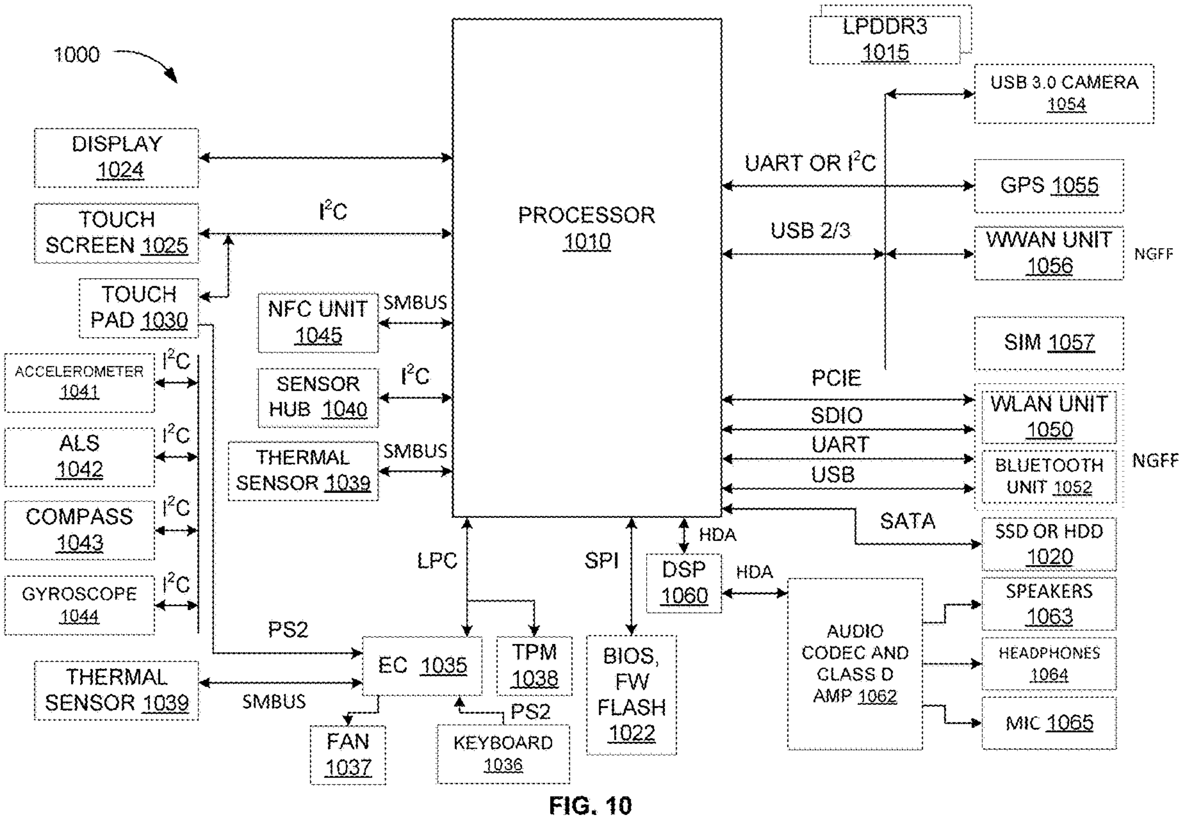
FIG. 10 illustrates a system, in accordance with at least one embodiment.

FIG. 10 illustrates a system 1000, in accordance with at least one embodiment. In at least one embodiment, system 1000 is an electronic device that utilizes a processor 1010. In at least one embodiment, system 1000 may be, for example and without limitation, a notebook, a tower server, a rack server, a blade server, an edge device communicatively coupled to one or more on-premise or cloud service providers, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 is coupled using a bus or interface, such as an $I^2C$ bus, a System Management Bus ("SMBus"), a Low Pin Count ("LPC") bus, a Serial Peripheral Interface ("SPI"), a High Definition Audio ("HDA") bus, a Serial Advance Technology Attachment ("SATA") bus, a USB (versions 1, 2, 3), or a Universal Asynchronous Receiver/Transmitter ("UART") bus. In at least one embodiment, FIG. 10 illustrates a system which includes interconnected hardware devices or "chips." In at least one embodiment, FIG. 10 may illustrate an exemplary SoC. In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using CXL interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a Solid State Disk ("SSD") or Hard Disk Drive ("HDD") 1020, a wireless local area network unit ("WLAN") 1050, a Bluetooth unit 1052, a Wireless Wide Area Network unit ("WWAN") 1056, a Global Positioning System ("GPS") 1055, a camera ("USB 3.0 camera") 1054 such as a USB 3.0 camera, or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, an Ambient Light Sensor ("ALS") 1042, a compass 1043, and a gyroscope 1044 may be communicatively coupled to sensor hub 1040. In at least one embodiment, a thermal sensor 1039, a fan 1037, a keyboard 1036, and a touch pad 1030 may be communicatively coupled to EC 1035. In at least one embodiment, a speaker 1063, a headphones 1064, and a microphone ("mic") 1065 may be communicatively coupled to an audio unit ("audio codec and class d amp") 1062, which may in turn be communicatively coupled to DSP 1060. In at least one embodiment, audio unit 1062 may include, for example and without limitation, an audio coder/decoder ("codec") and a class D amplifier. In at least one embodiment, a SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

In at least one embodiment, at least one component shown or described with respect to FIG. 10 is utilized to implement techniques and/or functions described in connection with FIGS. 1-6. In at least one embodiment, at least one component of FIG. 10 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 10 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 11:
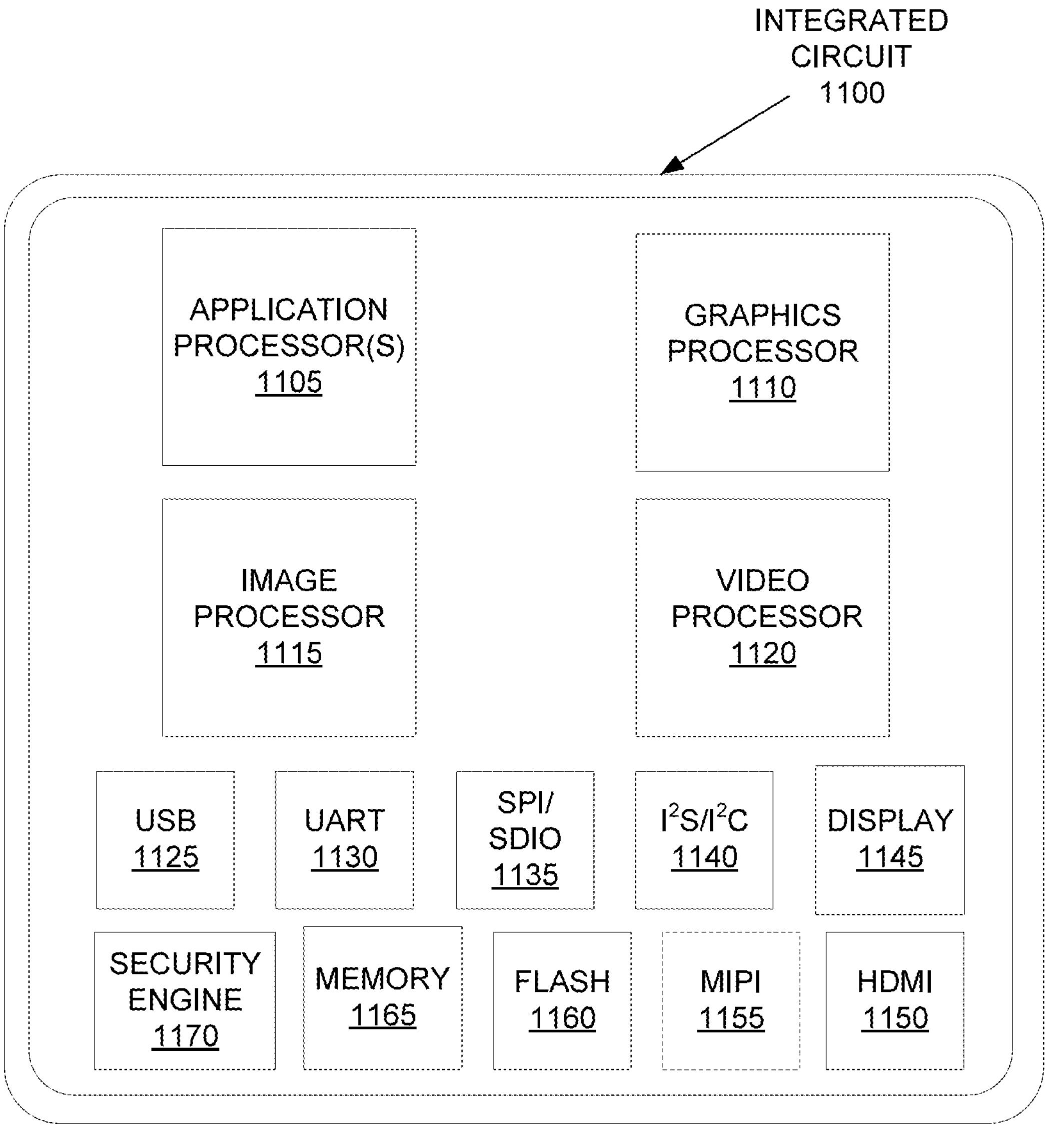
FIG. 11 illustrates an exemplary integrated circuit, in accordance with at least one embodiment.

FIG. 11 illustrates an exemplary integrated circuit 1100, in accordance with at least one embodiment. In at least one embodiment, exemplary integrated circuit 1100 is an SoC that may be fabricated using one or more IP cores. In at least one embodiment, integrated circuit 1100 includes one or more application processor(s) 1105 (e.g., CPUs, DPUs), at least one graphics processor 1110, and may additionally include an image processor 1115 and/or a video processor 1120, any of which may be a modular IP core. In at least one embodiment, integrated circuit 1100 includes peripheral or bus logic including a USB controller 1125, a UART controller 1130, an SPI/SDIO controller 1135, and an $I^2S/I^2C$ controller 1140. In at least one embodiment, integrated circuit 1100 can include a display device 1145 coupled to one or more of a high-definition multimedia interface ("HDMI") controller 1150 and a mobile industry processor interface ("MIPI") display interface 1155. In at least one embodiment, storage may be provided by a flash memory subsystem 1160 including flash memory and a flash memory controller. In at least one embodiment, a memory interface may be provided via a memory controller 1165 for access to SDRAM or SRAM memory devices. In at least one embodiment, some integrated circuits additionally include an embedded security engine 1170.

In at least one embodiment, at least one component shown or described with respect to FIG. 11 is utilized to implement techniques and/or functions described in connection with FIGS. 1-6. In at least one embodiment, at least one component of FIG. 11 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 11 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 12:
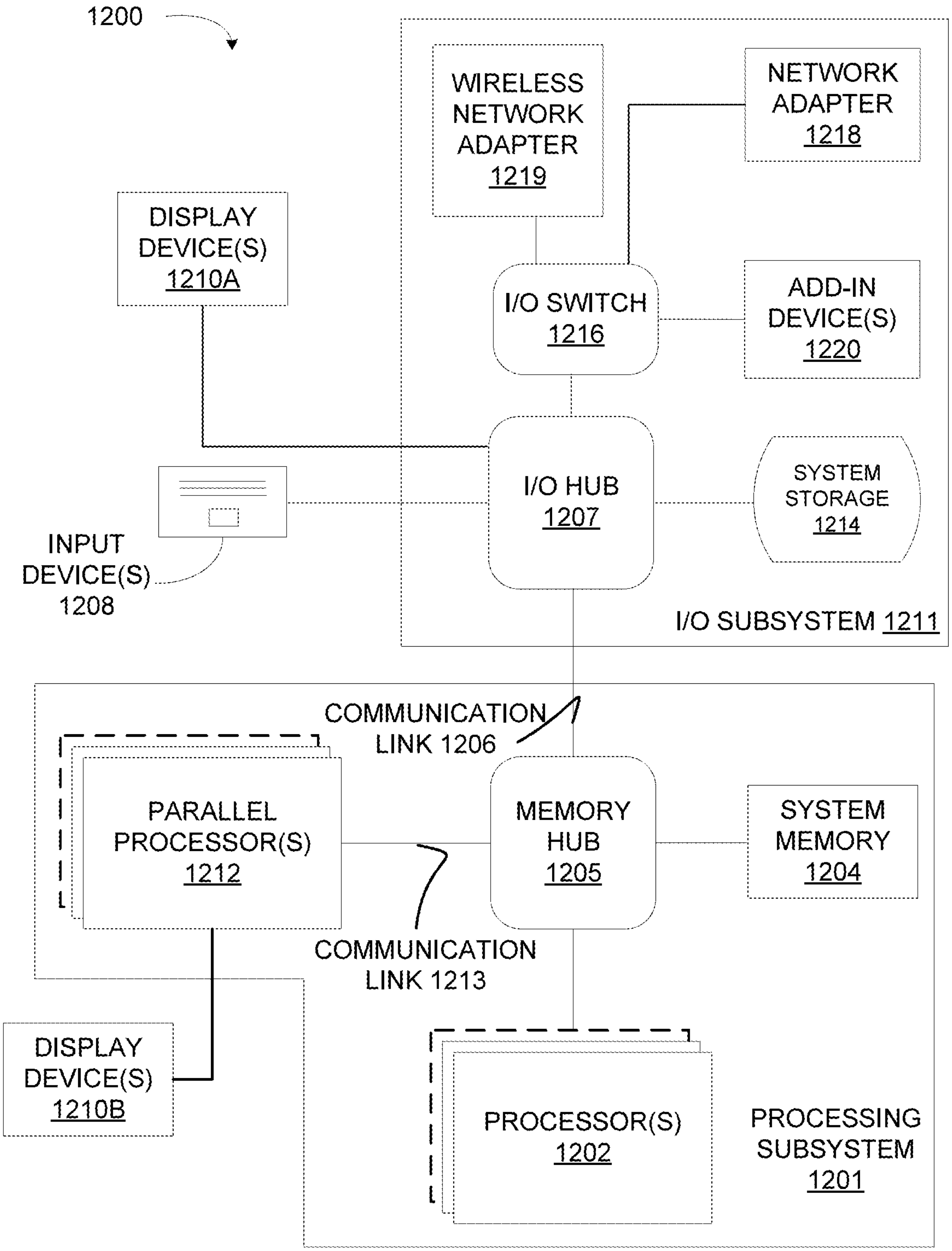
FIG. 12 illustrates a computing system, according to at least one embodiment.

FIG. 12 illustrates a computing system 1200, according to at least one embodiment; In at least one embodiment, computing system 1200 includes a processing subsystem 1201 having one or more processor(s) 1202 and a system memory 1204 communicating via an interconnection path that may include a memory hub 1205. In at least one embodiment, memory hub 1205 may be a separate component within a chipset component or may be integrated within one or more processor(s) 1202. In at least one embodiment, memory hub 1205 couples with an I/O subsystem 1211 via a communication link 1206. In at least one embodiment, I/O subsystem 1211 includes an I/O hub 1207 that can enable computing system 1200 to receive input from one or more input device(s) 1208. In at least one embodiment, I/O hub 1207 can enable a display controller, which may be included in one or more processor(s) 1202, to provide outputs to one or more display device(s) 1210A. In at least one embodiment, one or more display device(s) 1210A coupled with I/O hub 1207 can include a local, internal, or embedded display device.

In at least one embodiment, processing subsystem 1201 includes one or more parallel processor(s) 1212 coupled to memory hub 1205 via a bus or other communication link 1213. In at least one embodiment, communication link 1213 may be one of any number of standards based communication link technologies or protocols, such as, but not limited to PCIe, or may be a vendor specific communications interface or communications fabric. In at least one embodiment, one or more parallel processor(s) 1212 form a computationally focused parallel or vector processing system that can include a large number of processing cores and/or processing clusters, such as a many integrated core processor or compute units. In at least one embodiment, one or more parallel processor(s) 1212 form a graphics processing subsystem that can output pixels to one of one or more display device(s) 1210A coupled via I/O Hub 1207. In at least one embodiment, one or more parallel processor(s) 1212 can also include a display controller and display interface (not shown) to enable a direct connection to one or more display device(s) 1210B.

In at least one embodiment, a system storage unit 1214 can connect to I/O hub 1207 to provide a storage mechanism for computing system 1200. In at least one embodiment, an I/O switch 1216 can be used to provide an interface mechanism to enable connections between I/O hub 1207 and other components, such as a network adapter 1218 and/or wireless network adapter 1219 that may be integrated into a platform, and various other devices that can be added via one or more add-in device(s) 1220. In at least one embodiment, network adapter 1218 can be an Ethernet adapter or another wired network adapter. In at least one embodiment, wireless network adapter 1219 can include one or more of a Wi-Fi, Bluetooth, NFC, or other network device that includes one or more wireless radios.

In at least one embodiment, computing system 1200 can include other components not explicitly shown, including USB or other port connections, optical storage drives, video capture devices, and the like, that may also be connected to I/O hub 1207. In at least one embodiment, communication paths interconnecting various components in FIG. 12 may be implemented using any suitable protocols, such as PCI based protocols (e.g., PCIe), or other bus or point-to-point communication interfaces and/or protocol(s), such as NVLink high-speed interconnect, or interconnect protocols.

In at least one embodiment, one or more parallel processor(s) 1212 incorporate circuitry optimized for graphics and video processing, including, for example, video output circuitry, and constitutes a graphics processing unit ("GPU"). In at least one embodiment, one or more parallel processor(s) 1212 incorporate circuitry optimized for general purpose processing. In at least embodiment, components of computing system 1200 may be integrated with one or more other system elements on a single integrated circuit. In at least one embodiment, for example, one or more parallel processor(s) 1212, memory hub 1205, processor(s) 1202, and I/O hub 1207 can be integrated into an SoC integrated circuit. In at least one embodiment, components of computing system 1200 can be integrated into a single package to form a system in package ("SIP") configuration. In at least one embodiment, at least a portion of the components of computing system 1200 can be integrated into a multi-chip module ("MCM"), which can be interconnected with other multi-chip modules into a modular computing system. In at least one embodiment, I/O subsystem 1211 and display devices 1210B are omitted from computing system 1200. In at least one embodiment, one or more parallel processor(s) 1212 include one or more tensor memory accelerators (TMA) units that can transfer blocks of data between global memory and shared memory. In at least one embodiment, one or more processors uses or access one or more TMAs to perform bi-directional copy operations, e.g., from global to shared memory and vice versa.

In at least one embodiment, at least one component shown or described with respect to FIG. 12 is utilized to implement techniques and/or functions described in connection with FIGS. 1-6. In at least one embodiment, at least one component of FIG. 12 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 12 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Processing Systems

The following figures set forth, without limitation, exemplary processing systems that can be used to implement at least one embodiment.

Figure 13:
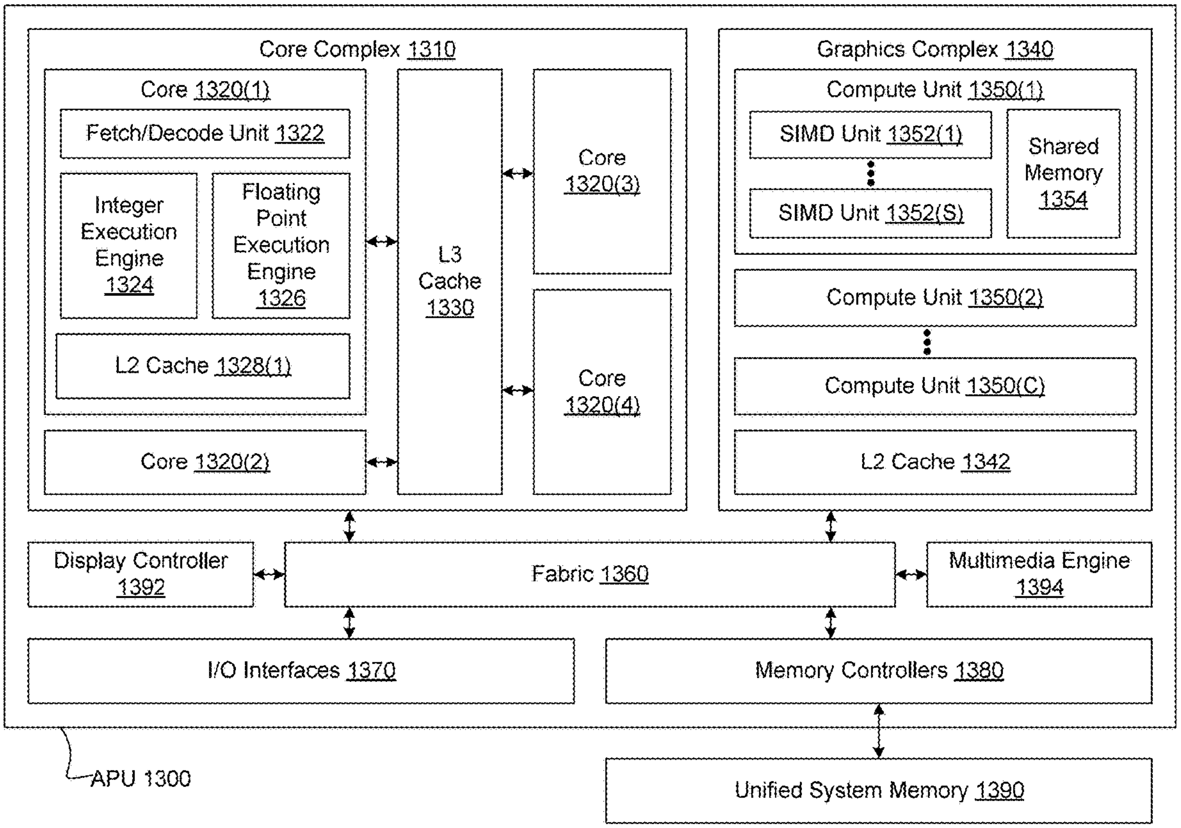
FIG. 13 illustrates an APU, in accordance with at least one embodiment.

FIG. 13 illustrates an accelerated processing unit ("APU") 1300, in accordance with at least one embodiment. In at least one embodiment, APU 1300 is developed by AMD Corporation of Santa Clara, CA. In at least one embodiment, APU 1300 can be configured to execute an application program, such as a CUDA program. In at least one embodiment, APU 1300 includes, without limitation, a core complex 1310, a graphics complex 1340, fabric 1360, I/O interfaces 1370, memory controllers 1380, a display controller 1392, and a multimedia engine 1394. In at least one embodiment, APU 1300 may include, without limitation, any number of core complexes 1310, any number of graphics complexes 1350, any number of display controllers 1392, and any number of multimedia engines 1394 in any combination. For explanatory purposes, multiple instances of like objects are denoted herein with reference numbers identifying the object and parenthetical numbers identifying the instance where needed.

In at least one embodiment, core complex 1310 is a CPU, graphics complex 1340 is a GPU, and APU 1300 is a processing unit that integrates, without limitation, 1310 and 1340 onto a single chip. In at least one embodiment, some tasks may be assigned to core complex 1310 and other tasks may be assigned to graphics complex 1340. In at least one embodiment, core complex 1310 is configured to execute main control software associated with APU 1300, such as an operating system. In at least one embodiment, core complex 1310 is the master processor of APU 1300, controlling and coordinating operations of other processors. In at least one embodiment, core complex 1310 issues commands that control the operation of graphics complex 1340. In at least one embodiment, core complex 1310 can be configured to execute host executable code derived from CUDA source code, and graphics complex 1340 can be configured to execute device executable code derived from CUDA source code.

In at least one embodiment, core complex 1310 includes, without limitation, cores 1320(1)-1320(4) and an L3 cache 1330. In at least one embodiment, core complex 1310 may include, without limitation, any number of cores 1320 and any number and type of caches in any combination. In at least one embodiment, cores 1320 are configured to execute instructions of a particular instruction set architecture ("ISA"). In at least one embodiment, each core 1320 is a CPU core. In at least one embodiment, core 1320 is referred to as a computing unit or compute unit.

In at least one embodiment, each core 1320 includes, without limitation, a fetch/decode unit 1322, an integer execution engine 1324, a floating point execution engine 1326, and an L2 cache 1328. In at least one embodiment, fetch/decode unit 1322 fetches instructions, decodes such instructions, generates micro-operations, and dispatches separate micro-instructions to integer execution engine 1324 and floating point execution engine 1326. In at least one embodiment, fetch/decode unit 1322 can concurrently dispatch one micro-instruction to integer execution engine 1324 and another micro-instruction to floating point execution engine 1326. In at least one embodiment, integer execution engine 1324 executes, without limitation, integer and memory operations. In at least one embodiment, floating point engine 1326 executes, without limitation, floating point and vector operations. In at least one embodiment, fetch-decode unit 1322 dispatches micro-instructions to a single execution engine that replaces both integer execution engine 1324 and floating point execution engine 1326.

In at least one embodiment, each core 1320(*i*), where i is an integer representing a particular instance of core 1320, may access L2 cache 1328(*i*) included in core 1320(*i*). In at least one embodiment, each core 1320 included in core complex 1310(*j*), where j is an integer representing a particular instance of core complex 1310, is connected to other cores 1320 included in core complex 1310(*j*) via L3 cache 1330(*j*) included in core complex 1310(*j*). In at least one embodiment, cores 1320 included in core complex 1310(*j*), where j is an integer representing a particular instance of core complex 1310, can access all of L3 cache 1330(*j*) included in core complex 1310(*j*). In at least one embodiment, L3 cache 1330 may include, without limitation, any number of slices.

In at least one embodiment, graphics complex 1340 can be configured to perform compute operations in a highly-parallel fashion. In at least one embodiment, graphics complex 1340 is configured to execute graphics pipeline operations such as draw commands, pixel operations, geometric computations, and other operations associated with rendering an image to a display. In at least one embodiment, graphics complex 1340 is configured to execute operations unrelated to graphics. In at least one embodiment, graphics complex 1340 is configured to execute both operations related to graphics and operations unrelated to graphics.

In at least one embodiment, graphics complex 1340 includes, without limitation, any number of compute units 1350 and an L2 cache 1342. In at least one embodiment, compute units 1350 share L2 cache 1342. In at least one embodiment, L2 cache 1342 is partitioned. In at least one embodiment, graphics complex 1340 includes, without limitation, any number of compute units 1350 and any number (including zero) and type of caches. In at least one embodiment, graphics complex 1340 includes, without limitation, any amount of dedicated graphics hardware.

In at least one embodiment, each compute unit 1350 includes, without limitation, any number of SIMD units 1352 and a shared memory 1354. In at least one embodiment, each SIMD unit 1352 implements a SIMD architecture and is configured to perform operations in parallel. In at least one embodiment, each compute unit 1350 may execute any number of thread blocks, but each thread block executes on a single compute unit 1350. In at least one embodiment, a thread block includes, without limitation, any number of threads of execution. In at least one embodiment, a workgroup is a thread block. In at least one embodiment, each SIMD unit 1352 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 1354. In at least one embodiment, each compute unit 1350 includes one or more thread block clusters, where a thread block cluster can enable programmatic control of locality at a granularity larger than a single thread block of a single streaming multiprocessor (SM). In at least one embodiment, thread block clusters (also referred to as "clusters") enables multiple thread blocks running concurrently across streaming multiprocessors to synchronize and collaboratively fetch, exchange, or otherwise use data.

In at least one embodiment, fabric 1360 is a system interconnect that facilitates data and control transmissions across core complex 1310, graphics complex 1340, I/O interfaces 1370, memory controllers 1380, display controller 1392, and multimedia engine 1394. In at least one embodiment, APU 1300 may include, without limitation, any amount and type of system interconnect in addition to or instead of fabric 1360 that facilitates data and control transmissions across any number and type of directly or indirectly linked components that may be internal or external to APU 1300. In at least one embodiment, I/O interfaces 1370 are representative of any number and type of I/O interfaces (e.g., PCI, PCI-Extended ("PCI-X"), PCIe, gigabit Ethernet ("GBE"), USB, etc.). In at least one embodiment, various types of peripheral devices are coupled to I/O interfaces 1370 In at least one embodiment, peripheral devices that are coupled to I/O interfaces 1370 may include, without limitation, keyboards, mice, printers, scanners, joysticks or other types of game controllers, media recording devices, external storage devices, network interface cards, and so forth.

In at least one embodiment, display controller AMD92 displays images on one or more display device(s), such as a liquid crystal display ("LCD") device. In at least one embodiment, multimedia engine 1394 includes, without limitation, any amount and type of circuitry that is related to multimedia, such as a video decoder, a video encoder, an image signal processor, etc. In at least one embodiment, memory controllers 1380 facilitate data transfers between APU 1300 and a unified system memory 1390. In at least one embodiment, core complex 1310 and graphics complex 1340 share unified system memory 1390.

In at least one embodiment, APU 1300 implements a memory subsystem that includes, without limitation, any amount and type of memory controllers 1380 and memory devices (e.g., shared memory 1354) that may be dedicated to one component or shared among multiple components. In at least one embodiment, APU 1300 implements a cache subsystem that includes, without limitation, one or more cache memories (e.g., L2 caches 1428, L3 cache 1330, and L2 cache 1342) that may each be private to or shared between any number of components (e.g., cores 1320, core complex 1310, SIMD units 1352, compute units 1350, and graphics complex 1340).

In at least one embodiment, at least one component shown or described with respect to FIG. 13 is utilized to implement techniques and/or functions described in connection with FIGS. 1-6. In at least one embodiment, at least one component of FIG. 13 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 13 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 14:
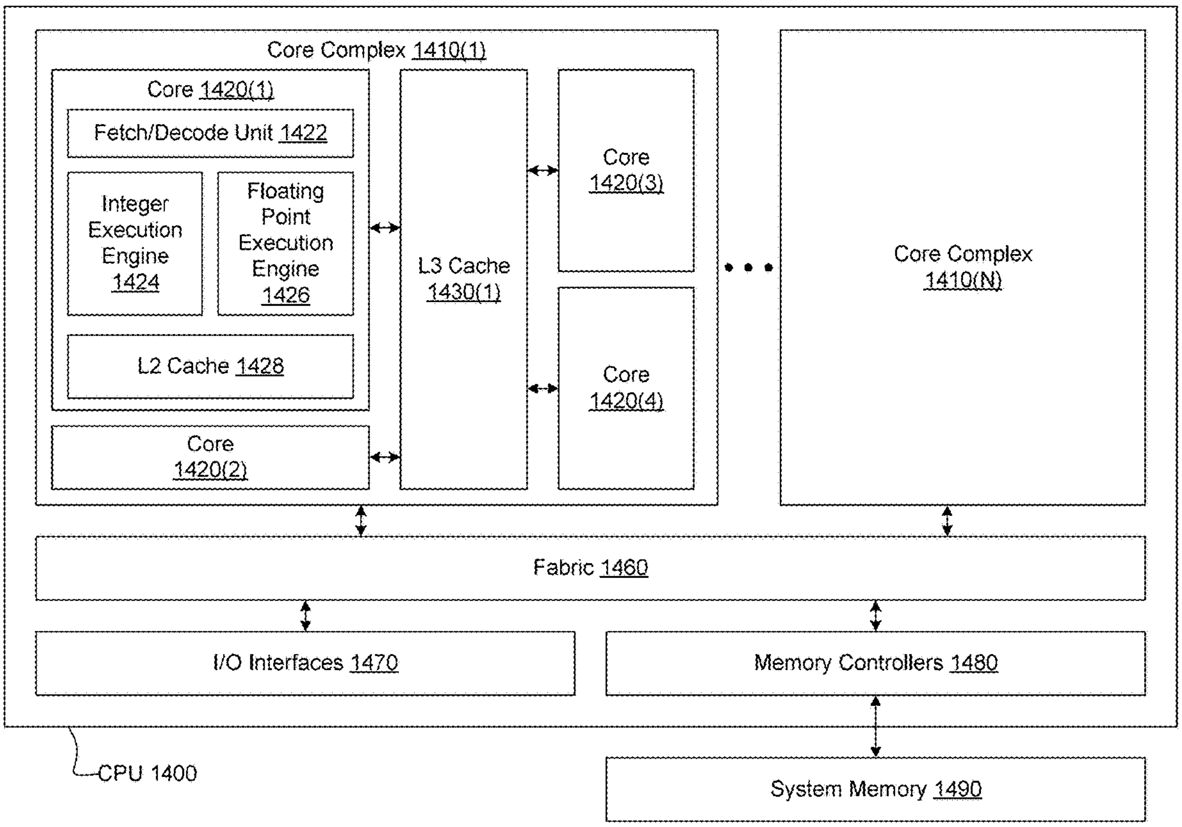
FIG. 14 illustrates a CPU, in accordance with at least one embodiment.

FIG. 14 illustrates a CPU 1400, in accordance with at least one embodiment. In at least one embodiment, CPU 1400 is developed by AMD Corporation of Santa Clara, CA. In at least one embodiment, CPU 1400 can be configured to execute an application program. In at least one embodiment, CPU 1400 is configured to execute main control software, such as an operating system. In at least one embodiment, CPU 1400 issues commands that control the operation of an external GPU (not shown). In at least one embodiment, CPU 1400 can be configured to execute host executable code derived from CUDA source code, and an external GPU can be configured to execute device executable code derived from such CUDA source code. In at least one embodiment, CPU 1400 includes, without limitation, any number of core complexes 1410, fabric 1460, I/O interfaces 1470, and memory controllers 1480.

In at least one embodiment, core complex 1410 includes, without limitation, cores 1420(1)-1420(4) and an L3 cache 1430. In at least one embodiment, core complex 1410 may include, without limitation, any number of cores 1420 and any number and type of caches in any combination. In at least one embodiment, cores 1420 are configured to execute instructions of a particular ISA. In at least one embodiment, each core 1420 is a CPU core.

In at least one embodiment, each core 1420 includes, without limitation, a fetch/decode unit 1422, an integer execution engine 1424, a floating point execution engine 1426, and an L2 cache 1428. In at least one embodiment, fetch/decode unit 1422 fetches instructions, decodes such instructions, generates micro-operations, and dispatches separate micro-instructions to integer execution engine 1424 and floating point execution engine 1426. In at least one embodiment, fetch/decode unit 1422 can concurrently dispatch one micro-instruction to integer execution engine 1424 and another micro-instruction to floating point execution engine 1426. In at least one embodiment, integer execution engine 1424 executes, without limitation, integer and memory operations. In at least one embodiment, floating point engine 1426 executes, without limitation, floating point and vector operations. In at least one embodiment, fetch-decode unit 1422 dispatches micro-instructions to a single execution engine that replaces both integer execution engine 1424 and floating point execution engine 1426.

In at least one embodiment, each core 1420(*i*), where i is an integer representing a particular instance of core 1420, may access L2 cache 1428(*i*) included in core 1420(*i*). In at least one embodiment, each core 1420 included in core complex 1410(*j*), where j is an integer representing a particular instance of core complex 1410, is connected to other cores 1420 in core complex 1410(*j*) via L3 cache 1430(*j*) included in core complex 1410(*j*). In at least one embodiment, cores 1420 included in core complex 1410(*j*), where j is an integer representing a particular instance of core complex 1410, can access all of L3 cache 1430(*j*) included in core complex 1410(*j*). In at least one embodiment, L3 cache 1430 may include, without limitation, any number of slices.

In at least one embodiment, fabric 1460 is a system interconnect that facilitates data and control transmissions across core complexes 1410(1)-1410(N) (where N is an integer greater than zero), I/O interfaces 1470, and memory controllers 1480. In at least one embodiment, CPU 1400 may include, without limitation, any amount and type of system interconnect in addition to or instead of fabric 1460 that facilitates data and control transmissions across any number and type of directly or indirectly linked components that may be internal or external to CPU 1400. In at least one embodiment, I/O interfaces 1470 are representative of any number and type of I/O interfaces (e.g., PCI, PCI-X, PCIe, GBE, USB, etc.). In at least one embodiment, various types of peripheral devices are coupled to I/O interfaces 1470 In at least one embodiment, peripheral devices that are coupled to I/O interfaces 1470 may include, without limitation, displays, keyboards, mice, printers, scanners, joysticks or other types of game controllers, media recording devices, external storage devices, network interface cards, and so forth.

In at least one embodiment, memory controllers 1480 facilitate data transfers between CPU 1400 and a system memory 1490. In at least one embodiment, core complex 1410 and graphics complex 1440 share system memory 1490. In at least one embodiment, CPU 1400 implements a memory subsystem that includes, without limitation, any amount and type of memory controllers 1480 and memory devices that may be dedicated to one component or shared among multiple components. In at least one embodiment, CPU 1400 implements a cache subsystem that includes, without limitation, one or more cache memories (e.g., L2 caches 1428 and L3 caches 1430) that may each be private to or shared between any number of components (e.g., cores 1420 and core complexes 1410).

In at least one embodiment, at least one component shown or described with respect to FIG. 14 is utilized to implement techniques and/or functions described in connection with FIGS. 1-6. In at least one embodiment, at least one component of FIG. 14 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 14 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 15:
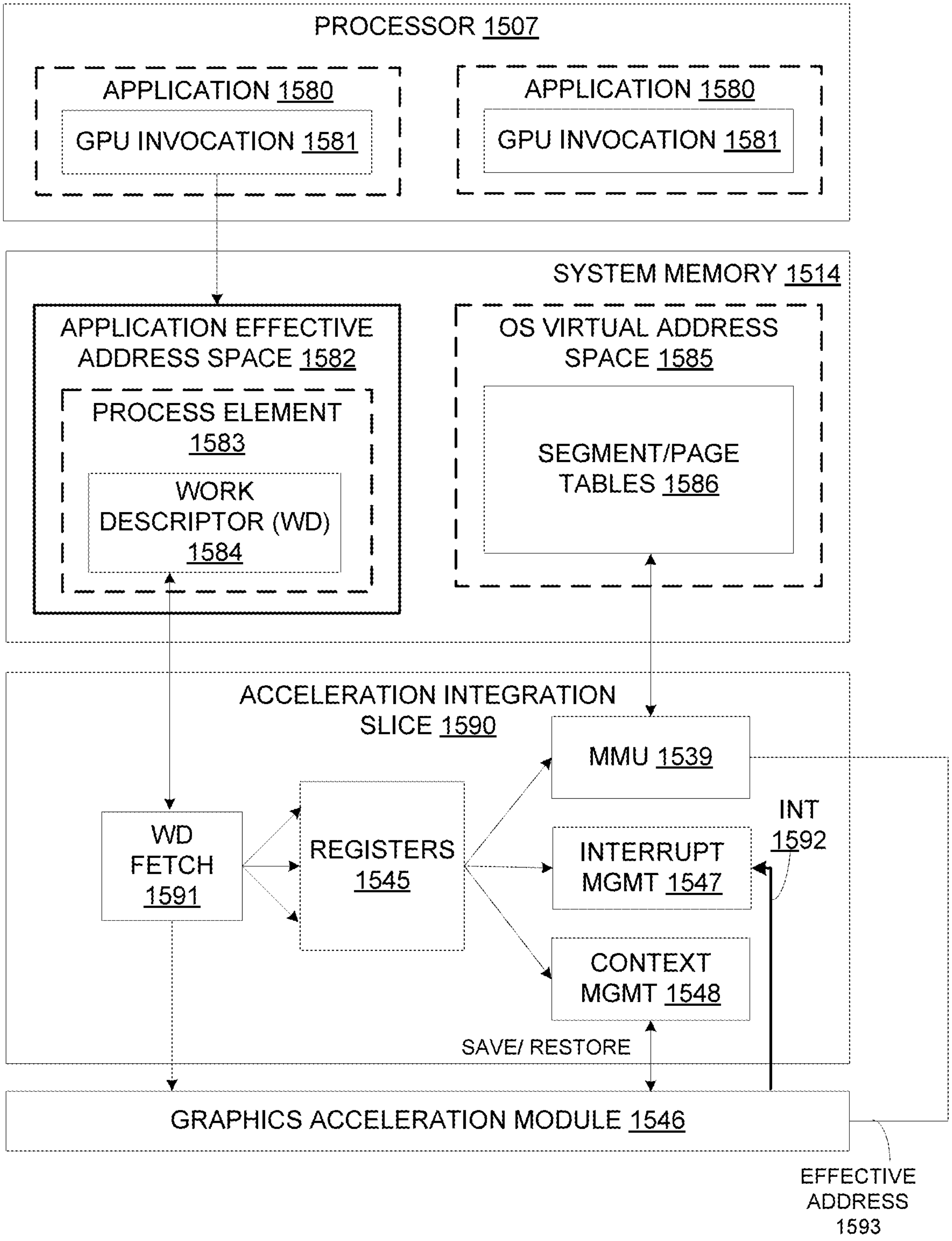
FIG. 15 illustrates an exemplary accelerator integration slice, in accordance with at least one embodiment.

FIG. 15 illustrates an exemplary accelerator integration slice 1590, in accordance with at least one embodiment. As used herein, a "slice" comprises a specified portion of processing resources of an accelerator integration circuit. In at least one embodiment, the accelerator integration circuit provides cache management, memory access, context management, and interrupt management services on behalf of multiple graphics processing engines included in a graphics acceleration module. The graphics processing engines may each comprise a separate GPU. Alternatively, the graphics processing engines may comprise different types of graphics processing engines within a GPU such as graphics execution units, media processing engines (e.g., video encoders/decoders), samplers, and blit engines. In at least one embodiment, the graphics acceleration module may be a GPU with multiple graphics processing engines. In at least one embodiment, the graphics processing engines may be individual GPUs integrated on a common package, line card, or chip.

An application effective address space 1582 within system memory 1514 stores process elements 1583. In one embodiment, process elements 1583 are stored in response to GPU invocations 1581 from applications 1580 executed on processor 1507. A process element 1583 contains process state for corresponding application 1580. A work descriptor ("WD") 1584 contained in process element 1583 can be a single job requested by an application or may contain a pointer to a queue of jobs. In at least one embodiment, WD 1584 is a pointer to a job request queue in application effective address space 1582.

Graphics acceleration module 1546 and/or individual graphics processing engines can be shared by all or a subset of processes in a system. In at least one embodiment, an infrastructure for setting up process state and sending WD 1584 to graphics acceleration module 1546 to start a job in a virtualized environment may be included.

In at least one embodiment, a dedicated-process programming model is implementation-specific. In this model, a single process owns graphics acceleration module 1546 or an individual graphics processing engine. Because graphics acceleration module 1546 is owned by a single process, a hypervisor initializes an accelerator integration circuit for an owning partition and an operating system initializes accelerator integration circuit for an owning process when graphics acceleration module 1546 is assigned.

In operation, a WD fetch unit 1591 in accelerator integration slice 1590 fetches next WD 1584 which includes an indication of work to be done by one or more graphics processing engines of graphics acceleration module 1546. Data from WD 1584 may be stored in registers 1545 and used by a memory management unit ("MMU") 1539, interrupt management circuit 1547 and/or context management circuit 1548 as illustrated. For example, one embodiment of MMU 1539 includes segment/page walk circuitry for accessing segment/page tables 1586 within OS virtual address space 1585. Interrupt management circuit 1547 may process interrupt events ("INT") 1592 received from graphics acceleration module 1546. When performing graphics operations, an effective address 1593 generated by a graphics processing engine is translated to a real address by MMU 1539.

In one embodiment, a same set of registers 1545 are duplicated for each graphics processing engine and/or graphics acceleration module 1546 and may be initialized by a hypervisor or operating system. Each of these duplicated registers may be included in accelerator integration slice 1590. Exemplary registers that may be initialized by a hypervisor are shown in Table 1.

TABLE 1

| Hypervisor Initialized Registers | |
|---|---|
| 1 | Slice Control Register |
| 2 | Real Address (RA) Scheduled Processes Area Pointer |
| 3 | Authority Mask Override Register |
| 4 | Interrupt Vector Table Entry Offset |
| 5 | Interrupt Vector Table Entry Limit |
| 6 | State Register |
| 7 | Logical Partition ID |
| 8 | Real address (RA) Hypervisor Accelerator Utilization Record Pointer |
| 9 | Storage Description Register |

Exemplary registers that may be initialized by an operating system are shown in Table 2.

TABLE 2

| Operating System Initialized Registers | |
|---|---|
| 1 | Process and Thread Identification |
| 2 | Effective Address (EA) Context Save/Restore Pointer |
| 3 | Virtual Address (VA) Accelerator Utilization Record Pointer |
| 4 | Virtual Address (VA) Storage Segment Table Pointer |

TABLE 2-continued

| Operating System Initialized Registers | |
|---|---|
| 5 | Authority Mask |
| 6 | Work descriptor |

In one embodiment, each WD 1584 is specific to a particular graphics acceleration module 1546 and/or a particular graphics processing engine. It contains all information required by a graphics processing engine to do work or it can be a pointer to a memory location where an application has set up a command queue of work to be completed.

In at least one embodiment, at least one component shown or described with respect to FIG. 15 is utilized to implement techniques and/or functions described in connection with FIGS. 1-6. In at least one embodiment, at least one component of FIG. 15 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 15 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 16A:
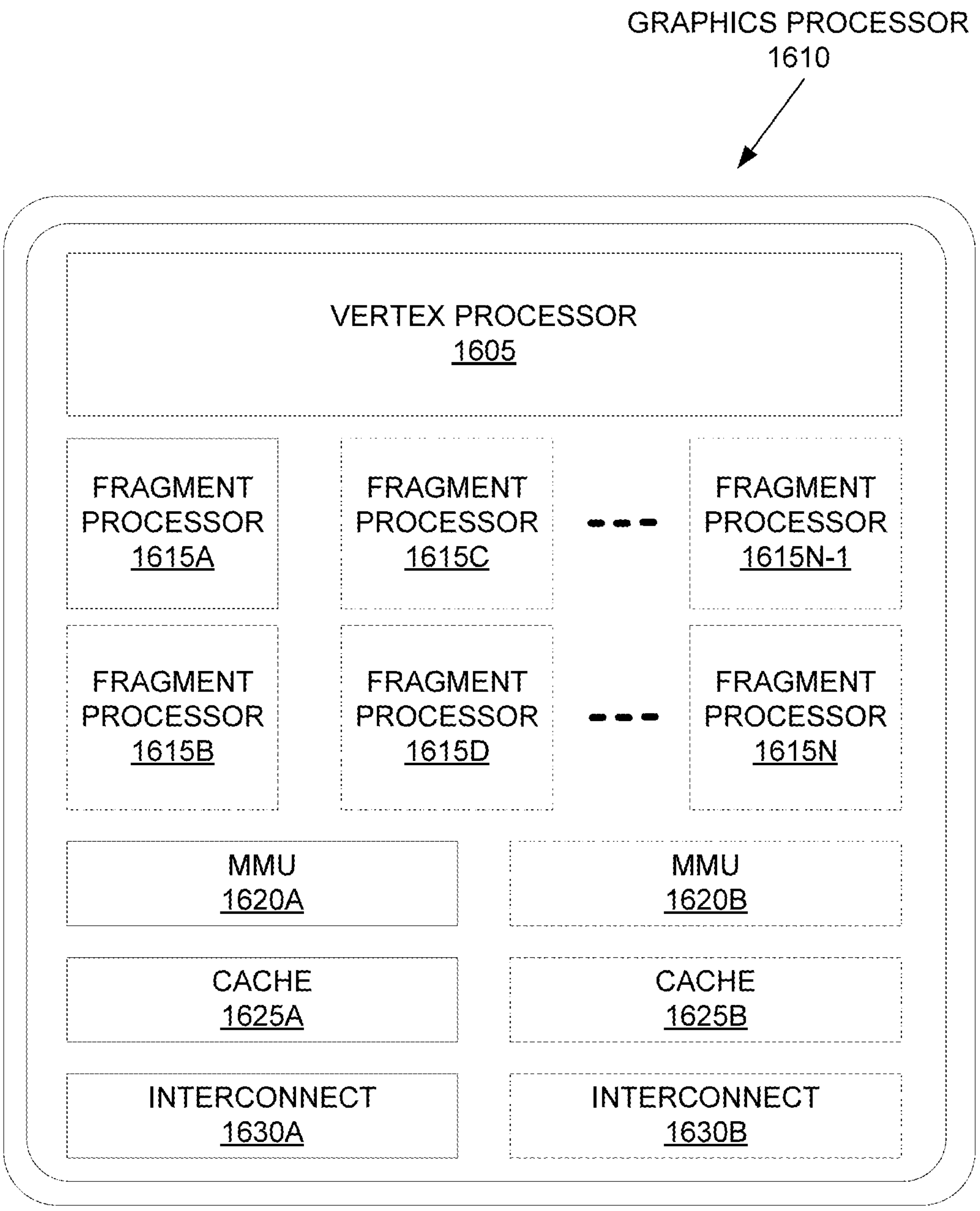
FIGS. 16A-16B illustrate exemplary graphics processors, in accordance with at least one embodiment.
Figure 16B:
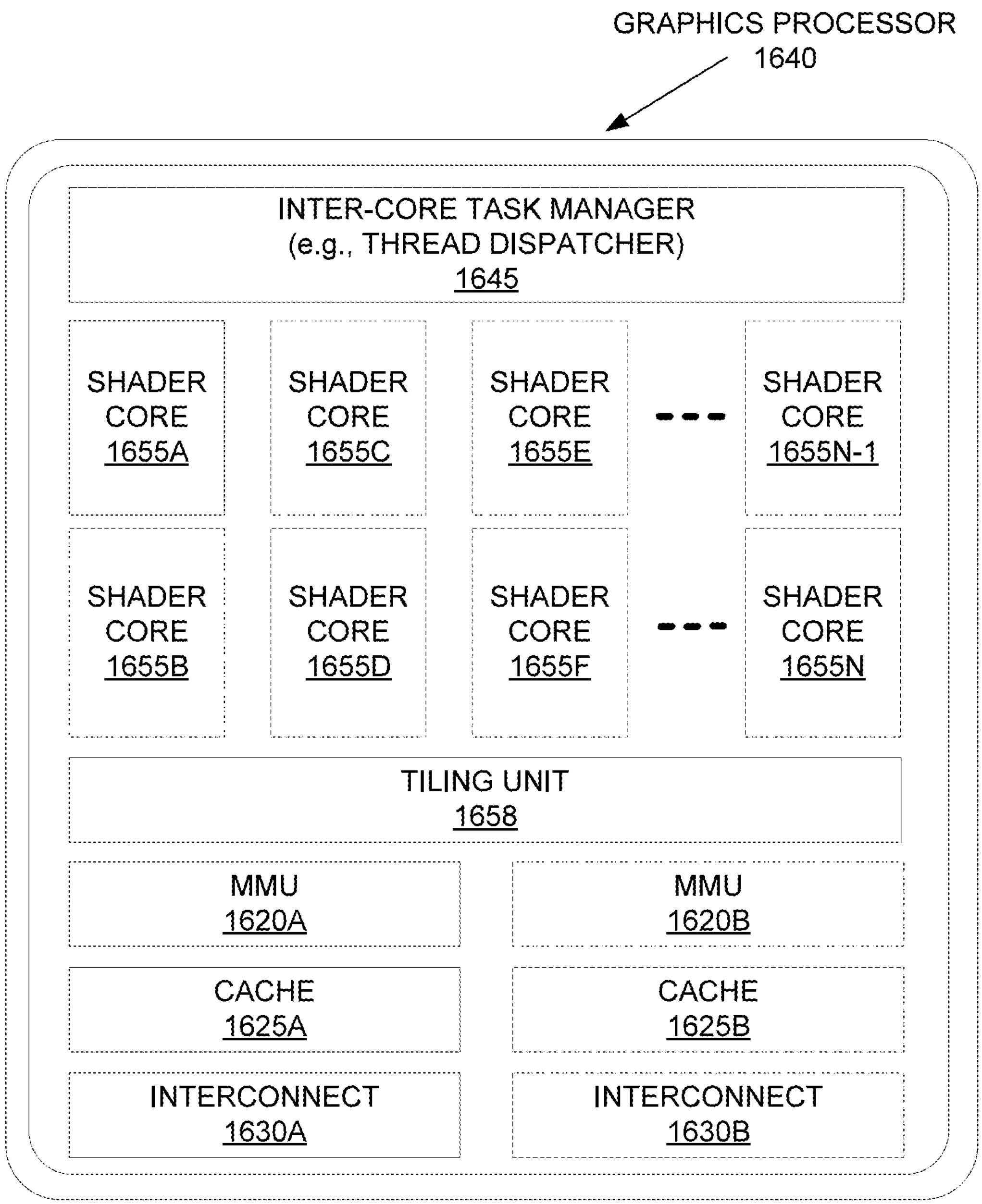

FIGS. 16A-16B illustrate exemplary graphics processors, in accordance with at least one embodiment. In at least one embodiment, any of the exemplary graphics processors may be fabricated using one or more IP cores. In addition to what is illustrated, other logic and circuits may be included in at least one embodiment, including additional graphics processors/cores, peripheral interface controllers, or general-purpose processor cores. In at least one embodiment, the exemplary graphics processors are for use within an SoC.

FIG. 16A illustrates an exemplary graphics processor 1610 of an SoC integrated circuit that may be fabricated using one or more IP cores, in accordance with at least one embodiment. FIG. 16B illustrates an additional exemplary graphics processor 1640 of an SoC integrated circuit that may be fabricated using one or more IP cores, in accordance with at least one embodiment. In at least one embodiment, graphics processor 1610 of FIG. 16A is a low power graphics processor core. In at least one embodiment, graphics processor 1640 of FIG. 16B is a higher performance graphics processor core. In at least one embodiment, each of graphics processors 1610, 1640 can be variants of graphics processor 1110 of FIG. 11.

In at least one embodiment, graphics processor 1610 includes a vertex processor 1605 and one or more fragment processor(s) 1615A-1615N (e.g., 1615A, 1615B, 1615C, 1615D, through 1615N-1, and 1615N). In at least one embodiment, graphics processor 1610 can execute different shader programs via separate logic, such that vertex processor 1605 is optimized to execute operations for vertex shader programs, while one or more fragment processor(s) 1615A-1615N execute fragment (e.g., pixel) shading operations for fragment or pixel shader programs. In at least one embodiment, vertex processor 1605 performs a vertex processing stage of a 3D graphics pipeline and generates primitives and vertex data. In at least one embodiment, fragment processor(s) 1615A-1615N use primitive and vertex data generated by vertex processor 1605 to produce a framebuffer that is displayed on a display device. In at least one embodiment, fragment processor(s) 1615A-1615N are optimized to execute fragment shader programs as provided for in an OpenGL API, which may be used to perform similar operations as a pixel shader program as provided for in a Direct 3D API.

In at least one embodiment, graphics processor 1610 additionally includes one or more MMU(s) 1620A-1620B, cache(s) 1625A-1625B, and circuit interconnect(s) 1630A-1630B. In at least one embodiment, one or more MMU(s) 1620A-1620B provide for virtual to physical address mapping for graphics processor 1610, including for vertex processor 1605 and/or fragment processor(s) 1615A-1615N, which may reference vertex or image/texture data stored in memory, in addition to vertex or image/texture data stored in one or more cache(s) 1625A-1625B. In at least one embodiment, one or more MMU(s) 1620A-1620B may be synchronized with other MMUs within a system, including one or more MMUs associated with one or more application processor(s) 1105, image processors 1115, and/or video processors 1120 of FIG. 11, such that each processor 1105-1120 can participate in a shared or unified virtual memory system. In at least one embodiment, one or more circuit interconnect(s) 1630A-1630B enable graphics processor 1610 to interface with other IP cores within an SoC, either via an internal bus of the SoC or via a direct connection.

In at least one embodiment, graphics processor 1640 includes one or more MMU(s) 1620A-1620B, caches 1625A-1625B, and circuit interconnects 1630A-1630B of graphics processor 1610 of FIG. 16A. In at least one embodiment, graphics processor 1640 includes one or more shader core(s) 1655A-1655N (e.g., 1655A, 1655B, 1655C, 1655D, 1655E, 1655F, through 1655N-1, and 1655N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1640 includes an inter-core task manager 1645, which acts as a thread dispatcher to dispatch execution threads to one or more shader cores 1655A-1655N and a tiling unit 1658 to accelerate tiling operations for tile-based rendering, in which rendering operations for a scene are subdivided in image space, for example to exploit local spatial coherence within a scene or to optimize use of internal caches.

In at least one embodiment, at least one component shown or described with respect to FIGS. 16A-16B is utilized to implement techniques and/or functions described in connection with FIGS. 1-6. In at least one embodiment, at least one component of FIGS. 16A-16B is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIGS. 16A-16B performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 17A:
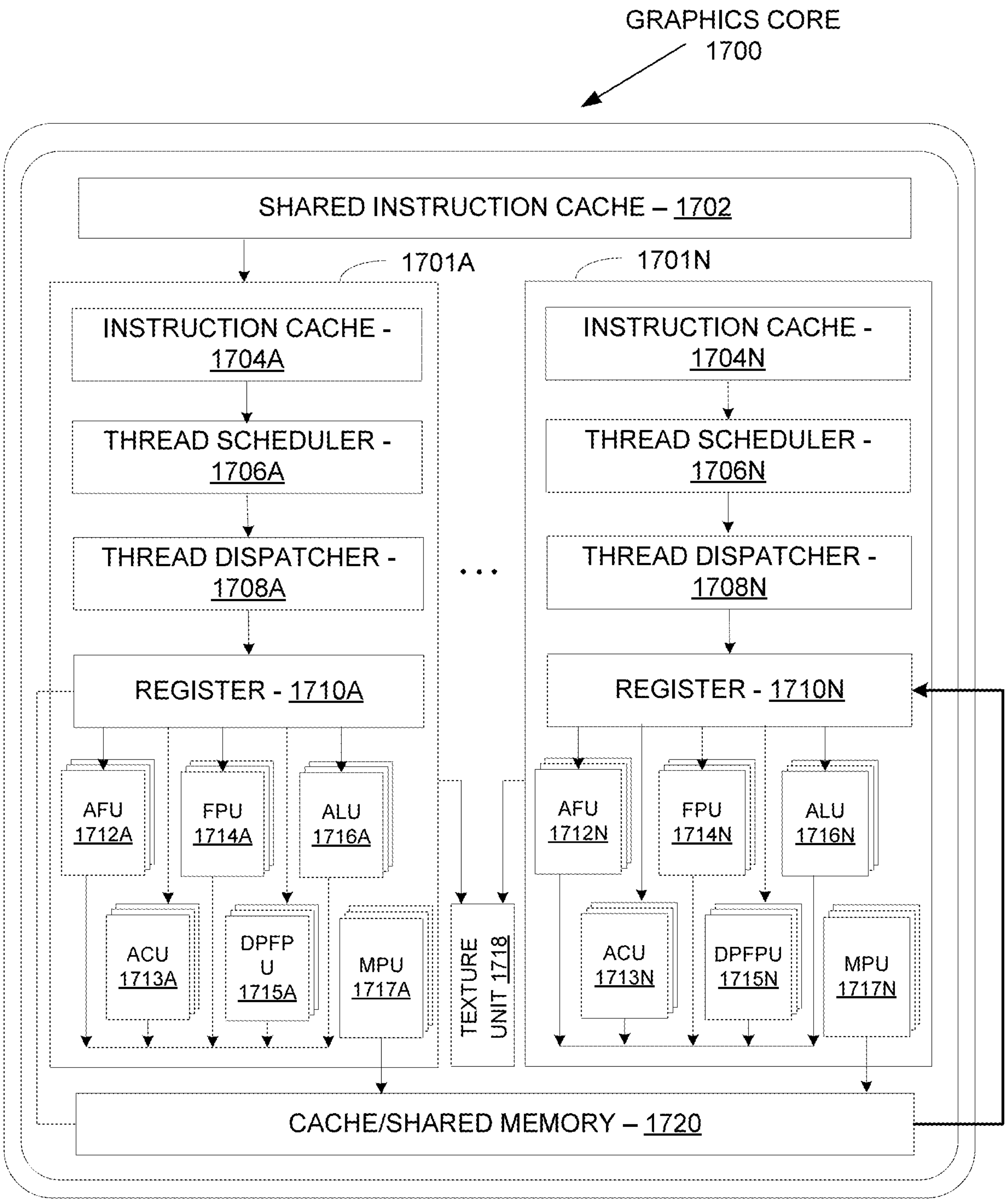
FIG. 17A illustrates a graphics core, in accordance with at least one embodiment.

FIG. 17A illustrates a graphics core 1700, in accordance with at least one embodiment. In at least one embodiment, graphics core 1700 may be included within graphics processor 1110 of FIG. 11. In at least one embodiment, graphics core 1700 may be a unified shader core 1655A-1655N as in FIG. 16B. In at least one embodiment, graphics core 1700 includes a shared instruction cache 1702, a texture unit 1718, and a cache/shared memory 1720 that are common to execution resources within graphics core 1700. In at least one embodiment, graphics core 1700 can include multiple slices 1701A-1701N or partition for each core, and a graphics processor can include multiple instances of graphics core 1700. Slices 1701A-1701N can include support logic including a local instruction cache 1704A-1704N, a thread scheduler 1706A-1706N, a thread dispatcher 1708A-1708N, and a set of registers 1710A-1710N. In at least one embodiment, slices 1701A-1701N can include a set of additional function units ("AFUs") 1712A-1712N, floating-point units ("FPUs") 1714A-1714N, integer arithmetic logic units ("ALUs") 1716-1716N, address computational units ("ACUs") 1713A-1713N, double-precision floating-point units ("DPFPUs") 1715A-1715N, and matrix processing units ("MPUs") 1717A-1717N. In at least one embodiment, a graphics core 1700 is referred to as a compute unit or computing unit.

In at least one embodiment, FPUs 1714A-1714N can perform single-precision (32-bit) and half-precision (16-bit) floating point operations, while DPFPUs 1715A-1715N perform double precision (64-bit) floating point operations. In at least one embodiment, ALUs 1716A-1716N can perform variable precision integer operations at 8-bit, 16-bit, and 32-bit precision, and can be configured for mixed precision operations. In at least one embodiment, MPUs 1717A-1717N can also be configured for mixed precision matrix operations, including half-precision floating point and 8-bit integer operations. In at least one embodiment, MPUs 1717-1717N can perform a variety of matrix operations to accelerate CUDA programs, including enabling support for accelerated general matrix to matrix multiplication ("GEMM"). In at least one embodiment, AFUs 1712A-1712N can perform additional logic operations not supported by floating-point or integer units, including trigonometric operations (e.g., Sine, Cosine, etc.).

In at least one embodiment, at least one component shown or described with respect to FIG. 17A is utilized to implement techniques and/or functions described in connection with FIGS. 1-6. In at least one embodiment, at least one component of FIG. 17A is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 17A performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 17B:
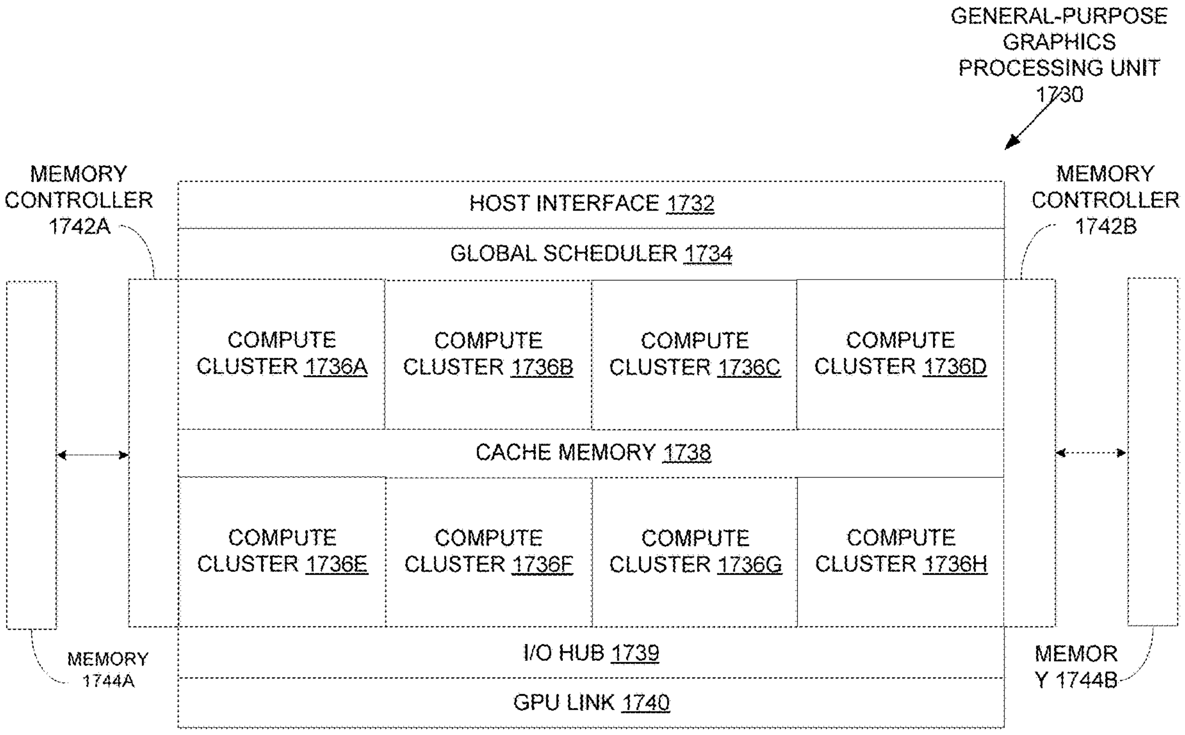
FIG. 17B illustrates a GPGPU, in accordance with at least one embodiment.

FIG. 17B illustrates a general-purpose graphics processing unit ("GPGPU") 1730, in accordance with at least one embodiment. In at least one embodiment, GPGPU 1730 is highly-parallel and suitable for deployment on a multi-chip module. In at least one embodiment, GPGPU 1730 can be configured to enable highly-parallel compute operations to be performed by an array of GPUs. In at least one embodiment, GPGPU 1730 can be linked directly to other instances of GPGPU 1730 to create a multi-GPU cluster to improve execution time for CUDA programs. In at least one embodiment, GPGPU 1730 includes a host interface 1732 to enable a connection with a host processor. In at least one embodiment, host interface 1732 is a PCIe interface. In at least one embodiment, host interface 1732 can be a vendor specific communications interface or communications fabric. In at least one embodiment, GPGPU 1730 receives commands from a host processor and uses a global scheduler 1734 to distribute execution threads associated with those commands to a set of compute clusters 1736A-1736H. In at least one embodiment, compute clusters 1736A-1736H share a cache memory 1738. In at least one embodiment, cache memory 1738 can serve as a higher-level cache for cache memories within compute clusters 1736A-1736H.

In at least one embodiment, GPGPU 1730 includes memory 1744A-1744B coupled with compute clusters 1736A-1736H via a set of memory controllers 1742A-1742B. In at least one embodiment, memory 1744A-1744B can include various types of memory devices including DRAM or graphics random access memory, such as synchronous graphics random access memory ("SGRAM"), including graphics double data rate ("GDDR") memory.

In at least one embodiment, compute clusters 1736A-1736H each include a set of graphics cores, such as graphics core 1700 of FIG. 17A, which can include multiple types of integer and floating point logic units that can perform computational operations at a range of precisions including suited for computations associated with CUDA programs. In at least one embodiment, for example, at least a subset of floating point units in each of compute clusters 1736A-1736H can be configured to perform 16-bit or 32-bit floating point operations, while a different subset of floating point units can be configured to perform 64-bit floating point operations.

In at least one embodiment, multiple instances of GPGPU 1730 can be configured to operate as a compute cluster. Compute clusters 1736A-1736H may implement any technically feasible communication techniques for synchronization and data exchange. In at least one embodiment, multiple instances of GPGPU 1730 communicate over host interface 1732. In at least one embodiment, GPGPU 1730 includes an I/O hub 1739 that couples GPGPU 1730 with a GPU link 1740 that enables a direct connection to other instances of GPGPU 1730. In at least one embodiment, GPU link 1740 is coupled to a dedicated GPU-to-GPU bridge that enables communication and synchronization between multiple instances of GPGPU 1730. In at least one embodiment GPU link 1740 couples with a high speed interconnect to transmit and receive data to other GPGPUs 1730 or parallel processors. In at least one embodiment, multiple instances of GPGPU 1730 are located in separate data processing systems and communicate via a network device that is accessible via host interface 1732. In at least one embodiment GPU link 1740 can be configured to enable a connection to a host processor in addition to or as an alternative to host interface 1732. In at least one embodiment, GPGPU 1730 can be configured to execute a CUDA program.

In at least one embodiment, at least one component shown or described with respect to FIG. 17B is utilized to implement techniques and/or functions described in connection with FIGS. 1-6. In at least one embodiment, at least one component of FIG. 17B is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 17B performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 18A:
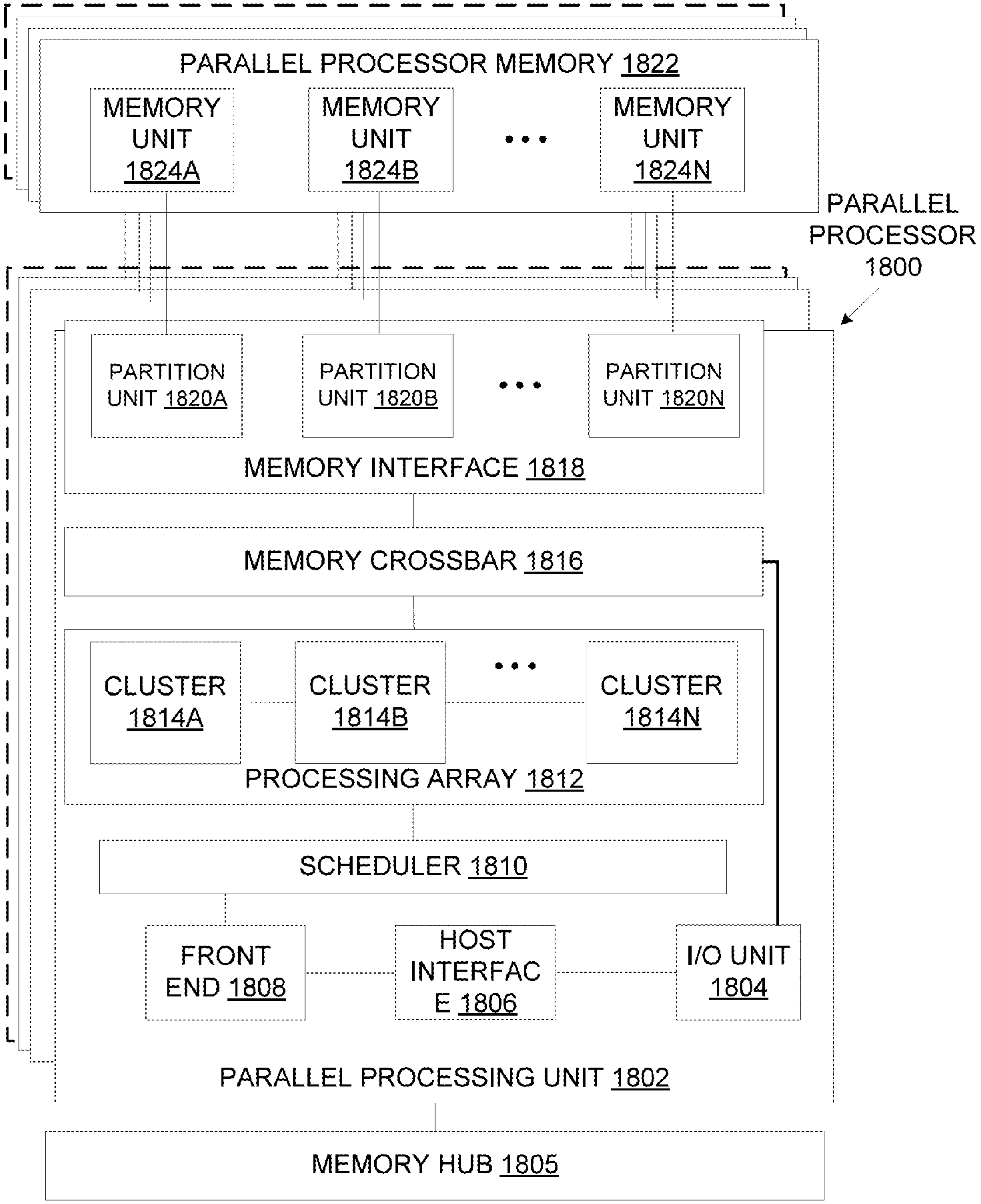
FIG. 18A illustrates a parallel processor, in accordance with at least one embodiment.

FIG. 18A illustrates a parallel processor 1800, in accordance with at least one embodiment. In at least one embodiment, various components of parallel processor 1800 may be implemented using one or more integrated circuit devices, such as programmable processors, application specific integrated circuits ("ASICs"), or FPGAs.

In at least one embodiment, parallel processor 1800 includes a parallel processing unit 1802. In at least one embodiment, parallel processing unit 1802 includes an I/O unit 1804 that enables communication with other devices, including other instances of parallel processing unit 1802. In at least one embodiment, I/O unit 1804 may be directly connected to other devices. In at least one embodiment, I/O unit 1804 connects with other devices via use of a hub or switch interface, such as memory hub 1805. In at least one embodiment, connections between memory hub 1805 and I/O unit 1804 form a communication link. In at least one embodiment, I/O unit 1804 connects with a host interface 1806 and a memory crossbar 1816, where host interface 1806 receives commands directed to performing processing operations and memory crossbar 1816 receives commands directed to performing memory operations.

In at least one embodiment, when host interface 1806 receives a command buffer via I/O unit 1804, host interface 1806 can direct work operations to perform those commands to a front end 1808. In at least one embodiment, front end 1808 couples with a scheduler 1810, which is configured to distribute commands or other work items to a processing array 1812. In at least one embodiment, scheduler 1810 ensures that processing array 1812 is properly configured and in a valid state before tasks are distributed to processing array 1812. In at least one embodiment, scheduler 1810 is implemented via firmware logic executing on a microcontroller. In at least one embodiment, microcontroller implemented scheduler 1810 is configurable to perform complex scheduling and work distribution operations at coarse and fine granularity, enabling rapid preemption and context switching of threads executing on processing array 1812. In at least one embodiment, host software can prove workloads for scheduling on processing array 1812 via one of multiple graphics processing doorbells. In at least one embodiment, workloads can then be automatically distributed across processing array 1812 by scheduler 1810 logic within a microcontroller including scheduler 1810.

In at least one embodiment, processing array 1812 can include up to "N" clusters (e.g., cluster 1814A, cluster 1814B, through cluster 1814N). In at least one embodiment, each cluster 1814A-1814N of processing array 1812 can execute a large number of concurrent threads. In at least one embodiment, scheduler 1810 can allocate work to clusters 1814A-1814N of processing array 1812 using various scheduling and/or work distribution algorithms, which may vary depending on the workload arising for each type of program or computation. In at least one embodiment, scheduling can be handled dynamically by scheduler 1810, or can be assisted in part by compiler logic during compilation of program logic configured for execution by processing array 1812. In at least one embodiment, different clusters 1814A-1814N of processing array 1812 can be allocated for processing different types of programs or for performing different types of computations.

In at least one embodiment, processing array 1812 can be configured to perform various types of parallel processing operations. In at least one embodiment, processing array 1812 is configured to perform general-purpose parallel compute operations. For example, in at least one embodiment, processing array 1812 can include logic to execute processing tasks including filtering of video and/or audio data, performing modeling operations, including physics operations, and performing data transformations.

In at least one embodiment, processing array 1812 is configured to perform parallel graphics processing operations. In at least one embodiment, processing array 1812 can include additional logic to support execution of such graphics processing operations, including, but not limited to texture sampling logic to perform texture operations, as well as tessellation logic and other vertex processing logic. In at least one embodiment, processing array 1812 can be configured to execute graphics processing related shader programs such as, but not limited to vertex shaders, tessellation shaders, geometry shaders, and pixel shaders. In at least one embodiment, parallel processing unit 1802 can transfer data from system memory via I/O unit 1804 for processing. In at least one embodiment, during processing, transferred data can be stored to on-chip memory (e.g., a parallel processor memory 1822) during processing, then written back to system memory.

In at least one embodiment, when parallel processing unit 1802 is used to perform graphics processing, scheduler 1810 can be configured to divide a processing workload into approximately equal sized tasks, to better enable distribution of graphics processing operations to multiple clusters 1814A-1814N of processing array 1812. In at least one embodiment, portions of processing array 1812 can be configured to perform different types of processing. In at least one embodiment, for example, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 1814A-1814N may be stored in buffers to allow intermediate data to be transmitted between clusters 1814A-1814N for further processing.

In at least one embodiment, processing array 1812 can receive processing tasks to be executed via scheduler 1810, which receives commands defining processing tasks from front end 1808. In at least one embodiment, processing tasks can include indices of data to be processed, e.g., surface (patch) data, primitive data, vertex data, and/or pixel data, as well as state parameters and commands defining how data is to be processed (e.g., what program is to be executed). In at least one embodiment, scheduler 1810 may be configured to fetch indices corresponding to tasks or may receive indices from front end 1808. In at least one embodiment, front end 1808 can be configured to ensure processing array 1812 is configured to a valid state before a workload specified by incoming command buffers (e.g., batch-buffers, push buffers, etc.) is initiated.

In at least one embodiment, each of one or more instances of parallel processing unit 1802 can couple with parallel processor memory 1822. In at least one embodiment, parallel processor memory 1822 can be accessed via memory crossbar 1816, which can receive memory requests from processing array 1812 as well as I/O unit 1804. In at least one embodiment, memory crossbar 1816 can access parallel processor memory 1822 via a memory interface 1818. In at least one embodiment, memory interface 1818 can include multiple partition units (e.g., a partition unit 1820A, partition unit 1820B, through partition unit 1820N) that can each couple to a portion (e.g., memory unit) of parallel processor memory 1822. In at least one embodiment, a number of partition units 1820A-1820N is configured to be equal to a number of memory units, such that a first partition unit 1820A has a corresponding first memory unit 1824A, a second partition unit 1820B has a corresponding memory unit 1824B, and an Nth partition unit 1820N has a corresponding Nth memory unit 1824N. In at least one embodiment, a number of partition units 1820A-1820N may not be equal to a number of memory devices.

In at least one embodiment, memory units 1824A-1824N can include various types of memory devices, including DRAM or graphics random access memory, such as SGRAM, including GDDR memory. In at least one embodiment, memory units 1824A-1824N may also include 3D stacked memory, including but not limited to high bandwidth memory ("HBM"). In at least one embodiment, render targets, such as frame buffers or texture maps may be stored across memory units 1824A-1824N, allowing partition units 1820A-1820N to write portions of each render target in parallel to efficiently use available bandwidth of parallel processor memory 1822. In at least one embodiment, a local instance of parallel processor memory 1822 may be excluded in favor of a unified memory design that utilizes system memory in conjunction with local cache memory.

In at least one embodiment, any one of clusters 1814A-1814N of processing array 1812 can process data that will be written to any of memory units 1824A-1824N within parallel processor memory 1822. In at least one embodiment, memory crossbar 1816 can be configured to transfer an output of each cluster 1814A-1814N to any partition unit 1820A-1820N or to another cluster 1814A-1814N, which can perform additional processing operations on an output. In at least one embodiment, each cluster 1814A-1814N can communicate with memory interface 1818 through memory crossbar 1816 to read from or write to various external memory devices. In at least one embodiment, memory crossbar 1816 has a connection to memory interface 1818 to communicate with I/O unit 1804, as well as a connection to a local instance of parallel processor memory 1822, enabling processing units within different clusters 1814A-1814N to communicate with system memory or other memory that is not local to parallel processing unit 1802. In at least one embodiment, memory crossbar 1816 can use virtual channels to separate traffic streams between clusters 1814A-1814N and partition units 1820A-1820N.

In at least one embodiment, multiple instances of parallel processing unit 1802 can be provided on a single add-in card, or multiple add-in cards can be interconnected. In at least one embodiment, different instances of parallel processing unit 1802 can be configured to inter-operate even if different instances have different numbers of processing cores, different amounts of local parallel processor memory, and/or other configuration differences. In at least one embodiment, for example, some instances of parallel processing unit 1802 can include higher precision floating point units relative to other instances. In at least one embodiment, systems incorporating one or more instances of parallel processing unit 1802 or parallel processor 1800 can be implemented in a variety of configurations and form factors, including but not limited to desktop, laptop, or handheld personal computers, servers, workstations, game consoles, and/or embedded systems.

In at least one embodiment, at least one component shown or described with respect to FIG. 18A is utilized to implement techniques and/or functions described in connection with FIGS. 1-6. In at least one embodiment, at least one component of FIG. 18A is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 18A performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 18B:
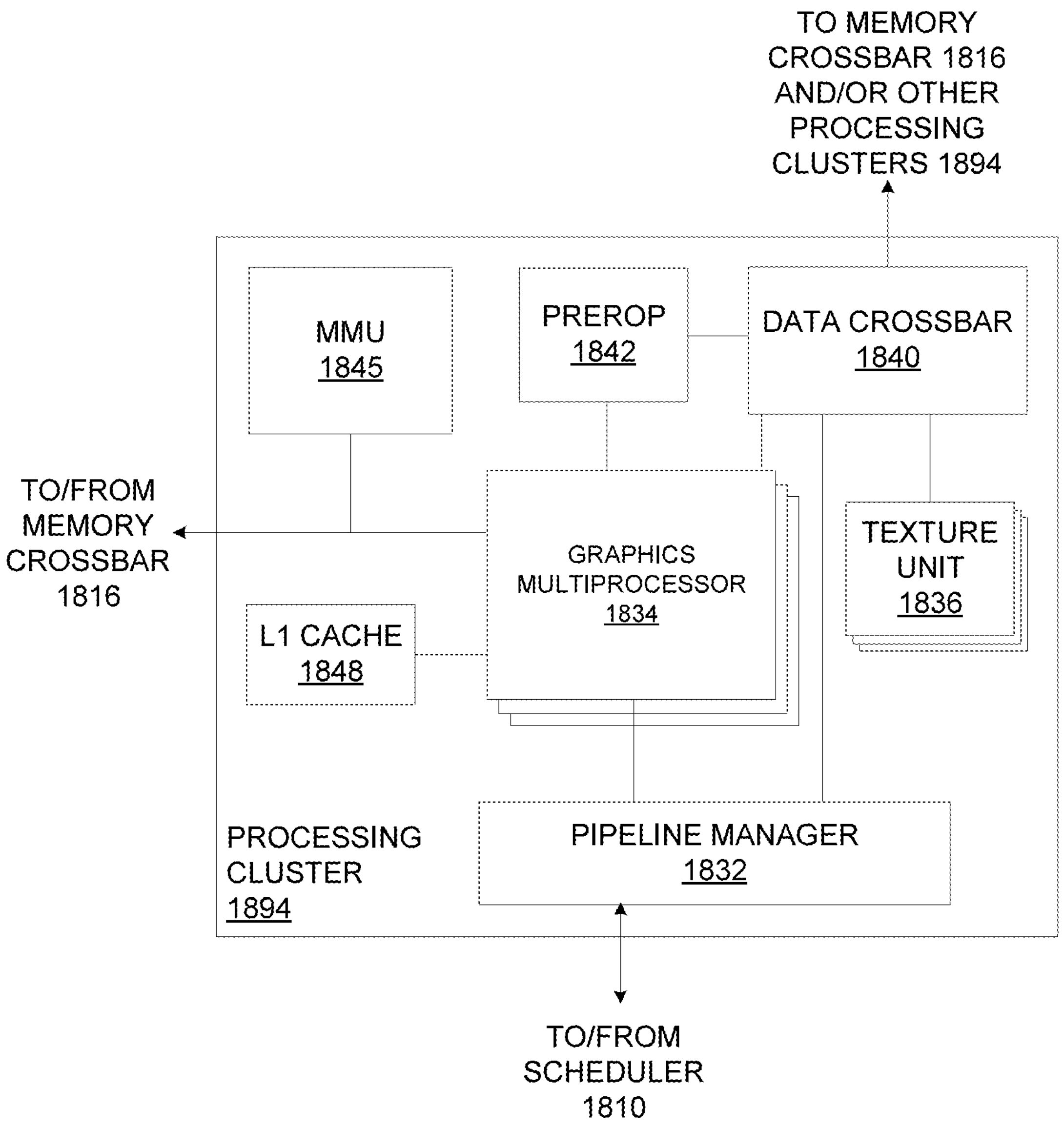
FIG. 18B illustrates a processing cluster, in accordance with at least one embodiment.

FIG. 18B illustrates a processing cluster 1894, in accordance with at least one embodiment. In at least one embodiment, processing cluster 1894 is included within a parallel processing unit. In at least one embodiment, processing cluster 1894 is one of processing clusters 1814A-1814N of FIG. 18. In at least one embodiment, processing cluster 1894 can be configured to execute many threads in parallel, where the term "thread" refers to an instance of a particular program executing on a particular set of input data. In at least one embodiment, single instruction, multiple data ("SIMD") instruction issue techniques are used to support parallel execution of a large number of threads without providing multiple independent instruction units. In at least one embodiment, single instruction, multiple thread ("SIMT") techniques are used to support parallel execution of a large number of generally synchronized threads, using a common instruction unit configured to issue instructions to a set of processing engines within each processing cluster 1894.

In at least one embodiment, operation of processing cluster 1894 can be controlled via a pipeline manager 1832 that distributes processing tasks to SIMT parallel processors. In at least one embodiment, pipeline manager 1832 receives instructions from scheduler 1810 of FIG. 18 and manages execution of those instructions via a graphics multiprocessor 1834 and/or a texture unit 1836. In at least one embodiment, graphics multiprocessor 1834 is an exemplary instance of a SIMT parallel processor. However, in at least one embodiment, various types of SIMT parallel processors of differing architectures may be included within processing cluster 1894. In at least one embodiment, one or more instances of graphics multiprocessor 1834 can be included within processing cluster 1894. In at least one embodiment, graphics multiprocessor 1834 can process data and a data crossbar 1840 can be used to distribute processed data to one of multiple possible destinations, including other shader units. In at least one embodiment, pipeline manager 1832 can facilitate distribution of processed data by specifying destinations for processed data to be distributed via data crossbar 1840.

In at least one embodiment, each graphics multiprocessor 1834 within processing cluster 1894 can include an identical set of functional execution logic (e.g., arithmetic logic units, load/store units ("LSUs"), etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, same functional-unit hardware can be leveraged to perform different operations and any combination of functional units may be present.

In at least one embodiment, instructions transmitted to processing cluster 1894 constitute a thread. In at least one embodiment, a set of threads executing across a set of parallel processing engines is a thread group. In at least one embodiment, a thread group executes a program on different input data. In at least one embodiment, each thread within a thread group can be assigned to a different processing engine within graphics multiprocessor 1834. In at least one embodiment, a thread group may include fewer threads than a number of processing engines within graphics multiprocessor 1834. In at least one embodiment, when a thread group includes fewer threads than a number of processing engines, one or more of the processing engines may be idle during cycles in which that thread group is being processed. In at least one embodiment, a thread group may also include more threads than a number of processing engines within graphics multiprocessor 1834. In at least one embodiment, when a thread group includes more threads than the number of processing engines within graphics multiprocessor 1834, processing can be performed over consecutive clock cycles. In at least one embodiment, multiple thread groups can be executed concurrently on graphics multiprocessor 1834.

In at least one embodiment, graphics multiprocessor 1834 includes an internal cache memory to perform load and store operations. In at least one embodiment, graphics multiprocessor 1834 can forego an internal cache and use a cache memory (e.g., L1 cache 1848) within processing cluster 1894. In at least one embodiment, each graphics multiprocessor 1834 also has access to Level 2 ("L2") caches within partition units (e.g., partition units 1820A-1820N of FIG. 18A) that are shared among all processing clusters 1894 and may be used to transfer data between threads. In at least one embodiment, graphics multiprocessor 1834 may also access off-chip global memory, which can include one or more of local parallel processor memory and/or system memory. In at least one embodiment, any memory external to parallel processing unit 1802 may be used as global memory. In at least one embodiment, processing cluster 1894 includes multiple instances of graphics multiprocessor 1834 that can share common instructions and data, which may be stored in L1 cache 1848.

In at least one embodiment, each processing cluster 1894 may include an MMU 1845 that is configured to map virtual addresses into physical addresses. In at least one embodiment, one or more instances of MMU 1845 may reside within memory interface 1818 of FIG. 18. In at least one embodiment, MMU 1845 includes a set of page table entries ("PTEs") used to map a virtual address to a physical address of a tile and optionally a cache line index. In at least one embodiment, MMU 1845 may include address translation lookaside buffers ("TLBs") or caches that may reside within graphics multiprocessor 1834 or L1 cache 1848 or processing cluster 1894. In at least one embodiment, a physical address is processed to distribute surface data access locality to allow efficient request interleaving among partition units. In at least one embodiment, a cache line index may be used to determine whether a request for a cache line is a hit or miss.

In at least one embodiment, processing cluster 1894 may be configured such that each graphics multiprocessor 1834 is coupled to a texture unit 1836 for performing texture mapping operations, e.g., determining texture sample positions, reading texture data, and filtering texture data. In at least one embodiment, texture data is read from an internal texture L1 cache (not shown) or from an L1 cache within graphics multiprocessor 1834 and is fetched from an L2 cache, local parallel processor memory, or system memory, as needed. In at least one embodiment, each graphics multiprocessor 1834 outputs a processed task to data crossbar 1840 to provide the processed task to another processing cluster 1894 for further processing or to store the processed task in an L2 cache, a local parallel processor memory, or a system memory via memory crossbar 1816. In at least one embodiment, a pre-raster operations unit ("preROP") 1842 is configured to receive data from graphics multiprocessor 1834, direct data to ROP units, which may be located with partition units as described herein (e.g., partition units 1820A-1820N of FIG. 18). In at least one embodiment, PreROP 1842 can perform optimizations for color blending, organize pixel color data, and perform address translations.

In at least one embodiment, at least one component shown or described with respect to FIG. 18B is utilized to implement techniques and/or functions described in connection with FIGS. 1-6. In at least one embodiment, at least one component of FIG. 18B is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 18B performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 18C:
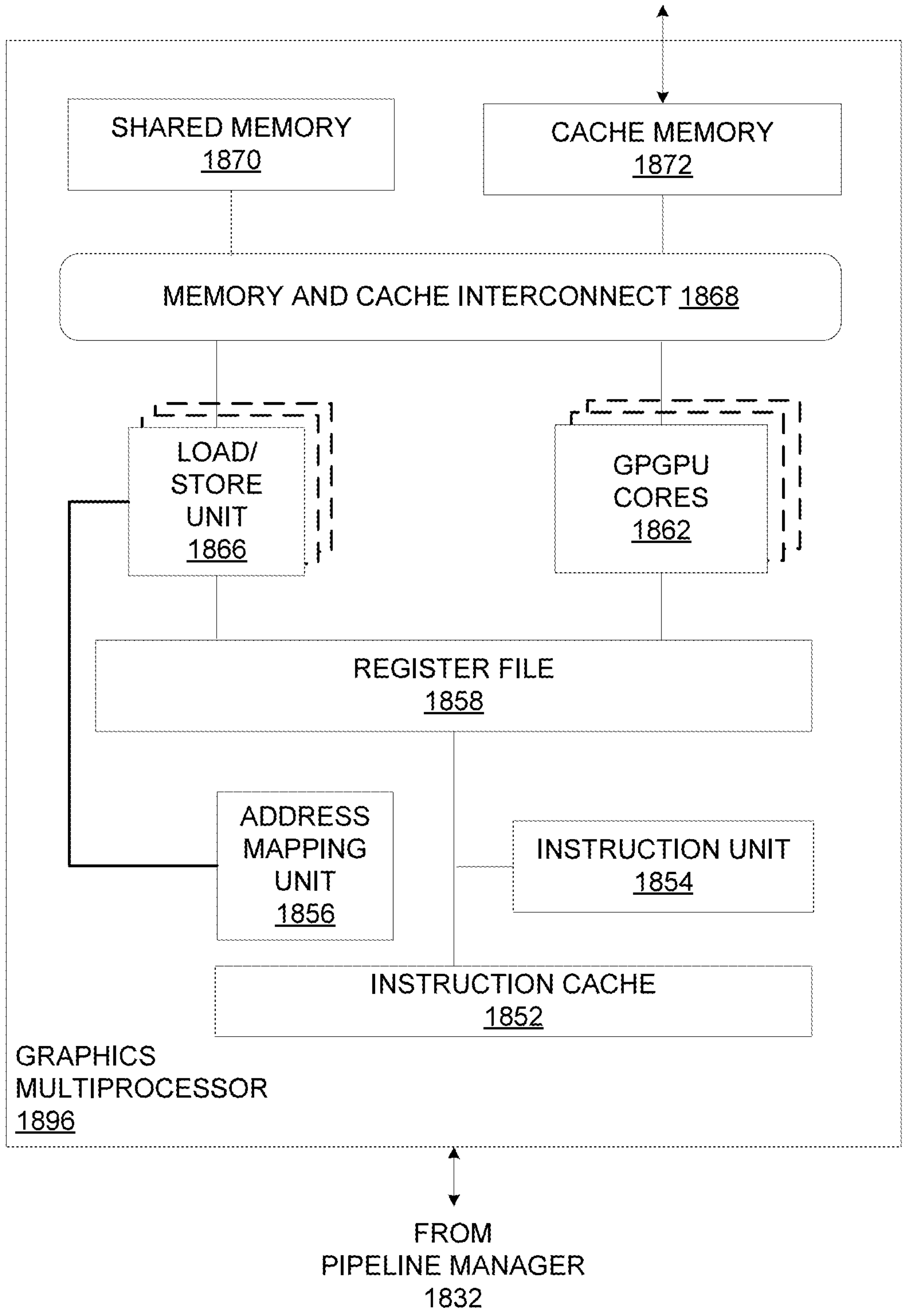
FIG. 18C illustrates a graphics multiprocessor, in accordance with at least one embodiment.

FIG. 18C illustrates a graphics multiprocessor 1896, in accordance with at least one embodiment. In at least one embodiment, graphics multiprocessor 1896 is graphics multiprocessor 1834 of FIG. 18B. In at least one embodiment, graphics multiprocessor 1896 couples with pipeline manager 1832 of processing cluster 1894. In at least one embodiment, graphics multiprocessor 1896 has an execution pipeline including but not limited to an instruction cache 1852, an instruction unit 1854, an address mapping unit 1856, a register file 1858, one or more GPGPU cores 1862, and one or more LSUs 1866. GPGPU cores 1862 and LSUs 1866 are coupled with cache memory 1872 and shared memory 1870 via a memory and cache interconnect 1868.

In at least one embodiment, instruction cache 1852 receives a stream of instructions to execute from pipeline manager 1832. In at least one embodiment, instructions are cached in instruction cache 1852 and dispatched for execution by instruction unit 1854. In at least one embodiment, instruction unit 1854 can dispatch instructions as thread groups (e.g., warps), with each thread of a thread group assigned to a different execution unit within GPGPU core 1862. In at least one embodiment, an instruction can access any of a local, shared, or global address space by specifying an address within a unified address space. In at least one embodiment, address mapping unit 1856 can be used to translate addresses in a unified address space into a distinct memory address that can be accessed by LSUs 1866.

In at least one embodiment, register file 1858 provides a set of registers for functional units of graphics multiprocessor 1896. In at least one embodiment, register file 1858 provides temporary storage for operands connected to data paths of functional units (e.g., GPGPU cores 1862, LSUs 1866) of graphics multiprocessor 1896. In at least one embodiment, register file 1858 is divided between each of functional units such that each functional unit is allocated a dedicated portion of register file 1858. In at least one embodiment, register file 1858 is divided between different thread groups being executed by graphics multiprocessor 1896.

In at least one embodiment, GPGPU cores 1862 can each include FPUs and/or integer ALUs that are used to execute instructions of graphics multiprocessor 1896. GPGPU cores 1862 can be similar in architecture or can differ in architecture. In at least one embodiment, a first portion of GPGPU cores 1862 include a single precision FPU and an integer ALU while a second portion of GPGPU cores 1862 include a double precision FPU. In at least one embodiment, FPUs can implement IEEE 754-2008 standard for floating point arithmetic or enable variable precision floating point arithmetic. In at least one embodiment, graphics multiprocessor 1896 can additionally include one or more fixed function or special function units to perform specific functions such as copy rectangle or pixel blending operations. In at least one embodiment one or more of GPGPU cores 1862 can also include fixed or special function logic.

In at least one embodiment, GPGPU cores 1862 include SIMD logic capable of performing a single instruction on multiple sets of data. In at least one embodiment GPGPU cores 1862 can physically execute SIMD4, SIMD8, and SIMD16 instructions and logically execute SIMD1, SIMD2, and SIMD32 instructions. In at least one embodiment, SIMD instructions for GPGPU cores 1862 can be generated at compile time by a shader compiler or automatically generated when executing programs written and compiled for single program multiple data ("SPMD") or SIMT architectures. In at least one embodiment, multiple threads of a program configured for an SIMT execution model can executed via a single SIMD instruction. In at least one embodiment, for example, eight SIMT threads that perform the same or similar operations can be executed in parallel via a single SIMD8 logic unit.

In at least one embodiment, memory and cache interconnect 1868 is an interconnect network that connects each functional unit of graphics multiprocessor 1896 to register file 1858 and to shared memory 1870. In at least one embodiment, memory and cache interconnect 1868 is a crossbar interconnect that allows LSU 1866 to implement load and store operations between shared memory 1870 and register file 1858. In at least one embodiment, register file 1858 can operate at a same frequency as GPGPU cores 1862, thus data transfer between GPGPU cores 1862 and register file 1858 is very low latency. In at least one embodiment, shared memory 1870 can be used to enable communication between threads that execute on functional units within graphics multiprocessor 1896. In at least one embodiment, cache memory 1872 can be used as a data cache for example, to cache texture data communicated between functional units and texture unit 1836. In at least one embodiment, shared memory 1870 can also be used as a program managed cached. In at least one embodiment, threads executing on GPGPU cores 1862 can programmatically store data within shared memory in addition to automatically cached data that is stored within cache memory 1872.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, a GPU may be communicatively coupled to host processor/cores over a bus or other interconnect (e.g., a high speed interconnect such as PCIe or NVLink). In at least one embodiment, a GPU may be integrated on the same package or chip as cores and communicatively coupled to cores over a processor bus/interconnect that is internal to a package or a chip. In at least one embodiment, regardless of the manner in which a GPU is connected, processor cores may allocate work to the GPU in the form of sequences of commands/instructions contained in a WD. In at least one embodiment, the GPU then uses dedicated circuitry/logic for efficiently processing these commands/instructions.

In at least one embodiment, at least one component shown or described with respect to FIG. 18C is utilized to implement techniques and/or functions described in connection with FIGS. 1-6. In at least one embodiment, at least one component of FIG. 18C is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 18C performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 19:
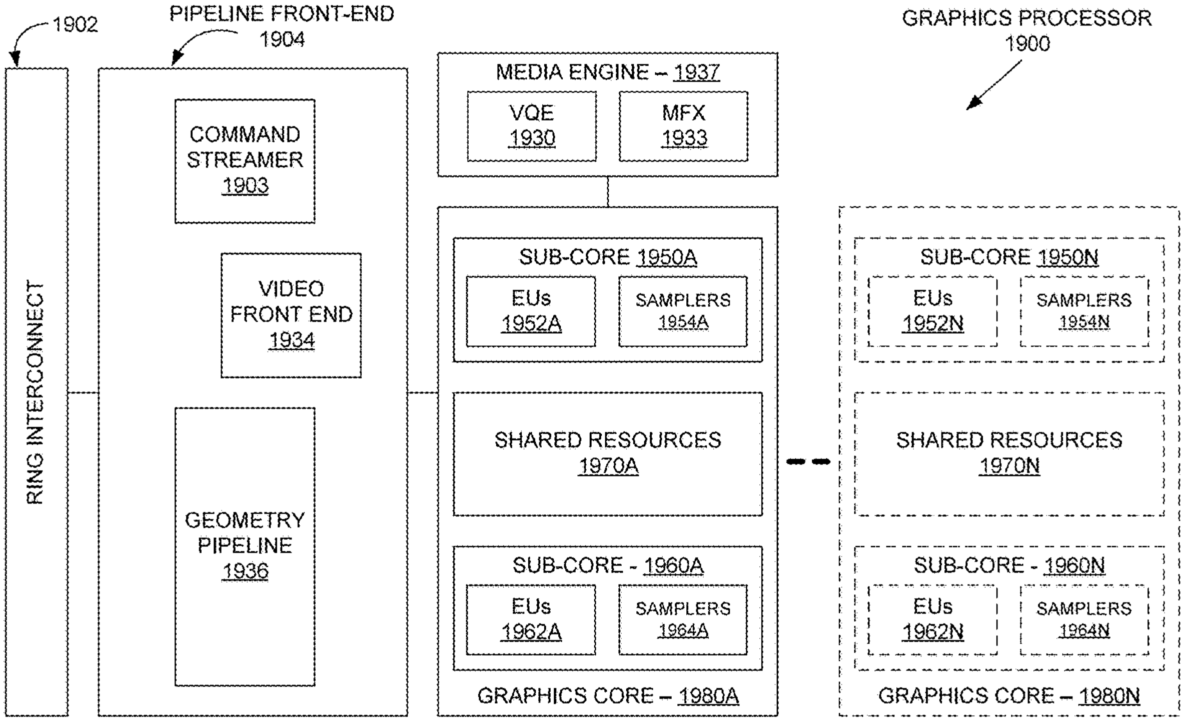
FIG. 19 illustrates a graphics processor, in accordance with at least one embodiment.

FIG. 19 illustrates a graphics processor 1900, in accordance with at least one embodiment. In at least one embodiment, graphics processor 1900 includes a ring interconnect 1902, a pipeline front-end 1904, a media engine 1937, and graphics cores 1980A-1980N. In at least one embodiment, ring interconnect 1902 couples graphics processor 1900 to other processing units, including other graphics processors or one or more general-purpose processor cores. In at least one embodiment, graphics processor 1900 is one of many processors integrated within a multi-core processing system.

In at least one embodiment, graphics processor 1900 receives batches of commands via ring interconnect 1902. In at least one embodiment, incoming commands are interpreted by a command streamer 1903 in pipeline front-end 1904. In at least one embodiment, graphics processor 1900 includes scalable execution logic to perform 3D geometry processing and media processing via graphics core(s) 1980A-1980N. In at least one embodiment, for 3D geometry processing commands, command streamer 1903 supplies commands to geometry pipeline 1936. In at least one embodiment, for at least some media processing commands, command streamer 1903 supplies commands to a video front end 1934, which couples with a media engine 1937. In at least one embodiment, media engine 1937 includes a Video Quality Engine ("VQE") 1930 for video and image post-processing and a multi-format encode/decode ("MFX") engine 1933 to provide hardware-accelerated media data encode and decode. In at least one embodiment, geometry pipeline1936 and media engine1937 each generate execution threads for thread execution resources provided by at least one graphics core 1980A.

In at least one embodiment, graphics processor 1900 includes scalable thread execution resources featuring modular graphics cores 1980A-1980N (sometimes referred to as core slices), each having multiple sub-cores 1950A-550N, 1960A-1960N (sometimes referred to as core sub-slices). In at least one embodiment, graphics processor 1900 can have any number of graphics cores 1980A through 1980N. In at least one embodiment, graphics processor 1900 includes a graphics core 1980A having at least a first sub-core 1950A and a second sub-core 1960A. In at least one embodiment, graphics processor 1900 is a low power processor with a single sub-core (e.g., sub-core 1950A). In at least one embodiment, graphics processor 1900 includes multiple graphics cores 1980A-1980N, each including a set of first sub-cores 1950A-1950N and a set of second sub-cores 1960A-1960N. In at least one embodiment, each sub-core in first sub-cores 1950A-1950N includes at least a first set of execution units ("EUs") 1952A-1952N and media/texture samplers 1954A-1954N. In at least one embodiment, each sub-core in second sub-cores 1960A-1960N includes at least a second set of execution units 1962A-1962N and samplers 1964A-1964N. In at least one embodiment, each sub-core 1950A-1950N, 1960A-1960N shares a set of shared resources 1970A-1970N. In at least one embodiment, shared resources 1970 include shared cache memory and pixel operation logic.

In at least one embodiment, at least one component shown or described with respect to FIG. 19 is utilized to implement techniques and/or functions described in connection with FIGS. 1-6. In at least one embodiment, at least one component of FIG. 19 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 19 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 20:
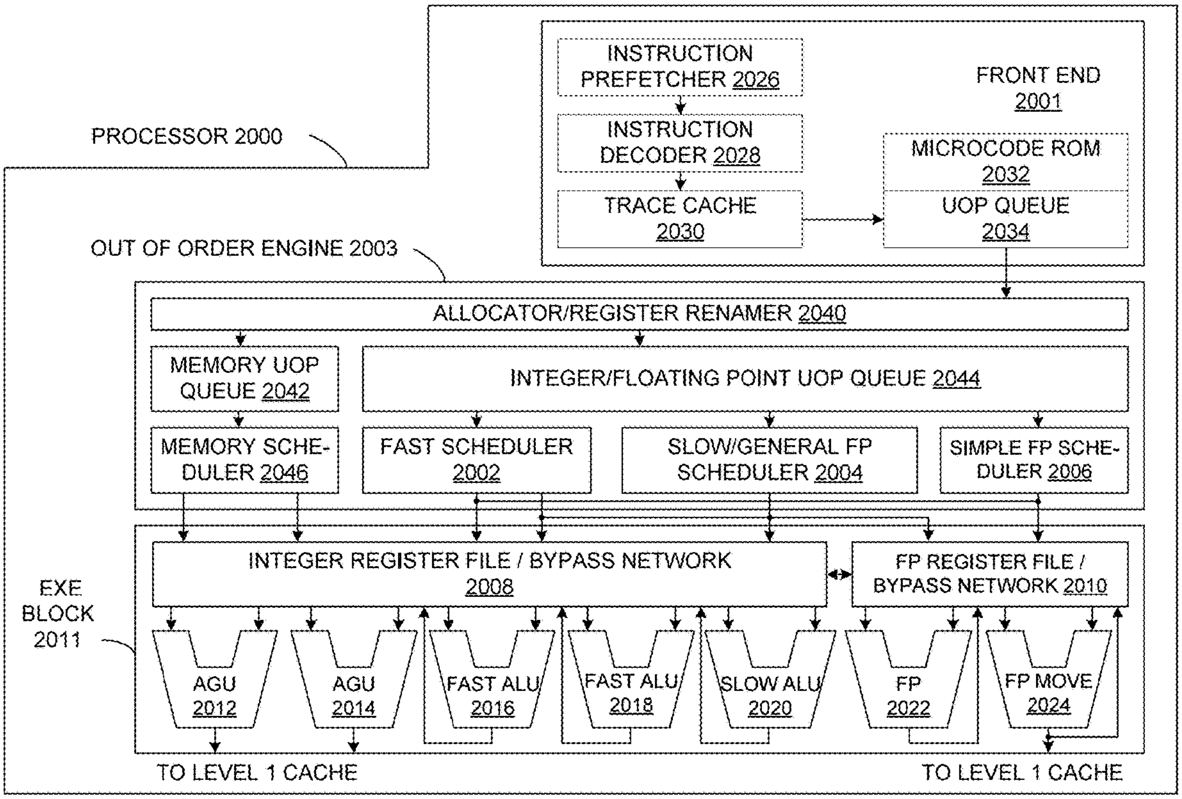
FIG. 20 illustrates a processor, in accordance with at least one embodiment.

FIG. 20 illustrates a processor 2000, in accordance with at least one embodiment. In at least one embodiment, processor 2000 may include, without limitation, logic circuits to perform instructions. In at least one embodiment, processor 2000 may perform instructions, including x86 instructions, ARM instructions, specialized instructions for ASICs, etc. In at least one embodiment, processor 2010 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany SIMD and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 2010 may perform instructions to accelerate CUDA programs.

In at least one embodiment, processor 2000 includes an in-order front end ("front end") 2001 to fetch instructions to be executed and prepare instructions to be used later in processor pipeline. In at least one embodiment, front end 2001 may include several units. In at least one embodiment, an instruction prefetcher 2026 fetches instructions from memory and feeds instructions to an instruction decoder 2028 which in turn decodes or interprets instructions. In at least one embodiment, for example, instruction decoder 2028 decodes a received instruction into one or more operations called "micro-instructions" or "micro-operations" (also called "micro ops" or "uops") for execution. In at least one embodiment, instruction decoder 2028 parses instruction into an opcode and corresponding data and control fields that may be used by micro-architecture to perform operations. In at least one embodiment, a trace cache 2030 may assemble decoded uops into program ordered sequences or traces in a uop queue 2034 for execution. In at least one embodiment, when trace cache 2030 encounters a complex instruction, a microcode ROM 2032 provides uops needed to complete an operation.

In at least one embodiment, some instructions may be converted into a single micro-op, whereas others need several micro-ops to complete full operation. In at least one embodiment, if more than four micro-ops are needed to complete an instruction, instruction decoder 2028 may access microcode ROM 2032 to perform instruction. In at least one embodiment, an instruction may be decoded into a small number of micro-ops for processing at instruction decoder 2028. In at least one embodiment, an instruction may be stored within microcode ROM 2032 should a number of micro-ops be needed to accomplish operation. In at least one embodiment, trace cache 2030 refers to an entry point programmable logic array ("PLA") to determine a correct micro-instruction pointer for reading microcode sequences to complete one or more instructions from microcode ROM 2032. In at least one embodiment, after microcode ROM 2032 finishes sequencing micro-ops for an instruction, front end 2001 of machine may resume fetching micro-ops from trace cache 2030.

In at least one embodiment, out-of-order execution engine ("out of order engine") 2003 may prepare instructions for execution. In at least one embodiment, out-of-order execution logic has a number of buffers to smooth out and re-order the flow of instructions to optimize performance as they go down a pipeline and get scheduled for execution. Out-of-order execution engine 2003 includes, without limitation, an allocator/register renamer 2040, a memory uop queue 2042, an integer/floating point uop queue 2044, a memory scheduler 2046, a fast scheduler 2002, a slow/general floating point scheduler ("slow/general FP scheduler") 2004, and a simple floating point scheduler ("simple FP scheduler") 2006. In at least one embodiment, fast schedule 2002, slow/general floating point scheduler 2004, and simple floating point scheduler 2006 are also collectively referred to herein as "uop schedulers 2002, 2004, 2006." Allocator/register renamer 2040 allocates machine buffers and resources that each uop needs in order to execute. In at least one embodiment, allocator/register renamer 2040 renames logic registers onto entries in a register file. In at least one embodiment, allocator/register renamer 2040 also allocates an entry for each uop in one of two uop queues, memory uop queue 2042 for memory operations and integer/floating point uop queue 2044 for non-memory operations, in front of memory scheduler 2046 and uop schedulers 2002, 2004, 2006. In at least one embodiment, uop schedulers 2002, 2004, 2006, determine when a uop is ready to execute based on readiness of their dependent input register operand sources and availability of execution resources uops need to complete their operation. In at least one embodiment, fast scheduler 2002 of at least one embodiment may schedule on each half of main clock cycle while slow/general floating point scheduler 2004 and simple floating point scheduler 2006 may schedule once per main processor clock cycle. In at least one embodiment, uop schedulers 2002, 2004, 2006 arbitrate for dispatch ports to schedule uops for execution.

In at least one embodiment, execution block 2011 includes, without limitation, an integer register file/bypass network 2008, a floating point register file/bypass network ("FP register file/bypass network") 2010, address generation units ("AGUs") 2012 and 2014, fast ALUs 2016 and 2018, a slow ALU 2020, a floating point ALU ("FP") 2022, and a floating point move unit ("FP move") 2024. In at least one embodiment, integer register file/bypass network 2008 and floating point register file/bypass network 2010 are also referred to herein as "register files 2008, 2010." In at least one embodiment, AGUSs 2012 and 2014, fast ALUs 2016 and 2018, slow ALU 2020, floating point ALU 2022, and floating point move unit 2024 are also referred to herein as "execution units 2012, 2014, 2016, 2018, 2020, 2022, and 2024." In at least one embodiment, an execution block may include, without limitation, any number (including zero) and type of register files, bypass networks, address generation units, and execution units, in any combination.

In at least one embodiment, register files 2008, 2010 may be arranged between uop schedulers 2002, 2004, 2006, and execution units 2012, 2014, 2016, 2018, 2020, 2022, and 2024. In at least one embodiment, integer register file/bypass network 2008 performs integer operations. In at least one embodiment, floating point register file/bypass network 2010 performs floating point operations. In at least one embodiment, each of register files 2008, 2010 may include, without limitation, a bypass network that may bypass or forward just completed results that have not yet been written into register file to new dependent uops. In at least one embodiment, register files 2008, 2010 may communicate data with each other. In at least one embodiment, integer register file/bypass network 2008 may include, without limitation, two separate register files, one register file for low-order thirty-two bits of data and a second register file for high order thirty-two bits of data. In at least one embodiment, floating point register file/bypass network 2010 may include, without limitation, 128-bit wide entries because floating point instructions typically have operands from 64 to 128 bits in width.

In at least one embodiment, execution units 2012, 2014, 2016, 2018, 2020, 2022, 2024 may execute instructions. In at least one embodiment, register files 2008, 2010 store integer and floating point data operand values that micro-instructions need to execute. In at least one embodiment, processor 2000 may include, without limitation, any number and combination of execution units 2012, 2014, 2016, 2018, 2020, 2022, 2024. In at least one embodiment, floating point ALU 2022 and floating point move unit 2024 may execute floating point, MMX, SIMD, AVX and SSE, or other operations. In at least one embodiment, floating point ALU 2022 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2016, 2018. In at least one embodiment, fast ALUS 2016, 2018 may execute fast operations with an effective latency of half a clock cycle. In at least one embodiment, most complex integer operations go to slow ALU 2020 as slow ALU 2020 may include, without limitation, integer execution hardware for long-latency type of operations, such as a multiplier, shifts, flag logic, and branch processing. In at least one embodiment, memory load/store operations may be executed by AGUs 2012, 2014. In at least one embodiment, fast ALU 2016, fast ALU 2018, and slow ALU 2020 may perform integer operations on 64-bit data operands. In at least one embodiment, fast ALU 2016, fast ALU 2018, and slow ALU 2020 may be implemented to support a variety of data bit sizes including sixteen, thirty-two, 128, 256, etc. In at least one embodiment, floating point ALU 2022 and floating point move unit 2024 may be implemented to support a range of operands having bits of various widths. In at least one embodiment, floating point ALU 2022 and floating point move unit 2024 may operate on 128-bit wide packed data operands in conjunction with SIMD and multimedia instructions.

In at least one embodiment, uop schedulers 2002, 2004, 2006 dispatch dependent operations before parent load has finished executing. In at least one embodiment, as uops may be speculatively scheduled and executed in processor 2000, processor 2000 may also include logic to handle memory misses. In at least one embodiment, if a data load misses in a data cache, there may be dependent operations in flight in pipeline that have left a scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanisms of at least one embodiment of a processor may also be designed to catch instruction sequences for text string comparison operations.

In at least one embodiment, the term "registers" may refer to on-board processor storage locations that may be used as part of instructions to identify operands. In at least one embodiment, registers may be those that may be usable from outside of a processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

In at least one embodiment, at least one component shown or described with respect to FIG. 20 is utilized to implement techniques and/or functions described in connection with FIGS. 1-6. In at least one embodiment, at least one component of FIG. 20 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 20 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 21:
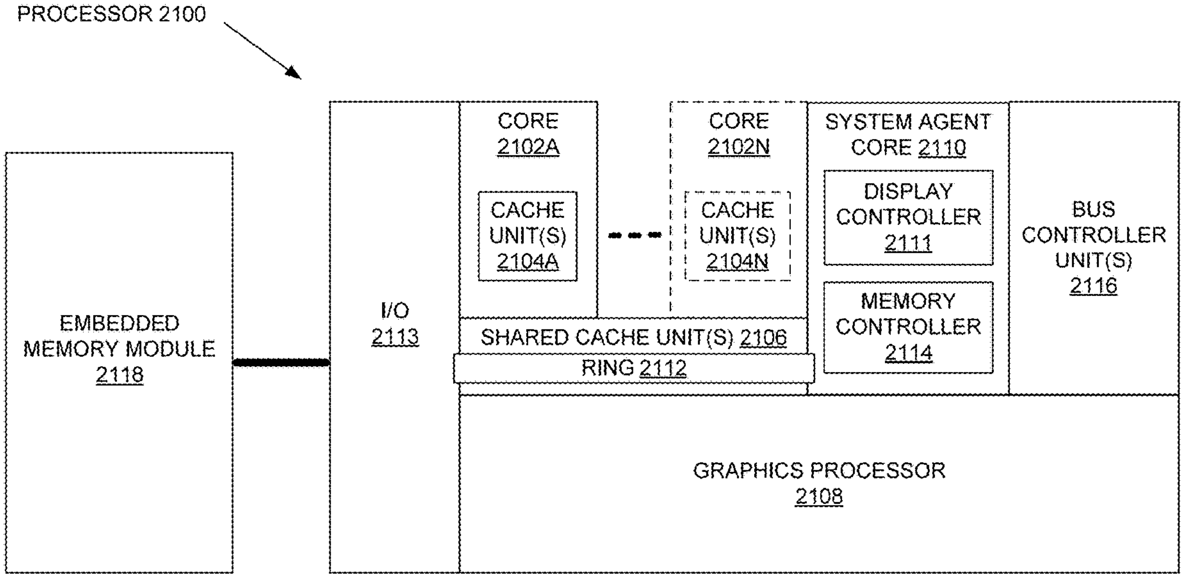
FIG. 21 illustrates a processor, in accordance with at least one embodiment.

FIG. 21 illustrates a processor 2100, in accordance with at least one embodiment. In at least one embodiment, processor 2100 includes, without limitation, one or more processor cores ("cores") 2102A-2102N, an integrated memory controller 2114, and an integrated graphics processor 2108. In at least one embodiment, processor 2100 can include additional cores up to and including additional processor core 2102N represented by dashed lined boxes. In at least one embodiment, each of processor cores 2102A-2102N includes one or more internal cache units 2104A-2104N. In at least one embodiment, each processor core also has access to one or more shared cached units 2106. In at least one embodiment, one or more processor cores 2102A-2102N are referred to as one or more compute units or computing units.

In at least one embodiment, internal cache units 2104A-2104N and shared cache units 2106 represent a cache memory hierarchy within processor 2100. In at least one embodiment, cache memory units 2104A-2104N may include at least one level of instruction and data cache within each processor core and one or more levels of shared mid-level cache, such as an L2, L3, Level 4 ("L4"), or other levels of cache, where a highest level of cache before external memory is classified as an LLC. In at least one embodiment, cache coherency logic maintains coherency between various cache units 2106 and 2104A-2104N.

In at least one embodiment, processor 2100 may also include a set of one or more bus controller units 2116 and a system agent core 2110. In at least one embodiment, one or more bus controller units 2116 manage a set of peripheral buses, such as one or more PCI or PCI express buses. In at least one embodiment, system agent core 2110 provides management functionality for various processor components. In at least one embodiment, system agent core 2110 includes one or more integrated memory controllers 2114 to manage access to various external memory devices (not shown).

In at least one embodiment, one or more of processor cores 2102A-2102N include support for simultaneous multi-threading. In at least one embodiment, system agent core 2110 includes components for coordinating and operating processor cores 2102A-2102N during multi-threaded processing. In at least one embodiment, system agent core 2110 may additionally include a power control unit ("PCU"), which includes logic and components to regulate one or more power states of processor cores 2102A-2102N and graphics processor 2108.

In at least one embodiment, processor 2100 additionally includes graphics processor 2108 to execute graphics processing operations. In at least one embodiment, graphics processor 2108 couples with shared cache units 2106, and system agent core 2110, including one or more integrated memory controllers 2114. In at least one embodiment, system agent core 2110 also includes a display controller 2111 to drive graphics processor output to one or more coupled displays. In at least one embodiment, display controller 2111 may also be a separate module coupled with graphics processor 2108 via at least one interconnect, or may be integrated within graphics processor 2108.

In at least one embodiment, a ring based interconnect unit 2112 is used to couple internal components of processor 2100. In at least one embodiment, an alternative interconnect unit may be used, such as a point-to-point interconnect, a switched interconnect, or other techniques. In at least one embodiment, graphics processor 2108 couples with ring interconnect 2112 via an I/O link 2113.

In at least one embodiment, I/O link 2113 represents at least one of multiple varieties of I/O interconnects, including an on package I/O interconnect which facilitates communication between various processor components and a high-performance embedded memory module 2118, such as an eDRAM module. In at least one embodiment, each of processor cores 2102A-2102N and graphics processor 2108 use embedded memory modules 2118 as a shared LLC.

In at least one embodiment, processor cores 2102A-2102N are homogeneous cores executing a common instruction set architecture. In at least one embodiment, processor cores 2102A-2102N are heterogeneous in terms of ISA, where one or more of processor cores 2102A-2102N execute a common instruction set, while one or more other cores of processor cores 2102A-2102N executes a subset of a common instruction set or a different instruction set. In at least one embodiment, processor cores 2102A-2102N are heterogeneous in terms of microarchitecture, where one or more cores having a relatively higher power consumption couple with one or more cores having a lower power consumption. In at least one embodiment, processor 2100 can be implemented on one or more chips or as an SoC integrated circuit.

In at least one embodiment, at least one component shown or described with respect to FIG. 21 is utilized to implement techniques and/or functions described in connection with FIGS. 1-6. In at least one embodiment, at least one component of FIG. 21 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 21 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 22:
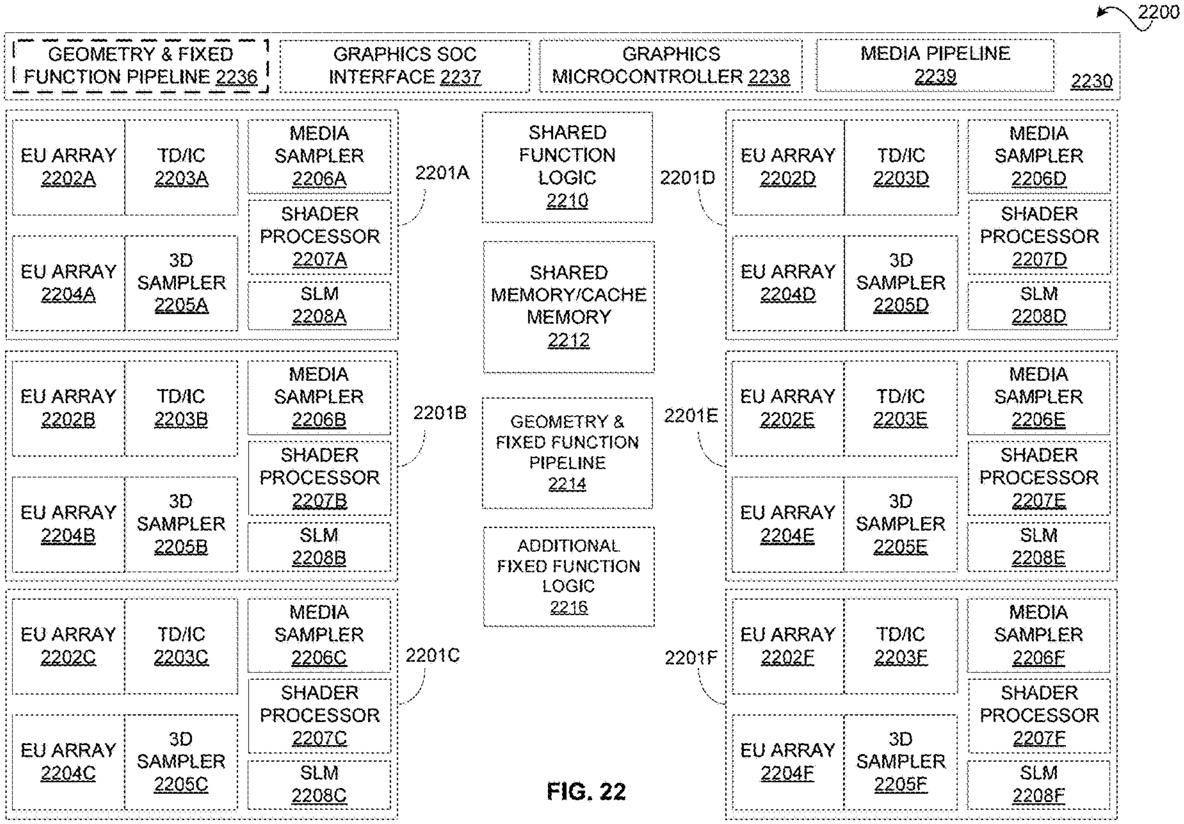
FIG. 22 illustrates a graphics processor core, in accordance with at least one embodiment.

FIG. 22 illustrates a graphics processor core 2200, in accordance with at least one embodiment described. In at least one embodiment, graphics processor core 2200 is included within a graphics core array. In at least one embodiment, graphics processor core 2200, sometimes referred to as a core slice, can be one or multiple graphics cores within a modular graphics processor. In at least one embodiment, graphics processor core 2200 is exemplary of one graphics core slice, and a graphics processor as described herein may include multiple graphics core slices based on target power and performance envelopes. In at least one embodiment, each graphics core 2200 can include a fixed function block 2230 coupled with multiple sub-cores 2201A-2201F, also referred to as sub-slices, that include modular blocks of general-purpose and fixed function logic.

In at least one embodiment, fixed function block 2230 includes a geometry/fixed function pipeline 2236 that can be shared by all sub-cores in graphics processor 2200, for example, in lower performance and/or lower power graphics processor implementations. In at least one embodiment, geometry/fixed function pipeline 2236 includes a 3D fixed function pipeline, a video front-end unit, a thread spawner and thread dispatcher, and a unified return buffer manager, which manages unified return buffers.

In at least one embodiment, fixed function block 2230 also includes a graphics SoC interface 2237, a graphics microcontroller 2238, and a media pipeline 2239. Graphics SoC interface 2237 provides an interface between graphics core 2200 and other processor cores within an SoC integrated circuit. In at least one embodiment, graphics microcontroller 2238 is a programmable sub-processor that is configurable to manage various functions of graphics processor 2200, including thread dispatch, scheduling, and pre-emption. In at least one embodiment, media pipeline 2239 includes logic to facilitate decoding, encoding, pre-processing, and/or post-processing of multimedia data, including image and video data. In at least one embodiment, media pipeline 2239 implements media operations via requests to compute or sampling logic within sub-cores 2201-2201F.

In at least one embodiment, SoC interface 2237 enables graphics core 2200 to communicate with general-purpose application processor cores (e.g., CPUs) and/or other components within an SoC, including memory hierarchy elements such as a shared LLC memory, system RAM, and/or embedded on-chip or on-package DRAM. In at least one embodiment, SoC interface 2237 can also enable communication with fixed function devices within an SoC, such as camera imaging pipelines, and enables use of and/or implements global memory atomics that may be shared between graphics core 2200 and CPUs within an SoC. In at least one embodiment, SoC interface 2237 can also implement power management controls for graphics core 2200 and enable an interface between a clock domain of graphic core 2200 and other clock domains within an SoC. In at least one embodiment, SoC interface 2237 enables receipt of command buffers from a command streamer and global thread dispatcher that are configured to provide commands and instructions to each of one or more graphics cores within a graphics processor. In at least one embodiment, commands and instructions can be dispatched to media pipeline 2239, when media operations are to be performed, or a geometry and fixed function pipeline (e.g., geometry and fixed function pipeline 2236, geometry and fixed function pipeline 2214) when graphics processing operations are to be performed.

In at least one embodiment, graphics microcontroller 2238 can be configured to perform various scheduling and management tasks for graphics core 2200. In at least one embodiment, graphics microcontroller 2238 can perform graphics and/or compute workload scheduling on various graphics parallel engines within execution unit (EU) arrays 2202A-2202F, 2204A-2204F within sub-cores 2201A-2201F. In at least one embodiment, host software executing on a CPU core of an SoC including graphics core 2200 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 2238 can also facilitate low-power or idle states for graphics core 2200, providing graphics core 2200 with an ability to save and restore registers within graphics core 2200 across low-power state transitions independently from an operating system and/or graphics driver software on a system.

In at least one embodiment, graphics core 2200 may have greater than or fewer than illustrated sub-cores 2201A-2201F, up to N modular sub-cores. For each set of N sub-cores, in at least one embodiment, graphics core 2200 can also include shared function logic 2210, shared and/or cache memory 2212, a geometry/fixed function pipeline 2214, as well as additional fixed function logic 2216 to accelerate various graphics and compute processing operations. In at least one embodiment, shared function logic 2210 can include logic units (e.g., sampler, math, and/or inter-thread communication logic) that can be shared by each N sub-cores within graphics core 2200. Shared and/or cache memory 2212 can be an LLC for N sub-cores 2201A-2201F within graphics core 2200 and can also serve as shared memory that is accessible by multiple sub-cores. In at least one embodiment, geometry/fixed function pipeline 2214 can be included instead of geometry/fixed function pipeline 2236 within fixed function block 2230 and can include same or similar logic units.

In at least one embodiment, graphics core 2200 includes additional fixed function logic 2216 that can include various fixed function acceleration logic for use by graphics core 2200. In at least one embodiment, additional fixed function logic 2216 includes an additional geometry pipeline for use in position only shading. In position-only shading, at least two geometry pipelines exist, whereas in a full geometry pipeline within geometry/fixed function pipeline 2216, 2236, and a cull pipeline, which is an additional geometry pipeline which may be included within additional fixed function logic 2216. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. In at least one embodiment, for example, cull pipeline logic within additional fixed function logic 2216 can execute position shaders in parallel with a main application and generally generates critical results faster than a full pipeline, as a cull pipeline fetches and shades position attribute of vertices, without performing rasterization and rendering of pixels to a frame buffer. In at least one embodiment, a cull pipeline can use generated critical results to compute visibility information for all triangles without regard to whether those triangles are culled. In at least one embodiment, a full pipeline (which in this instance may be referred to as a replay pipeline) can consume visibility information to skip culled triangles to shade only visible triangles that are finally passed to a rasterization phase.

In at least one embodiment, additional fixed function logic 2216 can also include general purpose processing acceleration logic, such as fixed function matrix multiplication logic, for accelerating CUDA programs.

In at least one embodiment, each graphics sub-core 2201A-2201F includes a set of execution resources that may be used to perform graphics, media, and compute operations in response to requests by graphics pipeline, media pipeline, or shader programs. In at least one embodiment, graphics sub-cores 2201A-2201F include multiple EU arrays 2202A-2202F, 2204A-2204F, thread dispatch and inter-thread communication ("TD/IC") logic 2203A-2203F, a 3D (e.g., texture) sampler 2205A-2205F, a media sampler 2206A-2206F, a shader processor 2207A-2207F, and shared local memory ("SLM") 2208A-2208F. EU arrays 2202A-2202F, 2204A-2204F each include multiple execution units, which are GPGPUs capable of performing floating-point and integer/fixed-point logic operations in service of a graphics, media, or compute operation, including graphics, media, or compute shader programs. In at least one embodiment, TD/IC logic 2203A-2203F performs local thread dispatch and thread control operations for execution units within a sub-core and facilitate communication between threads executing on execution units of a sub-core. In at least one embodiment, 3D sampler 2205A-2205F can read texture or other 3D graphics related data into memory. In at least one embodiment, 3D sampler can read texture data differently based on a configured sample state and texture format associated with a given texture. In at least one embodiment, media sampler 2206A-2206F can perform similar read operations based on a type and format associated with media data. In at least one embodiment, each graphics sub-core 2201A-2201F can alternately include a unified 3D and media sampler. In at least one embodiment, threads executing on execution units within each of sub-cores 2201A-2201F can make use of shared local memory 2208A-2208F within each sub-core, to enable threads executing within a thread group to execute using a common pool of on-chip memory.

In at least one embodiment, at least one component shown or described with respect to FIG. 22 is utilized to implement techniques and/or functions described in connection with FIGS. 1-6. In at least one embodiment, at least one component of FIG. 22 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 22 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 23:
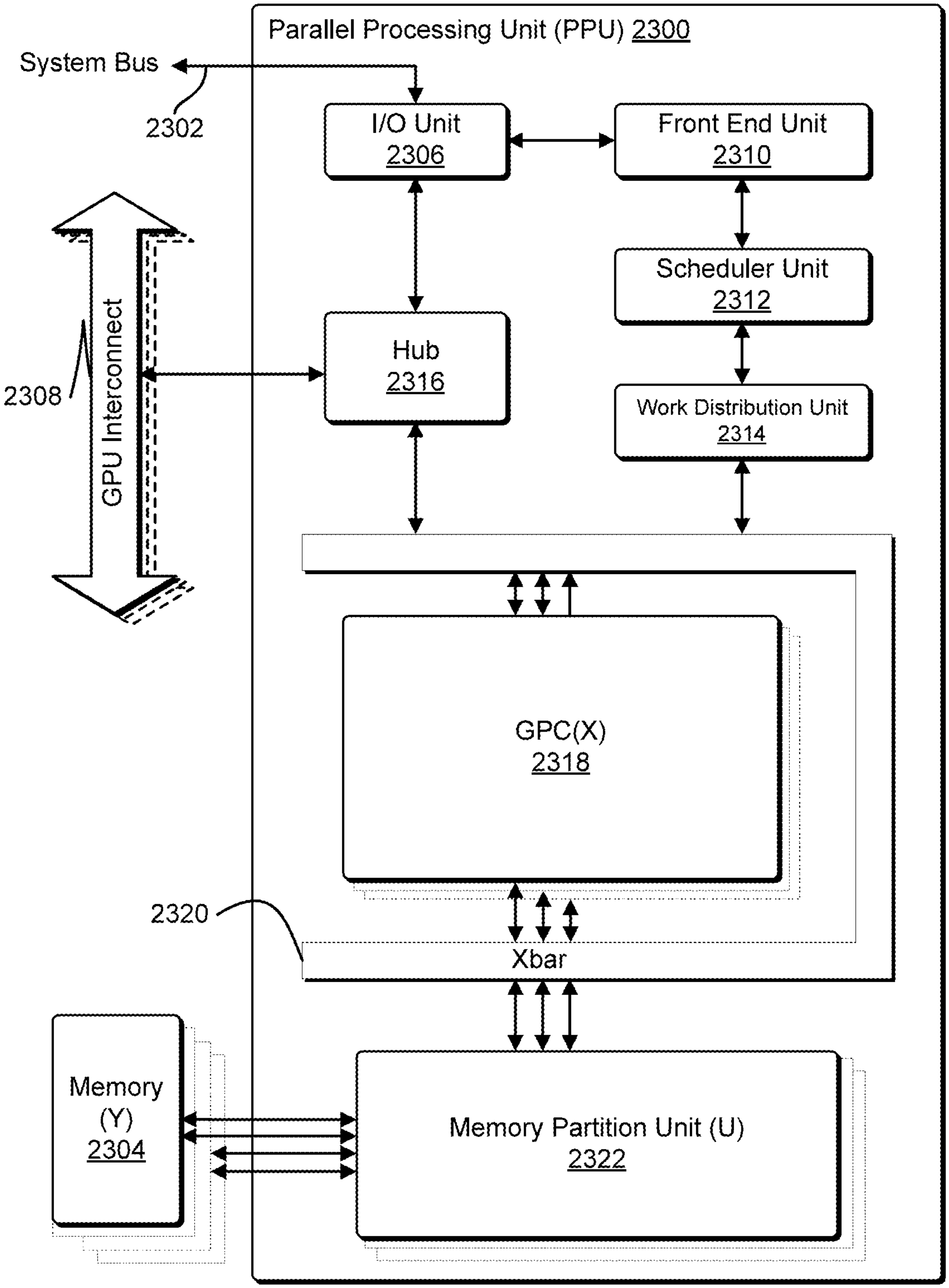
FIG. 23 illustrates a PPU, in accordance with at least one embodiment.

FIG. 23 illustrates a parallel processing unit ("PPU") 2300, in accordance with at least one embodiment. In at least one embodiment, PPU 2300 is configured with machine-readable code that, if executed by PPU 2300, causes PPU 2300 to perform some or all of processes and techniques described herein. In at least one embodiment, PPU 2300 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 2300. In at least one embodiment, PPU 2300 is a GPU configured to implement a graphics rendering pipeline for processing three-dimensional ("3D") graphics data in order to generate two-dimensional ("2D") image data for display on a display device such as an LCD device. In at least one embodiment, PPU 2300 is utilized to perform computations such as linear algebra operations and machine-learning operations. FIG. 23 illustrates an example parallel processor for illustrative purposes only and should be construed as a non-limiting example of a processor architecture that may be implemented in at least one embodiment.

In at least one embodiment, one or more PPUs 2300 are configured to accelerate High Performance Computing ("HPC"), data center, and machine learning applications. In at least one embodiment, one or more PPUs 2300 are configured to accelerate CUDA programs. In at least one embodiment, PPU 2300 includes, without limitation, an I/O unit 2306, a front-end unit 2310, a scheduler unit 2312, a work distribution unit 2314, a hub 2316, a crossbar ("Xbar") 2320, one or more general processing clusters ("GPCs") 2318, and one or more partition units ("memory partition units") 2322. In at least one embodiment, PPU 2300 is connected to a host processor or other PPUs 2300 via one or more high-speed GPU interconnects ("GPU interconnects") 2308. In at least one embodiment, PPU 2300 is connected to a host processor or other peripheral devices via a system bus or interconnect 2302. In at least one embodiment, PPU 2300 is connected to a local memory comprising one or more memory devices ("memory") 2304. In at least one embodiment, memory devices 2304 include, without limitation, one or more dynamic random access memory (DRAM) devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 2308 may refer to a wire-based multi-lane communications link that is used by systems to scale and include one or more PPUs 2300 combined with one or more CPUs, supports cache coherence between PPUs 2300 and CPUs, and CPU mastering. In at least one embodiment, data and/or commands are transmitted by high-speed GPU interconnect 2308 through hub 2316 to/from other units of PPU 2300 such as one or more copy engines, video encoders, video decoders, power management units, and other components which may not be explicitly illustrated in FIG. 23.

In at least one embodiment, I/O unit 2306 is configured to transmit and receive communications (e.g., commands, data) from a host processor (not illustrated in FIG. 23) over system bus 2302. In at least one embodiment, I/O unit 2306 communicates with host processor directly via system bus 2302 or through one or more intermediate devices such as a memory bridge. In at least one embodiment, I/O unit 2306 may communicate with one or more other processors, such as one or more of PPUs 2300 via system bus 2302. In at least one embodiment, I/O unit 2306 implements a PCIe interface for communications over a PCIe bus. In at least one embodiment, I/O unit 2306 implements interfaces for communicating with external devices.

In at least one embodiment, I/O unit 2306 decodes packets received via system bus 2302. In at least one embodiment, at least some packets represent commands configured to cause PPU 2300 to perform various operations. In at least one embodiment, I/O unit 2306 transmits decoded commands to various other units of PPU 2300 as specified by commands. In at least one embodiment, commands are transmitted to front-end unit 2310 and/or transmitted to hub 2316 or other units of PPU 2300 such as one or more copy engines, a video encoder, a video decoder, a power management unit, etc. (not explicitly illustrated in FIG. 23). In at least one embodiment, I/O unit 2306 is configured to route communications between and among various logical units of PPU 2300.

In at least one embodiment, a program executed by host processor encodes a command stream in a buffer that provides workloads to PPU 2300 for processing. In at least one embodiment, a workload comprises instructions and data to be processed by those instructions. In at least one embodiment, buffer is a region in a memory that is accessible (e.g., read/write) by both a host processor and PPU 2300 a host interface unit may be configured to access buffer in a system memory connected to system bus 2302 via memory requests transmitted over system bus 2302 by I/O unit 2306. In at least one embodiment, a host processor writes a command stream to a buffer and then transmits a pointer to the start of the command stream to PPU 2300 such that front-end unit 2310 receives pointers to one or more command streams and manages one or more command streams, reading commands from command streams and forwarding commands to various units of PPU 2300.

In at least one embodiment, front-end unit 2310 is coupled to scheduler unit 2312 that configures various GPCs 2318 to process tasks defined by one or more command streams. In at least one embodiment, scheduler unit 2312 is configured to track state information related to various tasks managed by scheduler unit 2312 where state information may indicate which of GPCs 2318 a task is assigned to, whether task is active or inactive, a priority level associated with task, and so forth. In at least one embodiment, scheduler unit 2312 manages execution of a plurality of tasks on one or more of GPCs 2318.

In at least one embodiment, scheduler unit 2312 is coupled to work distribution unit 2314 that is configured to dispatch tasks for execution on GPCs 2318. In at least one embodiment, work distribution unit 2314 tracks a number of scheduled tasks received from scheduler unit 2312 and work distribution unit 2314 manages a pending task pool and an active task pool for each of GPCs 2318. In at least one embodiment, pending task pool comprises a number of slots (e.g., 32 slots) that contain tasks assigned to be processed by a particular GPC 2318; active task pool may comprise a number of slots (e.g., 4 slots) for tasks that are actively being processed by GPCs 2318 such that as one of GPCs 2318 completes execution of a task, that task is evicted from active task pool for GPC 2318 and one of other tasks from pending task pool is selected and scheduled for execution on GPC 2318. In at least one embodiment, if an active task is idle on GPC 2318, such as while waiting for a data dependency to be resolved, then the active task is evicted from GPC 2318 and returned to a pending task pool while another task in the pending task pool is selected and scheduled for execution on GPC 2318.

In at least one embodiment, work distribution unit 2314 communicates with one or more GPCs 2318 via XBar 2320. In at least one embodiment, XBar 2320 is an interconnect network that couples many units of PPU 2300 to other units of PPU 2300 and can be configured to couple work distribution unit 2314 to a particular GPC 2318. In at least one embodiment, one or more other units of PPU 2300 may also be connected to XBar 2320 via hub 2316.

In at least one embodiment, tasks are managed by scheduler unit 2312 and dispatched to one of GPCs 2318 by work distribution unit 2314. GPC 2318 is configured to process task and generate results. In at least one embodiment, results may be consumed by other tasks within GPC 2318, routed to a different GPC 2318 via XBar 2320, or stored in memory 2304. In at least one embodiment, results can be written to memory 2304 via partition units 2322, which implement a memory interface for reading and writing data to/from memory 2304. In at least one embodiment, results can be transmitted to another PPU 2304 or CPU via high-speed GPU interconnect 2308. In at least one embodiment, PPU 2300 includes, without limitation, a number U of partition units 2322 that is equal to number of separate and distinct memory devices 2304 coupled to PPU 2300.

In at least one embodiment, a host processor executes a driver kernel that implements an application programming interface ("API") that enables one or more applications executing on host processor to schedule operations for execution on PPU 2300. In at least one embodiment, multiple compute applications are simultaneously executed by PPU 2300 and PPU 2300 provides isolation, quality of service ("QoS"), and independent address spaces for multiple compute applications. In at least one embodiment, an application generates instructions (e.g., in the form of API calls) that cause a driver kernel to generate one or more tasks for execution by PPU 2300 and the driver kernel outputs tasks to one or more streams being processed by PPU 2300. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform a task and that exchange data through shared memory.

In at least one embodiment, at least one component shown or described with respect to FIG. 23 is utilized to implement techniques and/or functions described in connection with FIGS. 1-6. In at least one embodiment, at least one component of FIG. 23 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 23 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 24:
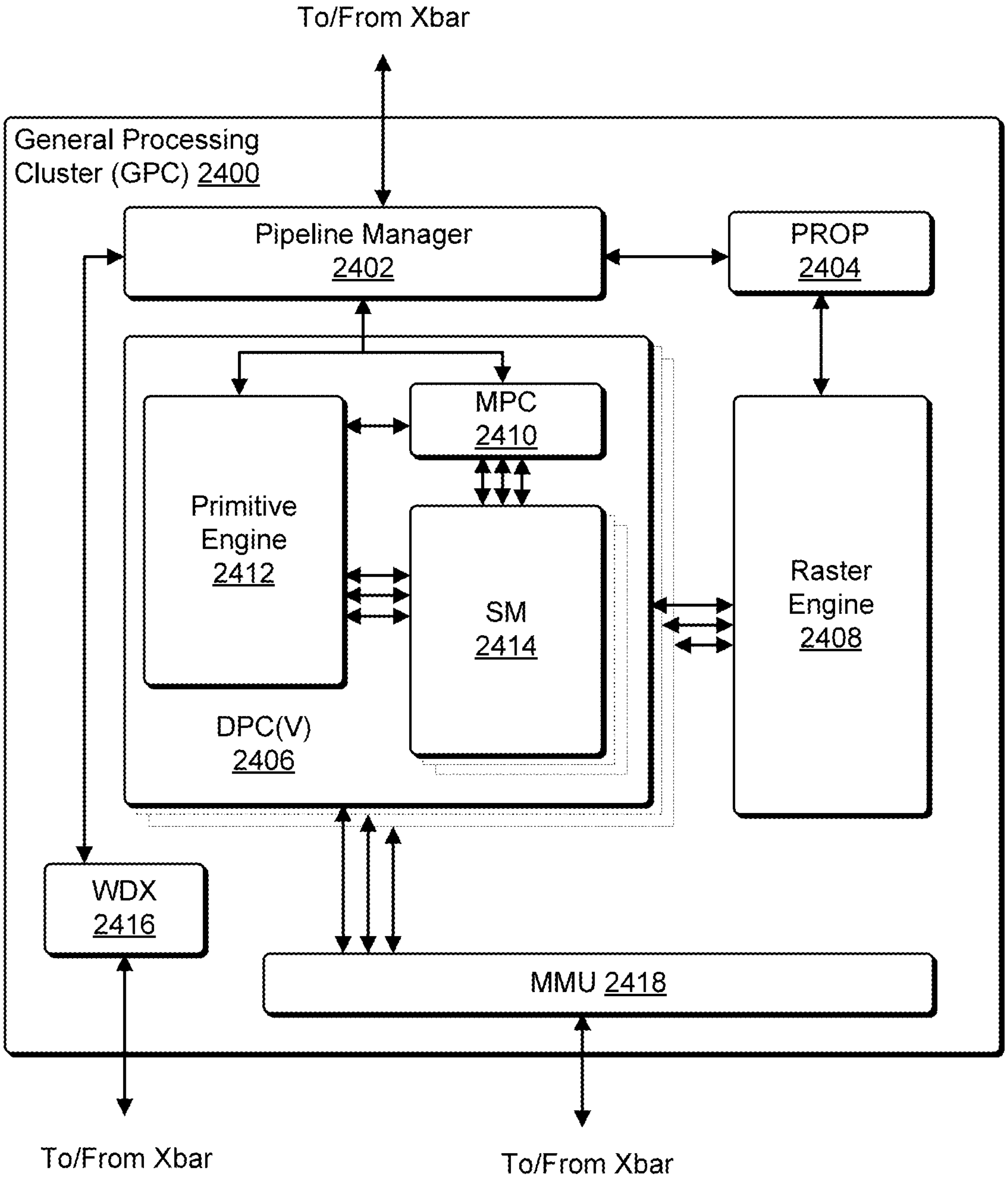
FIG. 24 illustrates a GPC, in accordance with at least one embodiment.

FIG. 24 illustrates a GPC 2400, in accordance with at least one embodiment. In at least one embodiment, GPC 2400 is GPC 2318 of FIG. 23. In at least one embodiment, each GPC 2400 includes, without limitation, a number of hardware units for processing tasks and each GPC 2400 includes, without limitation, a pipeline manager 2402, a pre-raster operations unit ("PROP") 2404, a raster engine 2408, a work distribution crossbar ("WDX") 2416, an MMU 2418, one or more Data Processing Clusters ("DPCs") 2406, and any suitable combination of parts.

In at least one embodiment, operation of GPC 2400 is controlled by pipeline manager 2402. In at least one embodiment, pipeline manager 2402 manages configuration of one or more DPCs 2406 for processing tasks allocated to GPC 2400. In at least one embodiment, pipeline manager 2402 configures at least one of one or more DPCs 2406 to implement at least a portion of a graphics rendering pipeline. In at least one embodiment, DPC 2406 is configured to execute a vertex shader program on a programmable streaming multiprocessor ("SM") 2414. In at least one embodiment, pipeline manager 2402 is configured to route packets received from a work distribution unit to appropriate logical units within GPC 2400 and, in at least one embodiment, some packets may be routed to fixed function hardware units in PROP 2404 and/or raster engine 2408 while other packets may be routed to DPCs 2406 for processing by a primitive engine 2412 or SM 2414. In at least one embodiment, pipeline manager 2402 configures at least one of DPCs 2406 to implement a computing pipeline. In at least one embodiment, pipeline manager 2402 configures at least one of DPCs 2406 to execute at least a portion of a CUDA program.

In at least one embodiment, PROP unit 2404 is configured to route data generated by raster engine 2408 and DPCs 2406 to a Raster Operations ("ROP") unit in a partition unit, such as memory partition unit 2322 described in more detail above in conjunction with FIG. 23. In at least one embodiment, PROP unit 2404 is configured to perform optimizations for color blending, organize pixel data, perform address translations, and more. In at least one embodiment, raster engine 2408 includes, without limitation, a number of fixed function hardware units configured to perform various raster operations and, in at least one embodiment, raster engine 2408 includes, without limitation, a setup engine, a coarse raster engine, a culling engine, a clipping engine, a fine raster engine, a tile coalescing engine, and any suitable combination thereof. In at least one embodiment, a setup engine receives transformed vertices and generates plane equations associated with geometric primitive defined by vertices; plane equations are transmitted to a coarse raster engine to generate coverage information (e.g., an x, y coverage mask for a tile) for a primitive; the output of the coarse raster engine is transmitted to a culling engine where fragments associated with a primitive that fail a z-test are culled, and transmitted to a clipping engine where fragments lying outside a viewing frustum are clipped. In at least one embodiment, fragments that survive clipping and culling are passed to a fine raster engine to generate attributes for pixel fragments based on plane equations generated by a setup engine. In at least one embodiment, the output of raster engine 2408 comprises fragments to be processed by any suitable entity such as by a fragment shader implemented within DPC 2406.

In at least one embodiment, each DPC 2406 included in GPC 2400 comprise, without limitation, an M-Pipe Controller ("MPC") 2410; primitive engine 2412; one or more SMs 2414; and any suitable combination thereof. In at least one embodiment, MPC 2410 controls operation of DPC 2406, routing packets received from pipeline manager 2402 to appropriate units in DPC 2406. In at least one embodiment, packets associated with a vertex are routed to primitive engine 2412, which is configured to fetch vertex attributes associated with vertex from memory; in contrast, packets associated with a shader program may be transmitted to SM 2414.

In at least one embodiment, SM 2414 comprises, without limitation, a programmable streaming processor that is configured to process tasks represented by a number of threads. In at least one embodiment, SM 2414 is multi-threaded and configured to execute a plurality of threads (e.g., 32 threads) from a particular group of threads concurrently and implements a SIMD architecture where each thread in a group of threads (e.g., a warp) is configured to process a different set of data based on same set of instructions. In at least one embodiment, all threads in group of threads execute same instructions. In at least one embodiment, SM 2414 implements a SIMT architecture wherein each thread in a group of threads is configured to process a different set of data based on same set of instructions, but where individual threads in group of threads are allowed to diverge during execution. In at least one embodiment, a program counter, a call stack, and an execution state is maintained for each warp, enabling concurrency between warps and serial execution within warps when threads within a warp diverge. In another embodiment, a program counter, a call stack, and an execution state is maintained for each individual thread, enabling equal concurrency between all threads, within and between warps. In at least one embodiment, an execution state is maintained for each individual thread and threads executing the same instructions may be converged and executed in parallel for better efficiency. At least one embodiment of SM 2414 is described in more detail in conjunction with FIG. 25.

In at least one embodiment, MMU 2418 provides an interface between GPC 2400 and a memory partition unit (e.g., partition unit 2322 of FIG. 23) and MMU 2418 provides translation of virtual addresses into physical addresses, memory protection, and arbitration of memory requests. In at least one embodiment, MMU 2418 provides one or more translation lookaside buffers (TLBs) for performing translation of virtual addresses into physical addresses in memory.

In at least one embodiment, at least one component shown or described with respect to FIG. 24 is utilized to implement techniques and/or functions described in connection with FIGS. 1-6. In at least one embodiment, at least one component of FIG. 24 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 24 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 25:
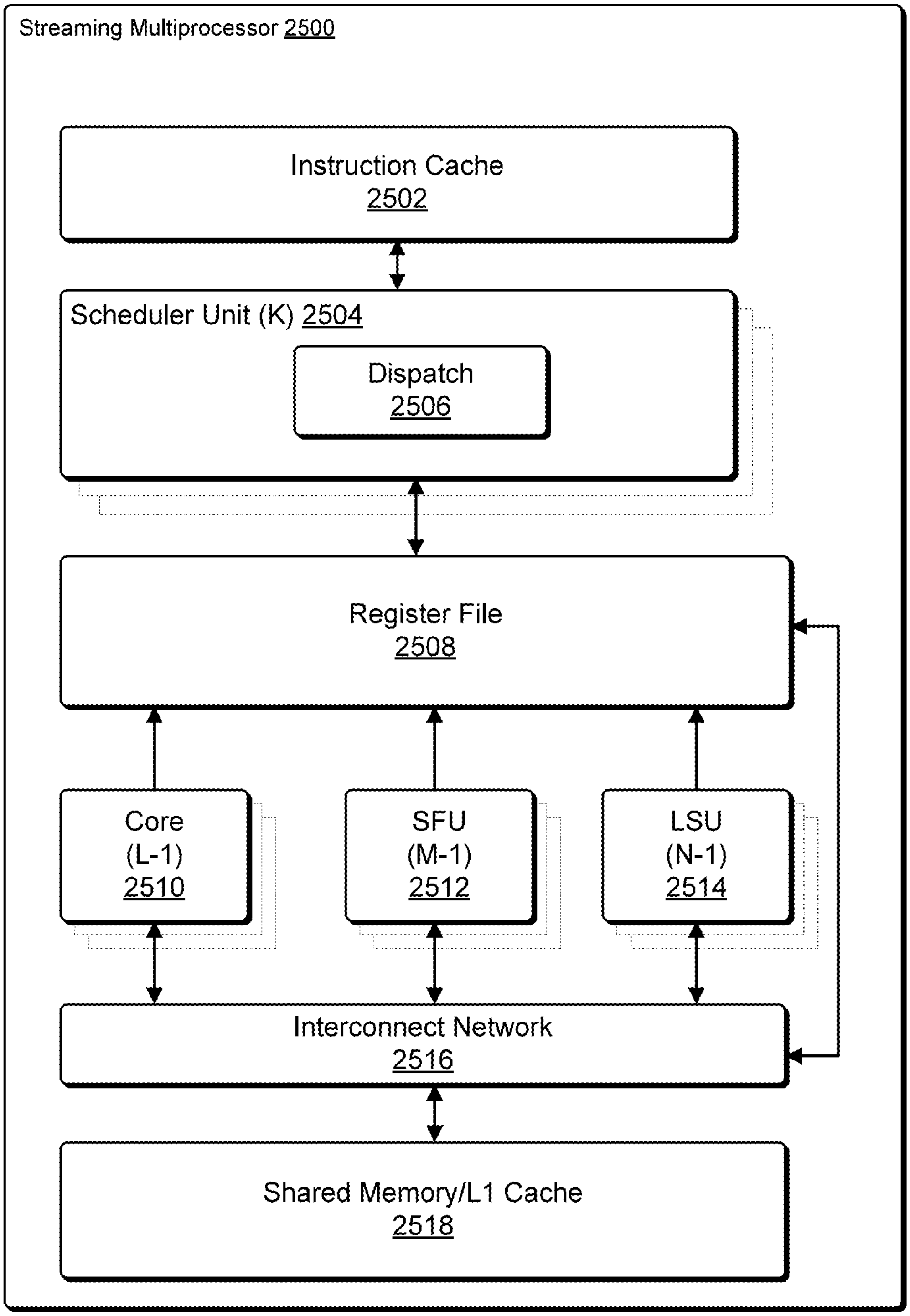
FIG. 25 illustrates a streaming multiprocessor, in accordance with at least one embodiment.

FIG. 25 illustrates a streaming multiprocessor ("SM") 2500, in accordance with at least one embodiment. In at least one embodiment, SM 2500 is SM 2414 of FIG. 24. In at least one embodiment, SM 2500 includes, without limitation, an instruction cache 2502; one or more scheduler units 2504; a register file 2508; one or more processing cores ("cores") 2510; one or more special function units ("SFUs") 2512; one or more LSUs 2514; an interconnect network 2516; a shared memory/L1 cache 2518; and any suitable combination thereof. In at least one embodiment, a work distribution unit dispatches tasks for execution on GPCs of parallel processing units (PPUs) and each task is allocated to a particular Data Processing Cluster (DPC) within a GPC and, if a task is associated with a shader program, then the task is allocated to one of SMs 2500. In at least one embodiment, scheduler unit 2504 receives tasks from a work distribution unit and manages instruction scheduling for one or more thread blocks assigned to SM 2500. In at least one embodiment, scheduler unit 2504 schedules thread blocks for execution as warps of parallel threads, wherein each thread block is allocated at least one warp. In at least one embodiment, each warp executes threads. In at least one embodiment, scheduler unit 2504 manages a plurality of different thread blocks, allocating warps to different thread blocks and then dispatching instructions from a plurality of different cooperative groups to various functional units (e.g., processing cores 2510, SFUs 2512, and LSUs 2514) during each clock cycle. In at least one embodiment, SM 2500 includes one or more thread block clusters, where a thread block cluster can enable programmatic control of locality at a granularity larger than a single thread block of a single streaming multiprocessor (SM). In at least one embodiment, thread block clusters (also referred to as "clusters") enables multiple thread blocks running concurrently across streaming multiprocessors to synchronize and collaboratively fetch, exchange, or otherwise use data.

In at least one embodiment, "cooperative groups" may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, APIs of conventional programming models provide a single, simple construct for synchronizing cooperating threads: a barrier across all threads of a thread block (e.g., syncthreads( ) function). However, in at least one embodiment, programmers may define groups of threads at smaller than thread block granularities and synchronize within defined groups to enable greater performance, design flexibility, and software reuse in the form of collective group-wide function interfaces. In at least one embodiment, cooperative groups enable programmers to define groups of threads explicitly at sub-block and multi-block granularities, and to perform collective operations such as synchronization on threads in a cooperative group. In at least one embodiment, a sub-block granularity is as small as a single thread. In at least one embodiment, a programming model supports clean composition across software boundaries, so that libraries and utility functions can synchronize safely within their local context without having to make assumptions about convergence. In at least one embodiment, cooperative group primitives enable new patterns of cooperative parallelism, including, without limitation, producer-consumer parallelism, opportunistic parallelism, and global synchronization across an entire grid of thread blocks.

In at least one embodiment, a dispatch unit 2506 is configured to transmit instructions to one or more of functional units and scheduler unit 2504 includes, without limitation, two dispatch units 2506 that enable two different instructions from same warp to be dispatched during each clock cycle. In at least one embodiment, each scheduler unit 2504 includes a single dispatch unit 2506 or additional dispatch units 2506.

In at least one embodiment, each SM 2500, in at least one embodiment, includes, without limitation, register file 2508 that provides a set of registers for functional units of SM 2500. In at least one embodiment, register file 2508 is divided between each of the functional units such that each functional unit is allocated a dedicated portion of register file 2508. In at least one embodiment, register file 2508 is divided between different warps being executed by SM 2500 and register file 2508 provides temporary storage for operands connected to data paths of functional units. In at least one embodiment, each SM 2500 comprises, without limitation, a plurality of L processing cores 2510. In at least one embodiment, SM 2500 includes, without limitation, a large number (e.g., 128 or more) of distinct processing cores 2510. In at least one embodiment, each processing core 2510 includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 2510 include, without limitation, 64 single-precision (32-bit) floating point cores, 64 integer cores, 32 double-precision (64-bit) floating point cores, and 8 tensor cores.

In at least one embodiment, tensor cores are configured to perform matrix operations. In at least one embodiment, one or more tensor cores are included in processing cores 2510. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation $D=A\times B+C$, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as a CUDA-C++ API, exposes specialized matrix load, matrix multiply and accumulate, and matrix store operations to efficiently use tensor cores from a CUDA-C++ program. In at least one embodiment, at the CUDA level, a warp-level interface assumes 16×16 size matrices spanning all 32 threads of a warp.

In at least one embodiment, each SM 2500 comprises, without limitation, M SFUs 2512 that perform special functions (e.g., attribute evaluation, reciprocal square root, and like). In at least one embodiment, SFUs 2512 include, without limitation, a tree traversal unit configured to traverse a hierarchical tree data structure. In at least one embodiment, SFUs 2512 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 2500. In at least one embodiment, texture maps are stored in shared memory/L1 cache 2518. In at least one embodiment, texture units implement texture operations such as filtering operations using mip-maps (e.g., texture maps of varying levels of detail). In at least one embodiment, each SM 2500 includes, without limitation, two texture units.

In at least one embodiment, each SM 2500 comprises, without limitation, N LSUs 2514 that implement load and store operations between shared memory/L1 cache 2518 and register file 2508. In at least one embodiment, each SM 2500 includes, without limitation, interconnect network 2516 that connects each of the functional units to register file 2508 and LSU 2514 to register file 2508 and shared memory/L1 cache 2518. In at least one embodiment, interconnect network 2516 is a crossbar that can be configured to connect any of the functional units to any of the registers in register file 2508 and connect LSUs 2514 to register file 2508 and memory locations in shared memory/L1 cache 2518.

In at least one embodiment, shared memory/L1 cache 2518 is an array of on-chip memory that allows for data storage and communication between SM 2500 and a primitive engine and between threads in SM 2500. In at least one embodiment, shared memory/L1 cache 2518 comprises, without limitation, 128 KB of storage capacity and is in a path from SM 2500 to a partition unit. In at least one embodiment, shared memory/L1 cache 2518 is used to cache reads and writes. In at least one embodiment, one or more of shared memory/L1 cache 2518, L2 cache, and memory are backing stores.

In at least one embodiment, combining data cache and shared memory functionality into a single memory block provides improved performance for both types of memory accesses. In at least one embodiment, capacity is used or is usable as a cache by programs that do not use shared memory, such as if shared memory is configured to use half of capacity, texture and load/store operations can use remaining capacity. In at least one embodiment, integration within shared memory/L1 cache 2518 enables shared memory/L1 cache 2518 to function as a high-throughput conduit for streaming data while simultaneously providing high-bandwidth and low-latency access to frequently reused data. In at least one embodiment, when configured for general purpose parallel computation, a simpler configuration can be used compared with graphics processing. In at least one embodiment, fixed function GPUs are bypassed, creating a much simpler programming model. In at least one embodiment and in a general purpose parallel computation configuration, a work distribution unit assigns and distributes blocks of threads directly to DPCs. In at least one embodiment, threads in a block execute the same program, using a unique thread ID in a calculation to ensure each thread generates unique results, using SM 2500 to execute a program and perform calculations, shared memory/L1 cache 2518 to communicate between threads, and LSU 2514 to read and write global memory through shared memory/L1 cache 2518 and a memory partition unit. In at least one embodiment, when configured for general purpose parallel computation, SM 2500 writes commands that scheduler unit 2504 can use to launch new work on DPCs. In at least one embodiment, SM 2500 includes one or more distributed shared memories (or distributed shared memory) that enable direct SM-to-SM operations such as loading, storing, and performing atomics across multiple SM shared memory blocks.

In at least one embodiment, SM 2500 includes one or more asynchronous execution functions that include a tensor memory accelerator (TMA) unit that can transfer blocks of data between global memory and shared memory. In at least one embodiment, one or more processors uses or access one or more TMAs to perform bi-directional copy operations, e.g., from global to shared memory and vice versa. In at least one embodiment, SM 2500 includes one or more TMAs to asynchronously copy between thread blocks in a cluster. In at least one embodiment, SM 2500 includes one or more asynchronous transaction barriers to perform atomic data movement and synchronization. In at least one embodiment, SM 2500 includes a tensor core transformer engine, which includes software and one or more cores to accelerate transformer model training and inferencing. In at least one embodiment, a transformer one or more processor cores performing one or more tensor core transformer engines manage and dynamically choose between FP8 and 16-bit calculations by re-casting and scaling between FP8 and 16-bit in each layer of one or more neural networks.

In at least one embodiment, PPU is included in or coupled to a desktop computer, a laptop computer, a tablet computer, servers, supercomputers, a smart-phone (e.g., a wireless, hand-held device), a PDA, a digital camera, a vehicle, a head mounted display, a hand-held electronic device, and more. In at least one embodiment, PPU is embodied on a single semiconductor substrate. In at least one embodiment, PPU is included in an SoC along with one or more other devices such as additional PPUs, memory, a RISC CPU, an MMU, a digital-to-analog converter ("DAC"), and like.

In at least one embodiment, PPU may be included on a graphics card that includes one or more memory devices. In at least one embodiment, a graphics card may be configured to interface with a PCIe slot on a motherboard of a desktop computer. In at least one embodiment, PPU may be an integrated GPU ("iGPU") included in chipset of motherboard.

In at least one embodiment, at least one component shown or described with respect to FIG. 25 is utilized to implement techniques and/or functions described in connection with FIGS. 1-6. In at least one embodiment, at least one component of FIG. 25 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 25 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Software Constructions for General-Purpose Computing

The following figures set forth, without limitation, exemplary software constructs for implementing at least one embodiment.

Figure 26:
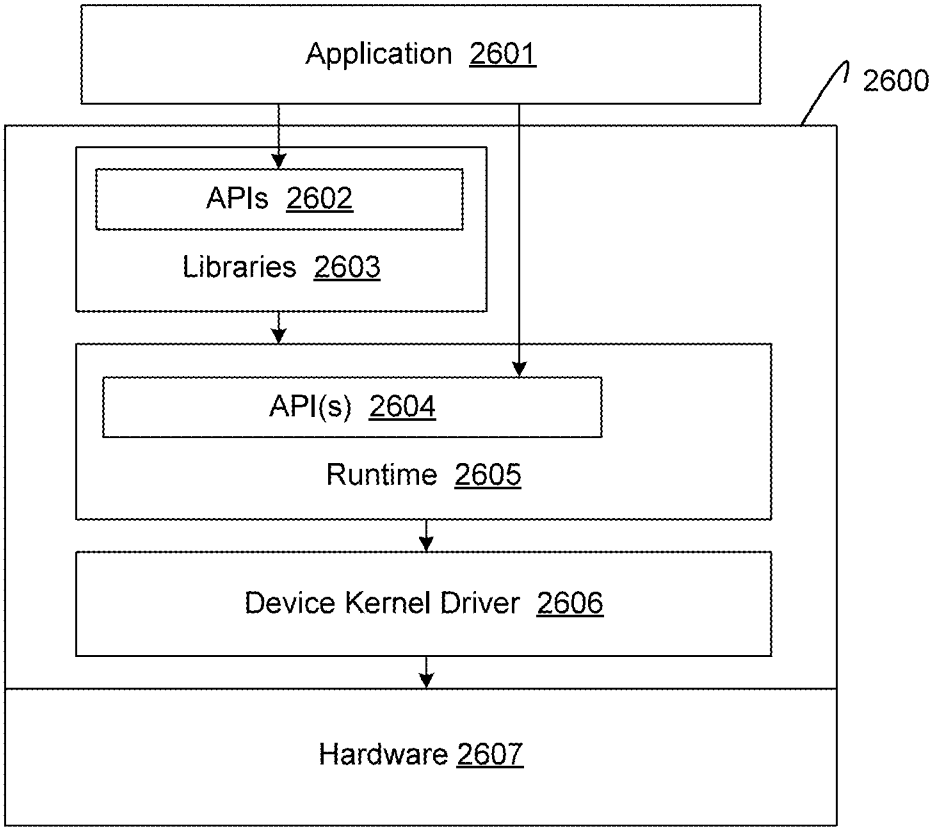
FIG. 26 illustrates a software stack of a programming platform, in accordance with at least one embodiment.

FIG. 26 illustrates a software stack of a programming platform, in accordance with at least one embodiment. In at least one embodiment, a programming platform is a platform for leveraging hardware on a computing system to accelerate computational tasks. A programming platform may be accessible to software developers through libraries, compiler directives, and/or extensions to programming languages, in at least one embodiment. In at least one embodiment, a programming platform may be, but is not limited to, CUDA, Radeon Open Compute Platform ("ROCm"), OpenCL (OpenCL™ is developed by Khronos group), SYCL, or Intel One API.

In at least one embodiment, a software stack 2600 of a programming platform provides an execution environment for an application 2601. In at least one embodiment, application 2601 may include any computer software capable of being launched on software stack 2600. In at least one embodiment, application 2601 may include, but is not limited to, an artificial intelligence ("AI")/machine learning ("ML") application, a high performance computing ("HPC") application, a virtual desktop infrastructure ("VDI"), or a data center workload.

In at least one embodiment, application 2601 and software stack 2600 run on hardware 2607. Hardware 2607 may include one or more GPUs, CPUs, FPGAs, AI engines, and/or other types of compute devices that support a programming platform, in at least one embodiment. In at least one embodiment, such as with CUDA, software stack 2600 may be vendor specific and compatible with only devices from particular vendor(s). In at least one embodiment, such as in with OpenCL, software stack 2600 may be used with devices from different vendors. In at least one embodiment, hardware 2607 includes a host connected to one more devices that can be accessed to perform computational tasks via application programming interface ("API") calls. A device within hardware 2607 may include, but is not limited to, a GPU, FPGA, AI engine, or other compute device (but may also include a CPU) and its memory, as opposed to a host within hardware 2607 that may include, but is not limited to, a CPU (but may also include a compute device) and its memory, in at least one embodiment.

In at least one embodiment, software stack 2600 of a programming platform includes, without limitation, a number of libraries 2603, a runtime 2605, and a device kernel driver 2606. Each of libraries 2603 may include data and programming code that can be used by computer programs and leveraged during software development, in at least one embodiment. In at least one embodiment, libraries 2603 may include, but are not limited to, pre-written code and subroutines, classes, values, type specifications, configuration data, documentation, help data, and/or message templates. In at least one embodiment, libraries 2603 include functions that are optimized for execution on one or more types of devices. In at least one embodiment, libraries 2603 may include, but are not limited to, functions for performing mathematical, deep learning, and/or other types of operations on devices. In at least one embodiment, libraries 2603 are associated with corresponding APIs 2602, which may include one or more APIs, that expose functions implemented in libraries 2603. In at least one embodiment, a processor (e.g. CPU, GPU) performs, calls, or otherwise uses one or more APIs to prioritize kernels. For example, a first kernel (e.g., parent) can launch a second kernel (e.g., child kernel), and said second kernel can be used by a processor to launch additional kernels (e.g., grandchildren kernels) independent of said first kernel. In at least one embodiment, a processor performs an API or calls an API from memory to be performed to support dynamic stream priority (e.g., updating priority while a stream is being used to perform operations). For example, when a processor performs said API, it allows a programmer to copy stream priority from one stream to one or more other streams.

In at least one embodiment, software stack 2600 includes an API to support dynamic stream priority (e.g., updating priority while a stream is being used to perform operations), which allows a programmer to set priority of a stream at any time after creation. In at least one embodiment, software stack 2600 includes an API to support dynamic stream priority (e.g., updating priority while the stream is being used to perform operations), which allows a programmer to obtain current priority of a stream, where the priority is one of a plurality of attributes of a stream. In at least one embodiment, software stack 2600 includes an API to support dynamic stream priority (e.g., updating priority while the stream is being used to perform operations), which allows a programmer to obtain current priority of a stream as a single attribute. In at least one embodiment, software stack 2600 includes an API to support dynamic stream priority (e.g., updating priority while the stream is being used to perform operations), which allows a programmer to launch a kernel to perform operations on a stream at a set priority, which may be different from the stream priority. In at least one embodiment, software stack 2600 includes an API to indicate whether an object (e.g., a thread synchronization object such as a barrier) tracks whether all data movement operations for a set of threads operating on a GPU are complete has a specified state after a specified period of time, where a specified state can be a state indicating that data has been moved and is ready for use, and is specified using an expected parity value as an input to the API.

In at least one embodiment, software stack 2600 includes one or more APIs to updated kernels. In at least one embodiment, a processor performs an API or calls an API from memory to be performed to update to an existing API is to support context-free kernels, which allows a programmer to add a kernel node to a graph without a graphics context, so that a graphics context can be dynamically associated with a kernel at runtime. In at least one embodiment, software stack 2600 includes one or more APIs to allow a programmer to obtain a kernel identifier and a graphics context as separate parameters from a kernel node, so that parameters to be obtained from kernels and from context-free kernels. In at least one embodiment, software stack 2600 includes one or more APIs to use parallel processor(s), such as one or more graphics processing units, to launch task graphs (e.g., task graphs) and to execute one or more task graphs (e.g., including one or more programs).

In at least one embodiment, software stack 2600 includes one or more APIs to associate one or more instructions with one or more memory ordering operations, such as a fence or membar operation. In at least one embodiment, instructions are associated with one or more domains such that a memory ordering operation is executed in association to one or more particular domains without interfering with instructions of other domains. an API to indicate a thread has arrived (e.g., at a thread synchronization barrier), or finished a stage of work in relation to asynchronous data movement operations on a GPU. In at least one embodiment, software stack 2600 includes one or more to allow programmers to manually indicate an expected transaction count when a thread has finished a stage of work, which is used to update an object that tracks whether all data movement operations for a set of threads are complete.

In at least one embodiment, application 2601 is written as source code that is compiled into executable code, as discussed in greater detail below in conjunction with FIGS. 31-33. Executable code of application 2601 may run, at least in part, on an execution environment provided by software stack 2600, in at least one embodiment. In at least one embodiment, during execution of application 2601, code may be reached that needs to run on a device, as opposed to a host. In such a case, runtime 2605 may be called to load and launch requisite code on the device, in at least one embodiment. In at least one embodiment, runtime 2605 may include any technically feasible runtime system that is able to support execution of application 2601.

In at least one embodiment, runtime 2605 is implemented as one or more runtime libraries associated with corresponding APIs, which are shown as API(s) 2604. One or more of such runtime libraries may include, without limitation, functions for memory management, execution control, device management, error handling, and/or synchronization, among other things, in at least one embodiment. In at least one embodiment, memory management functions may include, but are not limited to, functions to allocate, deallocate, and copy device memory, as well as transfer data between host memory and device memory. In at least one embodiment, execution control functions may include, but are not limited to, functions to launch a function (sometimes referred to as a "kernel" when a function is a global function callable from a host) on a device and set attribute values in a buffer maintained by a runtime library for a given function to be executed on a device.

Runtime libraries and corresponding API(s) 2604 may be implemented in any technically feasible manner, in at least one embodiment. In at least one embodiment, one (or any number of) API may expose a low-level set of functions for fine-grained control of a device, while another (or any number of) API may expose a higher-level set of such functions. In at least one embodiment, a high-level runtime API may be built on top of a low-level API. In at least one embodiment, one or more of runtime APIs may be language-specific APIs that are layered on top of a language-independent runtime API.

In at least one embodiment, one or more processors disclosed in "processing systems" can perform, access, or otherwise use software stack 2600. For example, APU 1300, CPU 1400, 16A-16B exemplary graphics processors, general-purpose graphics processing unit ("GPGPU") 1730, parallel processor 1800, processing cluster 1894, graphics multiprocessor 1834, graphics multiprocessor 1896, graphics processor 1900, processor 2000, processor 2100, parallel processing unit ("PPU") 2300, GPC 2400, and/or streaming multiprocessor ("SM") 2500 can perform, use, call, or otherwise implement (e.g., through accessing a memory) one or more APIs included in software stack 2600.

In at least one embodiment, device kernel driver 2606 is configured to facilitate communication with an underlying device. In at least one embodiment, device kernel driver 2606 may provide low-level functionalities upon which APIs, such as API(s) 2604, and/or other software relies. In at least one embodiment, device kernel driver 2606 may be configured to compile intermediate representation ("IR") code into binary code at runtime. For CUDA, device kernel driver 2606 may compile Parallel Thread Execution ("PTX") IR code that is not hardware specific into binary code for a specific target device at runtime (with caching of compiled binary code), which is also sometimes referred to as "finalizing" code, in at least one embodiment. Doing so may permit finalized code to run on a target device, which may not have existed when source code was originally compiled into PTX code, in at least one embodiment. Alternatively, in at least one embodiment, device source code may be compiled into binary code offline, without requiring device kernel driver 2606 to compile IR code at runtime.

In at least one embodiment, at least one component shown or described with respect to FIG. 26 is utilized to implement techniques and/or functions described in connection with FIGS. 1-6. In at least one embodiment, at least one component of FIG. 26 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 26 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 27:
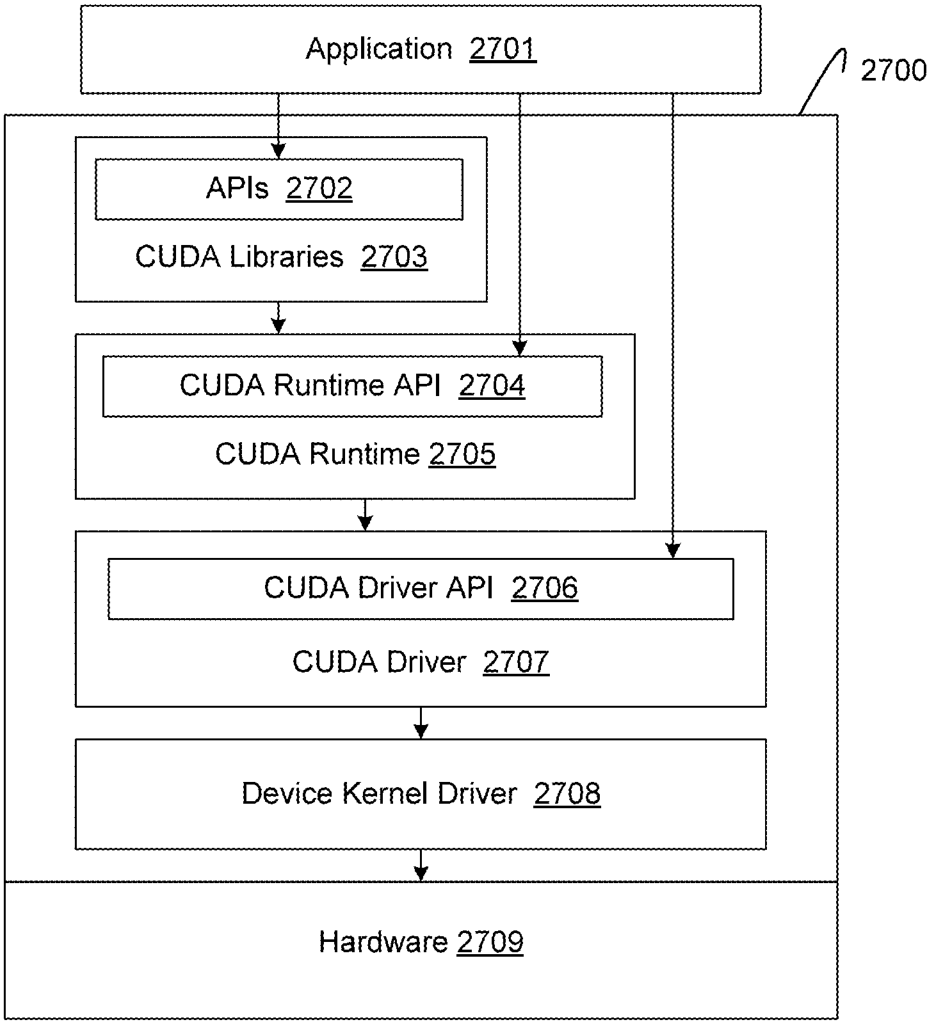
FIG. 27 illustrates a CUDA implementation of a software stack of FIG. 26, in accordance with at least one embodiment.

FIG. 27 illustrates a CUDA implementation of software stack 2600 of FIG. 26, in accordance with at least one embodiment. In at least one embodiment, a CUDA software stack 2700, on which an application 2701 may be launched, includes CUDA libraries 2703, a CUDA runtime 2705, a CUDA driver 2707, and a device kernel driver 2708. In at least one embodiment, CUDA software stack 2700 executes on hardware 2709, which may include a GPU that supports CUDA and is developed by NVIDIA Corporation of Santa Clara, CA.

In at least one embodiment, application 2701, CUDA runtime 2705, and device kernel driver 2708 may perform similar functionalities as application 2601, runtime 2605, and device kernel driver 2606, respectively, which are described above in conjunction with FIG. 26. In at least one embodiment, CUDA driver 2707 includes a library (libcuda.so) that implements a CUDA driver API 2706. Similar to a CUDA runtime API 2704 implemented by a CUDA runtime library (cudart), CUDA driver API 2706 may, without limitation, expose functions for memory management, execution control, device management, error handling, synchronization, and/or graphics interoperability, among other things, in at least one embodiment. In at least one embodiment, CUDA driver API 2706 differs from CUDA runtime API 2704 in that CUDA runtime API 2704 simplifies device code management by providing implicit initialization, context (analogous to a process) management, and module (analogous to dynamically loaded libraries) management. In contrast to high-level CUDA runtime API 2704, CUDA driver API 2706 is a low-level API providing more fine-grained control of the device, particularly with respect to contexts and module loading, in at least one embodiment. In at least one embodiment, CUDA driver API 2706 may expose functions for context management that are not exposed by CUDA runtime API 2704. In at least one embodiment, CUDA driver API 2706 is also language-independent and supports, e.g., OpenCL in addition to CUDA runtime API 2704. Further, in at least one embodiment, development libraries, including CUDA runtime 2705, may be considered as separate from driver components, including user-mode CUDA driver 2707 and kernel-mode device driver 2708 (also sometimes referred to as a "display" driver).

In at least one embodiment, CUDA libraries 2703 may include, but are not limited to, mathematical libraries, deep learning libraries, parallel algorithm libraries, and/or signal/image/video processing libraries, which parallel computing applications such as application 2701 may utilize. In at least one embodiment, CUDA libraries 2703 may include mathematical libraries such as a cuBLAS library that is an implementation of Basic Linear Algebra Subprograms ("BLAS") for performing linear algebra operations, a cuFFT library for computing fast Fourier transforms ("FFTs"), and a cuRAND library for generating random numbers, among others. In at least one embodiment, CUDA libraries 2703 may include deep learning libraries such as a cuDNN library of primitives for deep neural networks and a TensorRT platform for high-performance deep learning inference, among others.

In at least one embodiment, at least one component shown or described with respect to FIG. 27 is utilized to implement techniques and/or functions described in connection with FIGS. 1-6. In at least one embodiment, at least one component of FIG. 27 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 27 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 28:
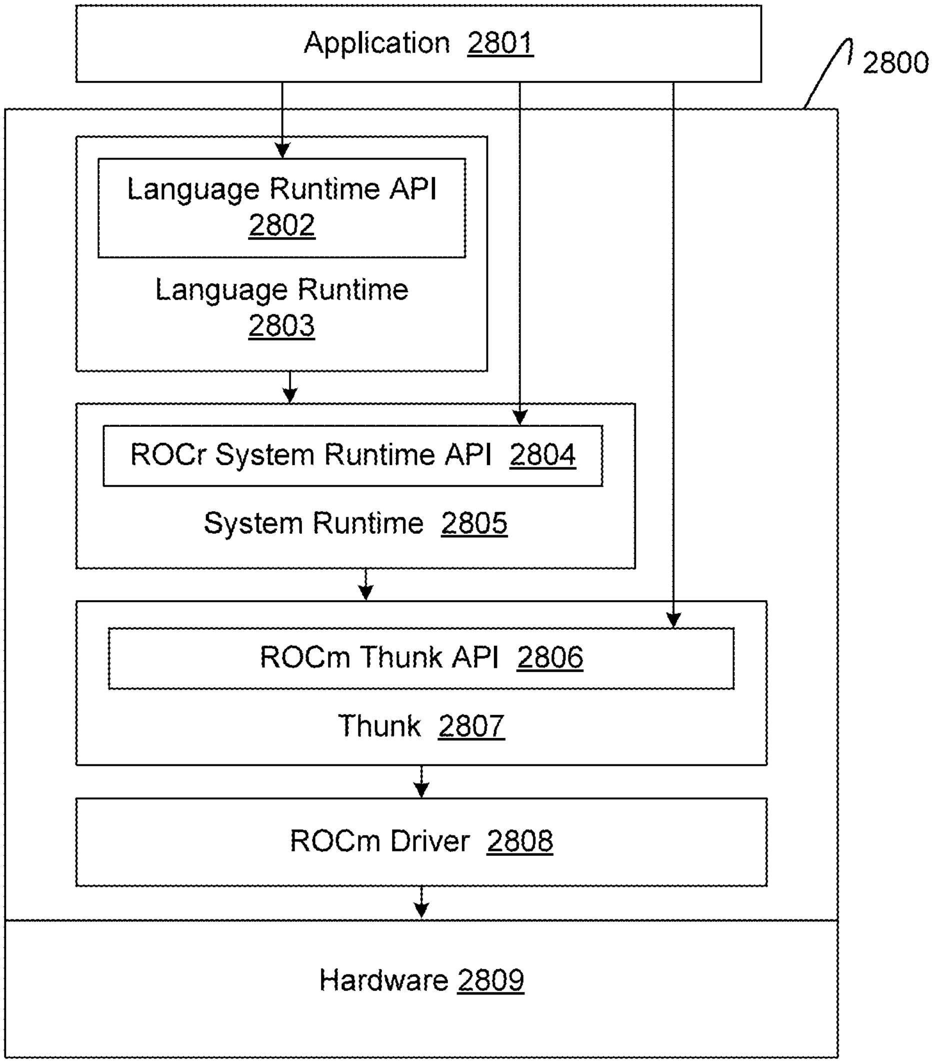
FIG. 28 illustrates a ROCm implementation of a software stack of FIG. 26, in accordance with at least one embodiment.

FIG. 28 illustrates a ROCm implementation of software stack 2600 of FIG. 26, in accordance with at least one embodiment. In at least one embodiment, a ROCm software stack 2800, on which an application 2801 may be launched, includes a language runtime 2803, a system runtime 2805, a thunk 2807, and a ROCm kernel driver 2808. In at least one embodiment, ROCm software stack 2800 executes on hardware 2809, which may include a GPU that supports ROCm and is developed by AMD Corporation of Santa Clara, CA.

In at least one embodiment, application 2801 may perform similar functionalities as application 2601 discussed above in conjunction with FIG. 26. In addition, language runtime 2803 and system runtime 2805 may perform similar functionalities as runtime 2605 discussed above in conjunction with FIG. 26, in at least one embodiment. In at least one embodiment, language runtime 2803 and system runtime 2805 differ in that system runtime 2805 is a language-independent runtime that implements a ROCr system runtime API 2804 and makes use of a Heterogeneous System Architecture ("HSA") Runtime API. HSA runtime API is a thin, user-mode API that exposes interfaces to access and interact with an AMD GPU, including functions for memory management, execution control via architected dispatch of kernels, error handling, system and agent information, and runtime initialization and shutdown, among other things, in at least one embodiment. In contrast to system runtime 2805, language runtime 2803 is an implementation of a language-specific runtime API 2802 layered on top of ROCr system runtime API 2804, in at least one embodiment. In at least one embodiment, language runtime API may include, but is not limited to, a Heterogeneous compute Interface for Portability ("HIP") language runtime API, a Heterogeneous Compute Compiler ("HCC") language runtime API, or an OpenCL API, among others. HIP language in particular is an extension of C++ programming language with functionally similar versions of CUDA mechanisms, and, in at least one embodiment, a HIP language runtime API includes functions that are similar to those of CUDA runtime API 2704 discussed above in conjunction with FIG. 27, such as functions for memory management, execution control, device management, error handling, and synchronization, among other things.

In at least one embodiment, thunk (ROCt) 2807 is an interface 2806 that can be used to interact with underlying ROCm driver 2808. In at least one embodiment, ROCm driver 2808 is a ROCk driver, which is a combination of an AMDGPU driver and a HSA kernel driver (amdkfd). In at least one embodiment, AMDGPU driver is a device kernel driver for GPUs developed by AMD that performs similar functionalities as device kernel driver 2606 discussed above in conjunction with FIG. 26. In at least one embodiment, HSA kernel driver is a driver permitting different types of processors to share system resources more effectively via hardware features.

In at least one embodiment, various libraries (not shown) may be included in ROCm software stack 2800 above language runtime 2803 and provide functionality similarity to CUDA libraries 2703, discussed above in conjunction with FIG. 27. In at least one embodiment, various libraries may include, but are not limited to, mathematical, deep learning, and/or other libraries such as a hipBLAS library that implements functions similar to those of CUDA cuBLAS, a rocFFT library for computing FFTs that is similar to CUDA cuFFT, among others.

In at least one embodiment, at least one component shown or described with respect to FIG. 28 is utilized to implement techniques and/or functions described in connection with FIGS. 1-6. In at least one embodiment, at least one component of FIG. 28 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 28 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 29:
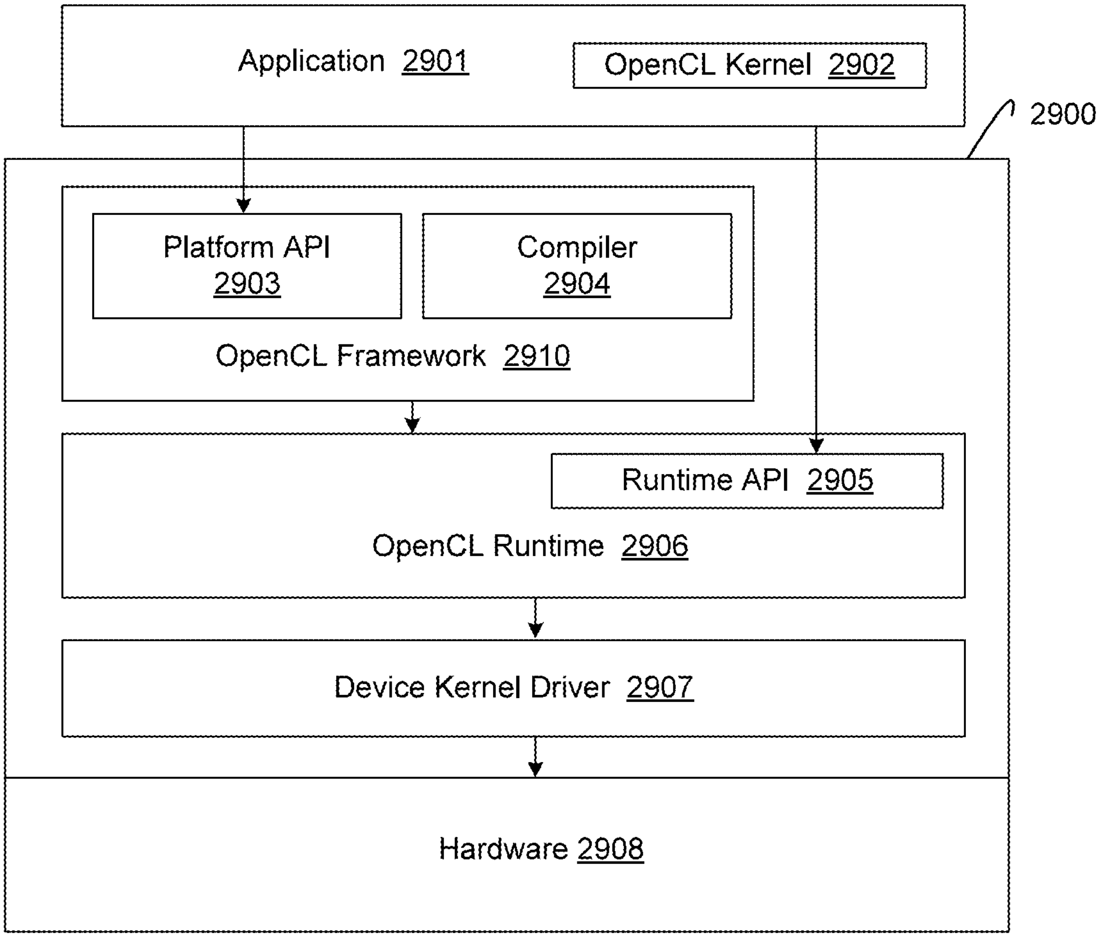
FIG. 29 illustrates an OpenCL implementation of a software stack of FIG. 26, in accordance with at least one embodiment.

FIG. 29 illustrates an OpenCL implementation of software stack 2600 of FIG. 26, in accordance with at least one embodiment. In at least one embodiment, an OpenCL software stack 2900, on which an application 2901 may be launched, includes an OpenCL framework 2910, an OpenCL runtime 2906, and a driver 2907. In at least one embodiment, OpenCL software stack 2900 executes on hardware 2709 that is not vendor-specific. As OpenCL is supported by devices developed by different vendors, specific OpenCL drivers may be required to interoperate with hardware from such vendors, in at least one embodiment.

In at least one embodiment, application 2901, OpenCL runtime 2906, device kernel driver 2907, and hardware 2908 may perform similar functionalities as application 2601, runtime 2605, device kernel driver 2606, and hardware 2607, respectively, that are discussed above in conjunction with FIG. 26. In at least one embodiment, application 2901 further includes an OpenCL kernel 2902 with code that is to be executed on a device.

In at least one embodiment, OpenCL defines a "platform" that allows a host to control devices connected to the host. In at least one embodiment, an OpenCL framework provides a platform layer API and a runtime API, shown as platform API 2903 and runtime API 2905. In at least one embodiment, runtime API 2905 uses contexts to manage execution of kernels on devices. In at least one embodiment, each identified device may be associated with a respective context, which runtime API 2905 may use to manage command queues, program objects, and kernel objects, share memory objects, among other things, for that device. In at least one embodiment, platform API 2903 exposes functions that permit device contexts to be used to select and initialize devices, submit work to devices via command queues, and enable data transfer to and from devices, among other things. In addition, OpenCL framework provides various built-in functions (not shown), including math functions, relational functions, and image processing functions, among others, in at least one embodiment.

In at least one embodiment, a compiler 2904 is also included in OpenCL frame-work 2910. Source code may be compiled offline prior to executing an application or online during execution of an application, in at least one embodiment. In contrast to CUDA and ROCm, OpenCL applications in at least one embodiment may be compiled online by compiler 2904, which is included to be representative of any number of compilers that may be used to compile source code and/or IR code, such as Standard Portable Intermediate Representation ("SPIR-V") code, into binary code. Alternatively, in at least one embodiment, OpenCL ap-plications may be compiled offline, prior to execution of such applications.

In at least one embodiment, at least one component shown or described with respect to FIG. 29 is utilized to implement techniques and/or functions described in connection with FIGS. 1-6. In at least one embodiment, at least one component of FIG. 29 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 29 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 30:
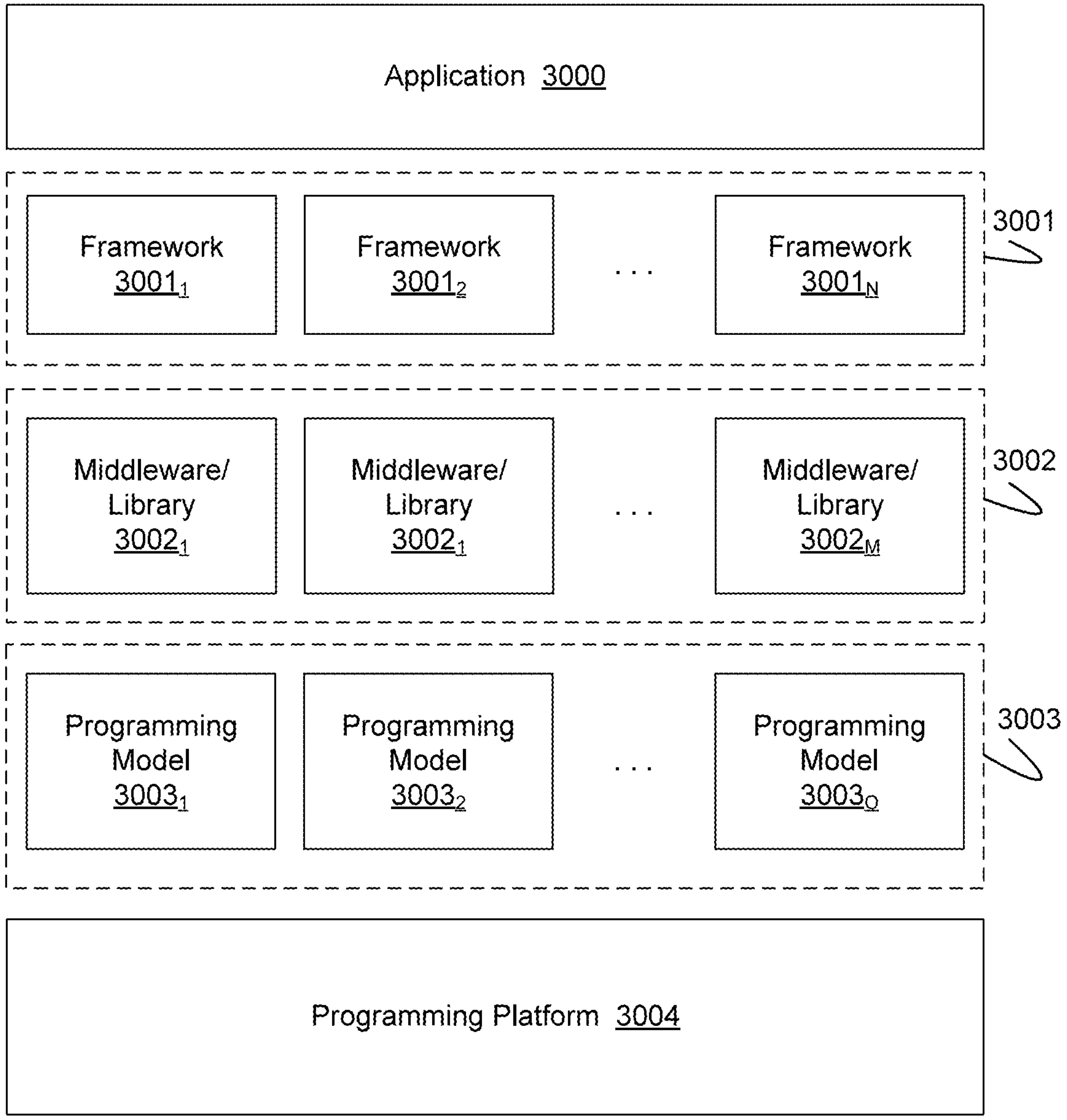
FIG. 30 illustrates software that is supported by a programming platform, in accordance with at least one embodiment.

FIG. 30 illustrates software that is supported by a programming platform, in accordance with at least one embodiment. In at least one embodiment, a programming platform 3004 is configured to support various programming models 3003, middlewares and/or libraries 3002, and frameworks 3001 that an application 3000 may rely upon. In at least one embodiment, application 3000 may be an AI/ML application implemented using, for example, a deep learning framework such as MXNet, PyTorch, or TensorFlow, which may rely on libraries such as cuDNN, NVIDIA Collective Communications Library ("NCCL"), and/or NVIDA Developer Data Loading Library ("DALI") CUDA libraries to provide accelerated computing on underlying hardware.

In at least one embodiment, programming platform 3004 may be one of a CUDA, ROCm, or OpenCL platform described above in conjunction with FIG. 27, FIG. 28, and FIG. 29, respectively. In at least one embodiment, programming platform 3004 supports multiple programming models 3003, which are abstractions of an underlying computing system permitting expressions of algorithms and data structures. Programming models 3003 may expose features of underlying hardware in order to improve performance, in at least one embodiment. In at least one embodiment, programming models 3003 may include, but are not limited to, CUDA, HIP, OpenCL, C++ Accelerated Massive Parallelism ("C++ AMP"), Open Multi-Processing ("OpenMP"), Open Accelerators ("OpenACC"), and/or Vulcan Compute.

In at least one embodiment, libraries and/or middlewares 3002 provide implementations of abstractions of programming models 3004. In at least one embodiment, such libraries include data and programming code that may be used by computer programs and leveraged during software development. In at least one embodiment, such middlewares include software that provides services to applications beyond those available from programming platform 3004. In at least one embodiment, libraries and/or middlewares 3002 may include, but are not limited to, cuBLAS, cuFFT, cuRAND, and other CUDA libraries, or rocBLAS, rocFFT, rocRAND, and other ROCm libraries. In addition, in at least one embodiment, libraries and/or middlewares 3002 may include NCCL and ROCm Communication Collectives Library ("RCCL") libraries providing communication routines for GPUs, a MIOpen library for deep learning acceleration, and/or an Eigen library for linear algebra, matrix and vector operations, geometrical transformations, numerical solvers, and related algorithms.

In at least one embodiment, application frameworks 3001 depend on libraries and/or middlewares 3002. In at least one embodiment, each of application frameworks 3001 is a software framework used to implement a standard structure of application software. Returning to the AI/ML example discussed above, an AI/ML application may be implemented using a framework such as Caffe, Caffe2, TensorFlow, Keras, PyTorch, or MxNet deep learning frameworks, in at least one embodiment.

In at least one embodiment, at least one component shown or described with respect to FIG. 30 is utilized to implement techniques and/or functions described in connection with FIGS. 1-6. In at least one embodiment, at least one component of FIG. 30 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 30 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 31:
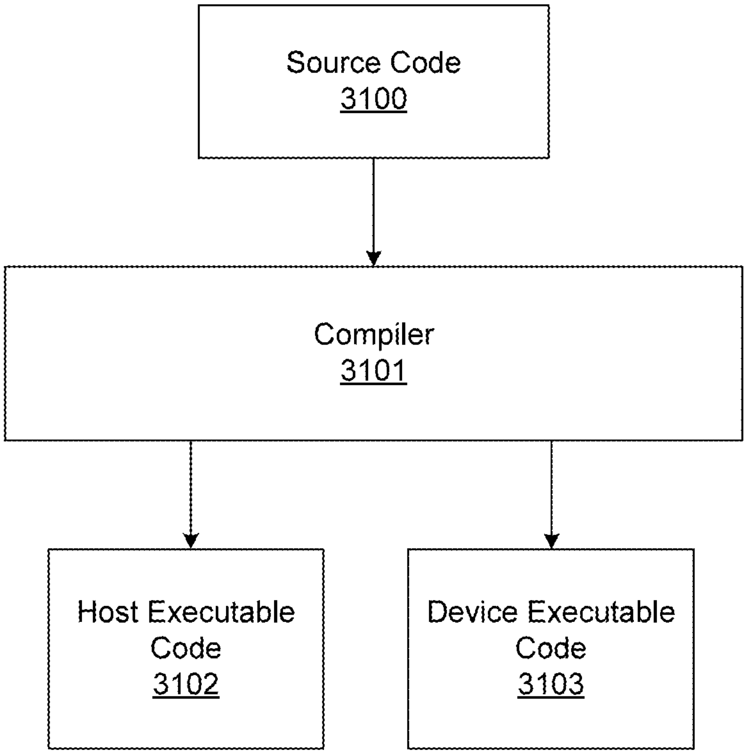
FIG. 31 illustrates compiling code to execute on programming platforms of FIGS. 26-29, in accordance with at least one embodiment.

FIG. 31 illustrates compiling code to execute on one of programming platforms of FIGS. 26-29, in accordance with at least one embodiment. In at least one embodiment, a compiler 3101 receives source code 3100 that includes both host code as well as device code. In at least one embodiment, complier 3101 is configured to convert source code 3100 into host executable code 3102 for execution on a host and device executable code 3103 for execution on a device. In at least one embodiment, source code 3100 may either be compiled offline prior to execution of an application, or online during execution of an application. In at least one embodiment, compiler 3101 includes or has access to one or more libraries to recognize a sequence of API calls to perform a single fused API, where a single fused API is a combined API for two or more APIs.

In at least one embodiment, source code 3100 may include code in any programming language supported by compiler 3101, such as C++, C, Fortran, etc. In at least one embodiment, source code 3100 may be included in a single-source file having a mixture of host code and device code, with locations of device code being indicated therein. In at least one embodiment, a single-source file may be a .cu file that includes CUDA code or a .hip.cpp file that includes HIP code. Alternatively, in at least one embodiment, source code 3100 may include multiple source code files, rather than a single-source file, into which host code and device code are separated.

In at least one embodiment, compiler 3101 is configured to compile source code 3100 into host executable code 3102 for execution on a host and device executable code 3103 for execution on a device. In at least one embodiment, compiler 3101 performs operations including parsing source code 3100 into an abstract system tree (AST), performing optimizations, and generating executable code. In at least one embodiment in which source code 3100 includes a single-source file, compiler 3101 may separate device code from host code in such a single-source file, compile device code and host code into device executable code 3103 and host executable code 3102, respectively, and link device executable code 3103 and host executable code 3102 together in a single file, as discussed in greater detail below with respect to FIG. 32.

In at least one embodiment, host executable code 3102 and device executable code 3103 may be in any suitable format, such as binary code and/or IR code. In the case of CUDA, host executable code 3102 may include native object code and device executable code 3103 may include code in PTX intermediate representation, in at least one embodiment. In the case of ROCm, both host executable code 3102 and device executable code 3103 may include target binary code, in at least one embodiment.

In at least one embodiment, at least one component shown or described with respect to FIG. 31 is utilized to implement techniques and/or functions described in connection with FIGS. 1-6. In at least one embodiment, at least one component of FIG. 31 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 31 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 32:
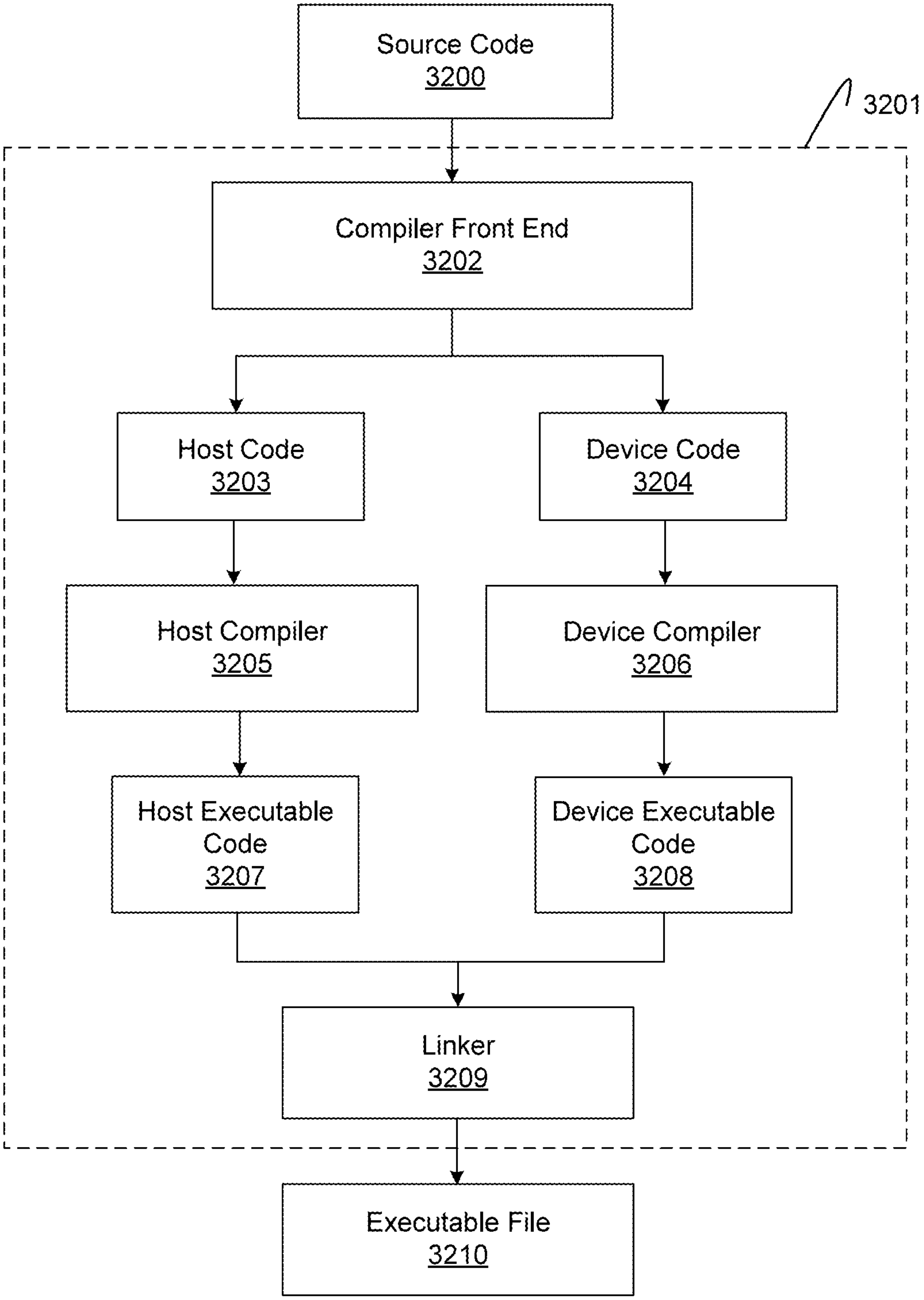
FIG. 32 illustrates in greater detail compiling code to execute on programming platforms of FIGS. 26-29, in accordance with at least one embodiment.

FIG. 32 is a more detailed illustration of compiling code to execute on one of programming platforms of FIGS. 26-29, in accordance with at least one embodiment. In at least one embodiment, a compiler 3201 is configured to receive source code 3200, compile source code 3200, and output an executable file 3210. In at least one embodiment, source code 3200 is a single-source file, such as a .cu file, a .hip.cpp file, or a file in another format, that includes both host and device code. In at least one embodiment, compiler 3201 may be, but is not limited to, an NVIDIA CUDA compiler ("NVCC") for compiling CUDA code in .cu files, or a HCC compiler for compiling HIP code in .hip.cpp files.

In at least one embodiment, compiler 3201 includes a compiler front end 3202, a host compiler 3205, a device compiler 3206, and a linker 3209. In at least one embodiment, compiler front end 3202 is configured to separate device code 3204 from host code 3203 in source code 3200. Device code 3204 is compiled by device compiler 3206 into device executable code 3208, which as described may include binary code or IR code, in at least one embodiment. Separately, host code 3203 is compiled by host compiler 3205 into host executable code 3207, in at least one embodiment. For NVCC, host compiler 3205 may be, but is not limited to, a general purpose C/C++ compiler that outputs native object code, while device compiler 3206 may be, but is not limited to, a Low Level Virtual Machine ("LLVM")-based compiler that forks a LLVM compiler infrastructure and outputs PTX code or binary code, in at least one embodiment. For HCC, both host compiler 3205 and device compiler 3206 may be, but are not limited to, LLVM-based compilers that output target binary code, in at least one embodiment.

Subsequent to compiling source code 3200 into host executable code 3207 and device executable code 3208, linker 3209 links host and device executable code 3207 and 3208 together in executable file 3210, in at least one embodiment. In at least one embodiment, native object code for a host and PTX or binary code for a device may be linked together in an Executable and Linkable Format ("ELF") file, which is a container format used to store object code.

In at least one embodiment, at least one component shown or described with respect to FIG. 32 is utilized to implement techniques and/or functions described in connection with FIGS. 1-6. In at least one embodiment, at least one component of FIG. 32 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 32 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 33:
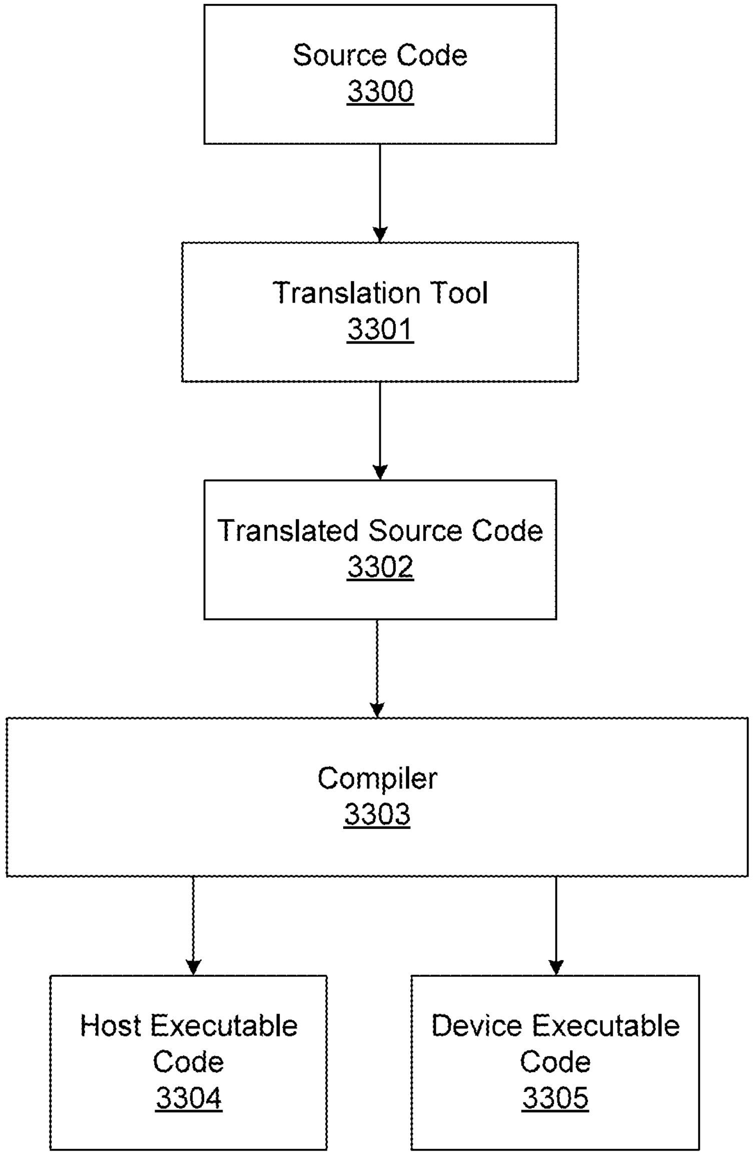
FIG. 33 illustrates translating source code prior to compiling source code, in accordance with at least one embodiment.

FIG. 33 illustrates translating source code prior to compiling source code, in accordance with at least one embodiment. In at least one embodiment, source code 3300 is passed through a translation tool 3301, which translates source code 3300 into translated source code 3302. In at least one embodiment, a compiler 3303 is used to compile translated source code 3302 into host executable code 3304 and device executable code 3305 in a process that is similar to compilation of source code 3100 by compiler 3101 into host executable code 3102 and device executable 3103, as discussed above in conjunction with FIG. 31.

In at least one embodiment, a translation performed by translation tool 3301 is used to port source 3300 for execution in a different environment than that in which it was originally intended to run. In at least one embodiment, translation tool 3301 may include, but is not limited to, a HIP translator that is used to "hipify" CUDA code intended for a CUDA platform into HIP code that can be compiled and executed on a ROCm platform. In at least one embodiment, translation of source code 3300 may include parsing source code 3300 and converting calls to API(s) provided by one programming model (e.g., CUDA) into corresponding calls to API(s) provided by another programming model (e.g., HIP), as discussed in greater detail below in conjunction with FIGS. 34A-35. Returning to the example of hipifying CUDA code, calls to CUDA runtime API, CUDA driver API, and/or CUDA libraries may be converted to corresponding HIP API calls, in at least one embodiment. In at least one embodiment, automated translations performed by translation tool 3301 may sometimes be incomplete, requiring additional, manual effort to fully port source code 3300.

In at least one embodiment, at least one component shown or described with respect to FIG. 33 is utilized to implement techniques and/or functions described in connection with FIGS. 1-6. In at least one embodiment, at least one component of FIG. 33 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 33 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Configuring Gpus for General-Purpose Computing

The following figures set forth, without limitation, exemplary architectures for compiling and executing compute source code, in accordance with at least one embodiment.

Figure 34A:
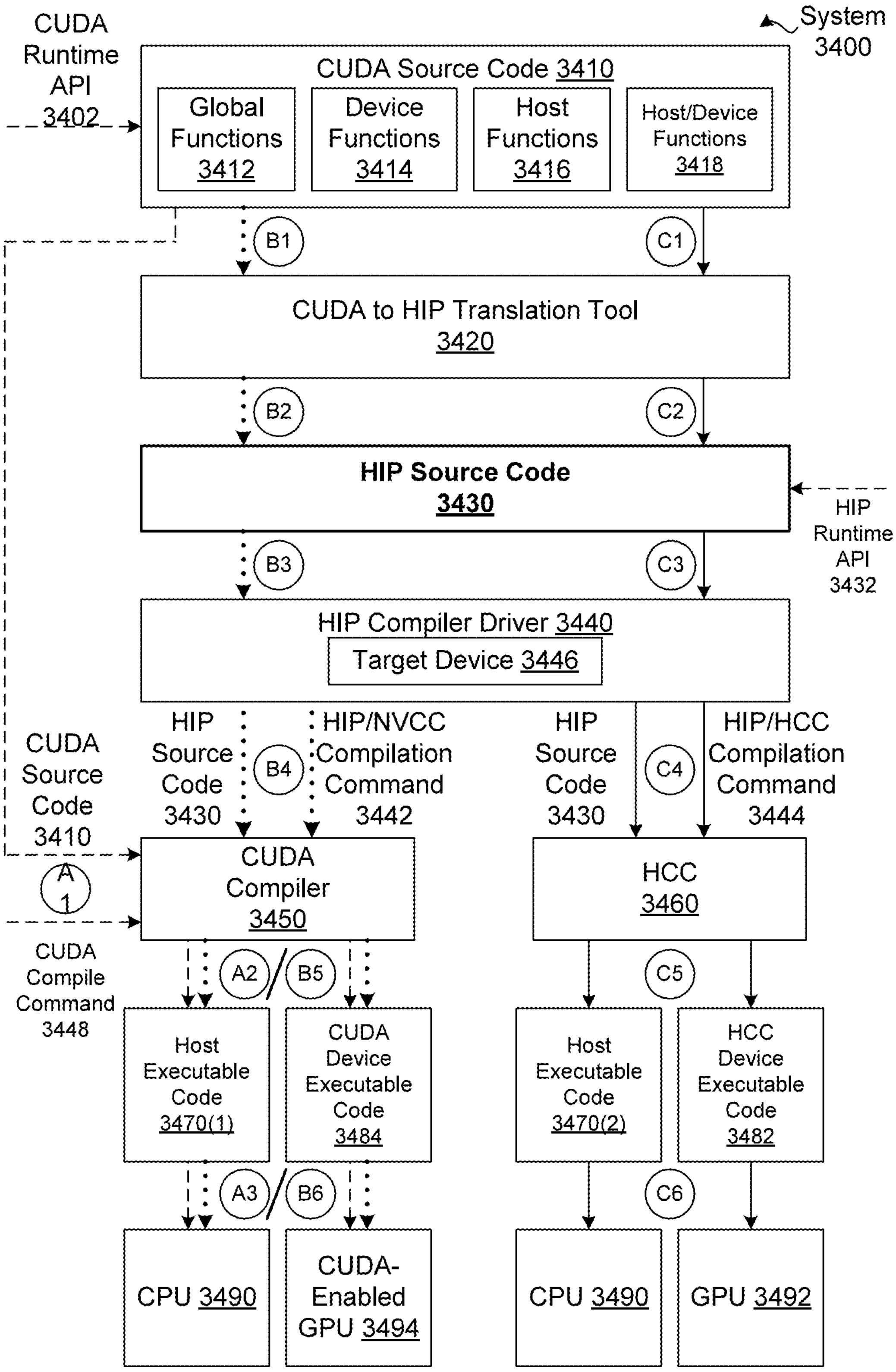
FIG. 34A illustrates a system configured to compile and execute CUDA source code using different types of processing units, in accordance with at least one embodiment.

FIG. 34A illustrates a system 3400 configured to compile and execute CUDA source code 3410 using different types of processing units, in accordance with at least one embodiment. In at least one embodiment, system 3400 includes, without limitation, CUDA source code 3410, a CUDA compiler 3450, host executable code 3470(1), host executable code 3470(2), CUDA device executable code 3484, a CPU 3490, a CUDA-enabled GPU 3494, a GPU 3492, a CUDA to HIP translation tool 3420, HIP source code 3430, a HIP compiler driver 3440, an HCC 3460, and HCC device executable code 3482.

In at least one embodiment, CUDA source code 3410 is a collection of human-readable code in a CUDA programming language. In at least one embodiment, CUDA code is human-readable code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable in parallel on a device. In at least one embodiment, a device may be a processor that is optimized for parallel instruction processing, such as CUDA-enabled GPU 3490, GPU 34192, or another GPGPU, etc. In at least one embodiment, host code is source code that, after compilation, is executable on a host. In at least one embodiment, a host is a processor that is optimized for sequential instruction processing, such as CPU 3490.

In at least one embodiment, CUDA source code 3410 includes, without limitation, any number (including zero) of global functions 3412, any number (including zero) of device functions 3414, any number (including zero) of host functions 3416, and any number (including zero) of host/device functions 3418. In at least one embodiment, global functions 3412, device functions 3414, host functions 3416, and host/device functions 3418 may be mixed in CUDA source code 3410. In at least one embodiment, each of global functions 3412 is executable on a device and callable from a host. In at least one embodiment, one or more of global functions 3412 may therefore act as entry points to a device. In at least one embodiment, each of global functions 3412 is a kernel. In at least one embodiment and in a technique known as dynamic parallelism, one or more of global functions 3412 defines a kernel that is executable on a device and callable from such a device. In at least one embodiment, a kernel is executed N (where N is any positive integer) times in parallel by N different threads on a device during execution.

In at least one embodiment, each of device functions 3414 is executed on a device and callable from such a device only. In at least one embodiment, each of host functions 3416 is executed on a host and callable from such a host only. In at least one embodiment, each of host/device functions 3416 defines both a host version of a function that is executable on a host and callable from such a host only and a device version of the function that is executable on a device and callable from such a device only.

In at least one embodiment, CUDA source code 3410 may also include, without limitation, any number of calls to any number of functions that are defined via a CUDA runtime API 3402. In at least one embodiment, CUDA runtime API 3402 may include, without limitation, any number of functions that execute on a host to allocate and deallocate device memory, transfer data between host memory and device memory, manage systems with multiple devices, etc. In at least one embodiment, CUDA source code 3410 may also include any number of calls to any number of functions that are specified in any number of other CUDA APIs. In at least one embodiment, a CUDA API may be any API that is designed for use by CUDA code. In at least one embodiment, CUDA APIs include, without limitation, CUDA runtime API 3402, a CUDA driver API, APIs for any number of CUDA libraries, etc. In at least one embodiment and relative to CUDA runtime API 3402, a CUDA driver API is a lower-level API but provides finer-grained control of a device. In at least one embodiment, examples of CUDA libraries include, without limitation, cuBLAS, cuFFT, cuRAND, cuDNN, etc.

In at least one embodiment, CUDA compiler 3450 compiles input CUDA code (e.g., CUDA source code 3410) to generate host executable code 3470(1) and CUDA device executable code 3484. In at least one embodiment, CUDA compiler 3450 is NVCC. In at least one embodiment, host executable code 3470(1) is a compiled version of host code included in input source code that is executable on CPU 3490. In at least one embodiment, CPU 3490 may be any processor that is optimized for sequential instruction processing.

In at least one embodiment, CUDA device executable code 3484 is a compiled version of device code included in input source code that is executable on CUDA-enabled GPU 3494. In at least one embodiment, CUDA device executable code 3484 includes, without limitation, binary code. In at least one embodiment, CUDA device executable code 3484 includes, without limitation, IR code, such as PTX code, that is further compiled at runtime into binary code for a specific target device (e.g., CUDA-enabled GPU 3494) by a device driver. In at least one embodiment, CUDA-enabled GPU 3494 may be any processor that is optimized for parallel instruction processing and that supports CUDA. In at least one embodiment, CUDA-enabled GPU 3494 is developed by NVIDIA Corporation of Santa Clara, CA.

In at least one embodiment, CUDA to HIP translation tool 3420 is configured to translate CUDA source code 3410 to functionally similar HIP source code 3430. In a least one embodiment, HIP source code 3430 is a collection of human-readable code in a HIP programming language. In at least one embodiment, HIP code is human-readable code in a HIP programming language. In at least one embodiment, a HIP programming language is an extension of the C++ programming language that includes, without limitation, functionally similar versions of CUDA mechanisms to define device code and distinguish between device code and host code. In at least one embodiment, a HIP programming language may include a subset of functionality of a CUDA programming language. In at least one embodiment, for example, a HIP programming language includes, without limitation, mechanism(s) to define global functions 3412, but such a HIP programming language may lack support for dynamic parallelism and therefore global functions 3412 defined in HIP code may be callable from a host only.

In at least one embodiment, HIP source code 3430 includes, without limitation, any number (including zero) of global functions 3412, any number (including zero) of device functions 3414, any number (including zero) of host functions 3416, and any number (including zero) of host/device functions 3418. In at least one embodiment, HIP source code 3430 may also include any number of calls to any number of functions that are specified in a HIP runtime API 3432. In at least one embodiment, HIP runtime API 3432 includes, without limitation, functionally similar versions of a subset of functions included in CUDA runtime API 3402. In at least one embodiment, HIP source code 3430 may also include any number of calls to any number of functions that are specified in any number of other HIP APIs. In at least one embodiment, a HIP API may be any API that is designed for use by HIP code and/or ROCm. In at least one embodiment, HIP APIs include, without limitation, HIP runtime API 3432, a HIP driver API, APIs for any number of HIP libraries, APIs for any number of ROCm libraries, etc.

In at least one embodiment, CUDA to HIP translation tool 3420 converts each kernel call in CUDA code from a CUDA syntax to a HIP syntax and converts any number of other CUDA calls in CUDA code to any number of other functionally similar HIP calls. In at least one embodiment, a CUDA call is a call to a function specified in a CUDA API, and a HIP call is a call to a function specified in a HIP API. In at least one embodiment, CUDA to HIP translation tool 3420 converts any number of calls to functions specified in CUDA runtime API 3402 to any number of calls to functions specified in HIP runtime API 3432.

In at least one embodiment, CUDA to HIP translation tool 3420 is a tool known as hipify-perl that executes a text-based translation process. In at least one embodiment, CUDA to HIP translation tool 3420 is a tool known as hipify-clang that, relative to hipify-perl, executes a more complex and more robust translation process that involves parsing CUDA code using clang (a compiler front-end) and then translating resulting symbols. In at least one embodiment, properly converting CUDA code to HIP code may require modifications (e.g., manual edits) in addition to those performed by CUDA to HIP translation tool 3420.

In at least one embodiment, HIP compiler driver 3440 is a front end that determines a target device 3446 and then configures a compiler that is compatible with target device 3446 to compile HIP source code 3430. In at least one embodiment, target device 3446 is a processor that is optimized for parallel instruction processing. In at least one embodiment, HIP compiler driver 3440 may determine target device 3446 in any technically feasible fashion.

In at least one embodiment, if target device 3446 is compatible with CUDA (e.g., CUDA-enabled GPU 3494), then HIP compiler driver 3440 generates a HIP/NVCC compilation command 3442. In at least one embodiment and as described in greater detail in conjunction with FIG. 34B, HIP/NVCC compilation command 3442 configures CUDA compiler 3450 to compile HIP source code 3430 using, without limitation, a HIP to CUDA translation header and a CUDA runtime library. In at least one embodiment and in response to HIP/NVCC compilation command 3442, CUDA compiler 3450 generates host executable code 3470(1) and CUDA device executable code 3484.

In at least one embodiment, if target device 3446 is not compatible with CUDA, then HIP compiler driver 3440 generates a HIP/HCC compilation command 3444. In at least one embodiment and as described in greater detail in conjunction with FIG. 34C, HIP/HCC compilation command 3444 configures HCC 3460 to compile HIP source code 3430 using, without limitation, an HCC header and a HIP/HCC runtime library. In at least one embodiment and in response to HIP/HCC compilation command 3444, HCC 3460 generates host executable code 3470(2) and HCC device executable code 3482. In at least one embodiment, HCC device executable code 3482 is a compiled version of device code included in HIP source code 3430 that is executable on GPU 3492. In at least one embodiment, GPU 3492 may be any processor that is optimized for parallel instruction processing, is not compatible with CUDA, and is compatible with HCC. In at least one embodiment, GPU 3492 is developed by AMD Corporation of Santa Clara, CA. In at least one embodiment GPU, 3492 is a non-CUDA-enabled GPU 3492.

For explanatory purposes only, three different flows that may be implemented in at least one embodiment to compile CUDA source code 3410 for execution on CPU 3490 and different devices are depicted in FIG. 34A. In at least one embodiment, a direct CUDA flow compiles CUDA source code 3410 for execution on CPU 3490 and CUDA-enabled GPU 3494 without translating CUDA source code 3410 to HIP source code 3430. In at least one embodiment, an indirect CUDA flow translates CUDA source code 3410 to HIP source code 3430 and then compiles HIP source code 3430 for execution on CPU 3490 and CUDA-enabled GPU 3494. In at least one embodiment, a CUDA/HCC flow translates CUDA source code 3410 to HIP source code 3430 and then compiles HIP source code 3430 for execution on CPU 3490 and GPU 3492.

A direct CUDA flow that may be implemented in at least one embodiment is depicted via dashed lines and a series of bubbles annotated A1-A3. In at least one embodiment and as depicted with bubble annotated A1, CUDA compiler 3450 receives CUDA source code 3410 and a CUDA compile command 3448 that configures CUDA compiler 3450 to compile CUDA source code 3410. In at least one embodiment, CUDA source code 3410 used in a direct CUDA flow is written in a CUDA programming language that is based on a programming language other than C++(e.g., C, Fortran, Python, Java, etc.). In at least one embodiment and in response to CUDA compile command 3448, CUDA compiler 3450 generates host executable code 3470(1) and CUDA device executable code 3484 (depicted with bubble annotated A2). In at least one embodiment and as depicted with bubble annotated A3, host executable code 3470(1) and CUDA device executable code 3484 may be executed on, respectively, CPU 3490 and CUDA-enabled GPU 3494. In at least one embodiment, CUDA device executable code 3484 includes, without limitation, binary code. In at least one embodiment, CUDA device executable code 3484 includes, without limitation, PTX code and is further compiled into binary code for a specific target device at runtime.

An indirect CUDA flow that may be implemented in at least one embodiment is depicted via dotted lines and a series of bubbles annotated B1-B6. In at least one embodiment and as depicted with bubble annotated B1, CUDA to HIP translation tool 3420 receives CUDA source code 3410. In at least one embodiment and as depicted with bubble annotated B2, CUDA to HIP translation tool 3420 translates CUDA source code 3410 to HIP source code 3430. In at least one embodiment and as depicted with bubble annotated B3, HIP compiler driver 3440 receives HIP source code 3430 and determines that target device 3446 is CUDA-enabled.

In at least one embodiment and as depicted with bubble annotated B4, HIP compiler driver 3440 generates HIP/NVCC compilation command 3442 and transmits both HIP/NVCC compilation command 3442 and HIP source code 3430 to CUDA compiler 3450. In at least one embodiment and as described in greater detail in conjunction with FIG. 34B, HIP/NVCC compilation command 3442 configures CUDA compiler 3450 to compile HIP source code 3430 using, without limitation, a HIP to CUDA translation header and a CUDA runtime library. In at least one embodiment and in response to HIP/NVCC compilation command 3442, CUDA compiler 3450 generates host executable code 3470 (1) and CUDA device executable code 3484 (depicted with bubble annotated B5). In at least one embodiment and as depicted with bubble annotated B6, host executable code 3470(1) and CUDA device executable code 3484 may be executed on, respectively, CPU 3490 and CUDA-enabled GPU 3494. In at least one embodiment, CUDA device executable code 3484 includes, without limitation, binary code. In at least one embodiment, CUDA device executable code 3484 includes, without limitation, PTX code and is further compiled into binary code for a specific target device at runtime.

A CUDA/HCC flow that may be implemented in at least one embodiment is depicted via solid lines and a series of bubbles annotated C1-C6. In at least one embodiment and as depicted with bubble annotated C1, CUDA to HIP translation tool 3420 receives CUDA source code 3410. In at least one embodiment and as depicted with bubble annotated C2, CUDA to HIP translation tool 3420 translates CUDA source code 3410 to HIP source code 3430. In at least one embodiment and as depicted with bubble annotated C3, HIP compiler driver 3440 receives HIP source code 3430 and determines that target device 3446 is not CUDA-enabled.

In at least one embodiment, HIP compiler driver 3440 generates HIP/HCC compilation command 3444 and transmits both HIP/HCC compilation command 3444 and HIP source code 3430 to HCC 3460 (depicted with bubble annotated C4). In at least one embodiment and as described in greater detail in conjunction with FIG. 34C, HIP/HCC compilation command 3444 configures HCC 3460 to compile HIP source code 3430 using, without limitation, an HCC header and a HIP/HCC runtime library. In at least one embodiment and in response to HIP/HCC compilation command 3444, HCC 3460 generates host executable code 3470(2) and HCC device executable code 3482 (depicted with bubble annotated C5). In at least one embodiment and as depicted with bubble annotated C6, host executable code 3470(2) and HCC device executable code 3482 may be executed on, respectively, CPU 3490 and GPU 3492.

In at least one embodiment, after CUDA source code 3410 is translated to HIP source code 3430, HIP compiler driver 3440 may subsequently be used to generate executable code for either CUDA-enabled GPU 3494 or GPU 3492 without re-executing CUDA to HIP translation tool 3420. In at least one embodiment, CUDA to HIP translation tool 3420 translates CUDA source code 3410 to HIP source code 3430 that is then stored in memory. In at least one embodiment, HIP compiler driver 3440 then configures HCC 3460 to generate host executable code 3470(2) and HCC device executable code 3482 based on HIP source code 3430. In at least one embodiment, HIP compiler driver 3440 subsequently configures CUDA compiler 3450 to generate host executable code 3470(1) and CUDA device executable code 3484 based on stored HIP source code 3430.

Figure 34B:
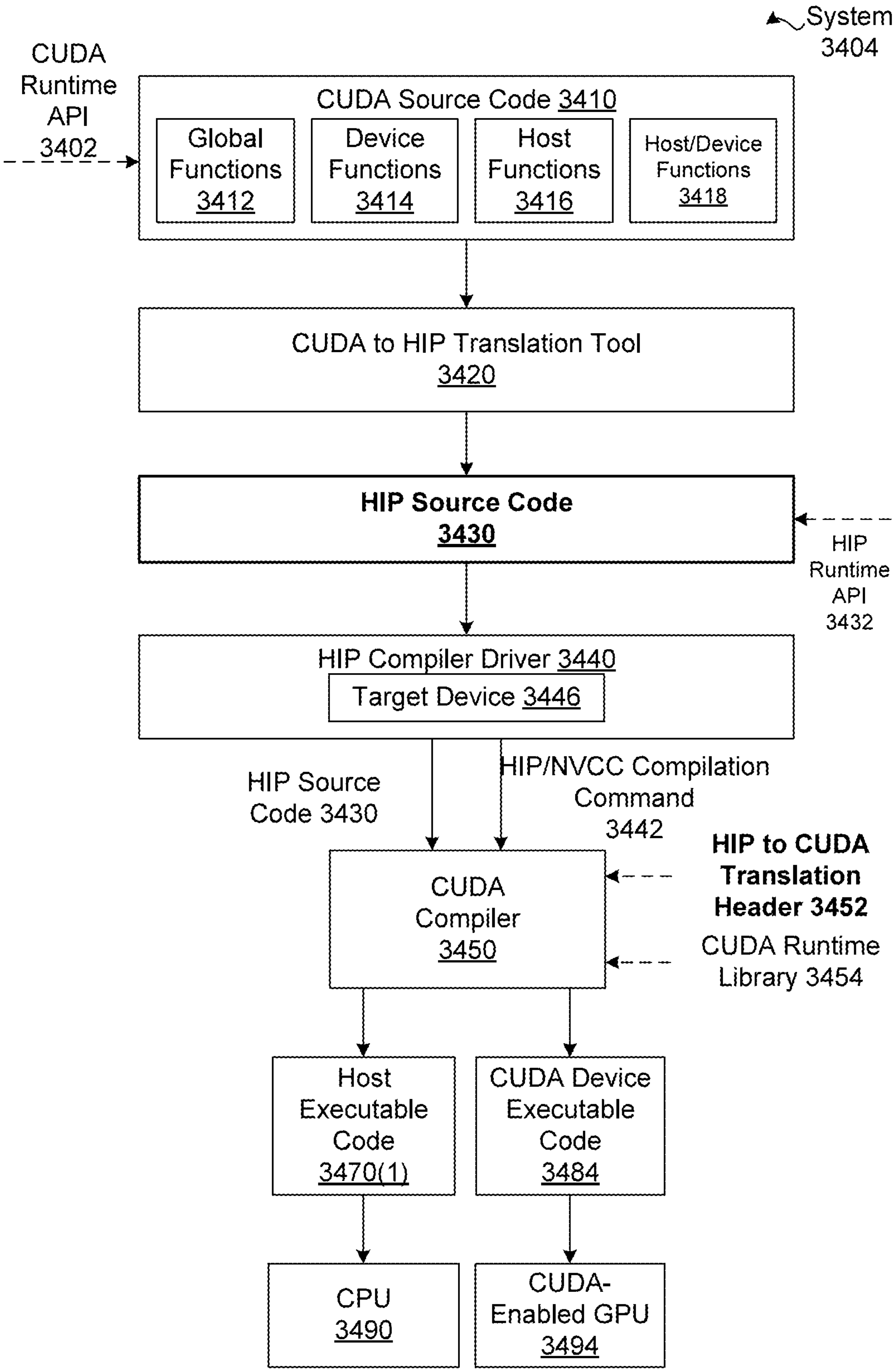
FIG. 34B illustrates a system configured to compile and execute CUDA source code of FIG. 34A using a CPU and a CUDA-enabled GPU, in accordance with at least one embodiment.

FIG. 34B illustrates a system 3404 configured to compile and execute CUDA source code 3410 of FIG. 34A using CPU 3490 and CUDA-enabled GPU 3494, in accordance with at least one embodiment. In at least one embodiment, system 3404 includes, without limitation, CUDA source code 3410, CUDA to HIP translation tool 3420, HIP source code 3430, HIP compiler driver 3440, CUDA compiler 3450, host executable code 3470(1), CUDA device executable code 3484, CPU 3490, and CUDA-enabled GPU 3494.

In at least one embodiment and as described previously herein in conjunction with FIG. 34A, CUDA source code 3410 includes, without limitation, any number (including zero) of global functions 3412, any number (including zero) of device functions 3414, any number (including zero) of host functions 3416, and any number (including zero) of host/device functions 3418. In at least one embodiment, CUDA source code 3410 also includes, without limitation, any number of calls to any number of functions that are specified in any number of CUDA APIs.

In at least one embodiment, CUDA to HIP translation tool 3420 translates CUDA source code 3410 to HIP source code 3430. In at least one embodiment, CUDA to HIP translation tool 3420 converts each kernel call in CUDA source code 3410 from a CUDA syntax to a HIP syntax and converts any number of other CUDA calls in CUDA source code 3410 to any number of other functionally similar HIP calls.

In at least one embodiment, HIP compiler driver 3440 determines that target device 3446 is CUDA-enabled and generates HIP/NVCC compilation command 3442. In at least one embodiment, HIP compiler driver 3440 then configures CUDA compiler 3450 via HIP/NVCC compilation command 3442 to compile HIP source code 3430. In at least one embodiment, HIP compiler driver 3440 provides access to a HIP to CUDA translation header 3452 as part of configuring CUDA compiler 3450. In at least one embodiment, HIP to CUDA translation header 3452 translates any number of mechanisms (e.g., functions) specified in any number of HIP APIs to any number of mechanisms specified in any number of CUDA APIs. In at least one embodiment, CUDA compiler 3450 uses HIP to CUDA translation header 3452 in conjunction with a CUDA runtime library 3454 corresponding to CUDA runtime API 3402 to generate host executable code 3470(1) and CUDA device executable code 3484. In at least one embodiment, host executable code 3470(1) and CUDA device executable code 3484 may then be executed on, respectively, CPU 3490 and CUDA-enabled GPU 3494. In at least one embodiment, CUDA device executable code 3484 includes, without limitation, binary code. In at least one embodiment, CUDA device executable code 3484 includes, without limitation, PTX code and is further compiled into binary code for a specific target device at runtime.

Figure 34C:
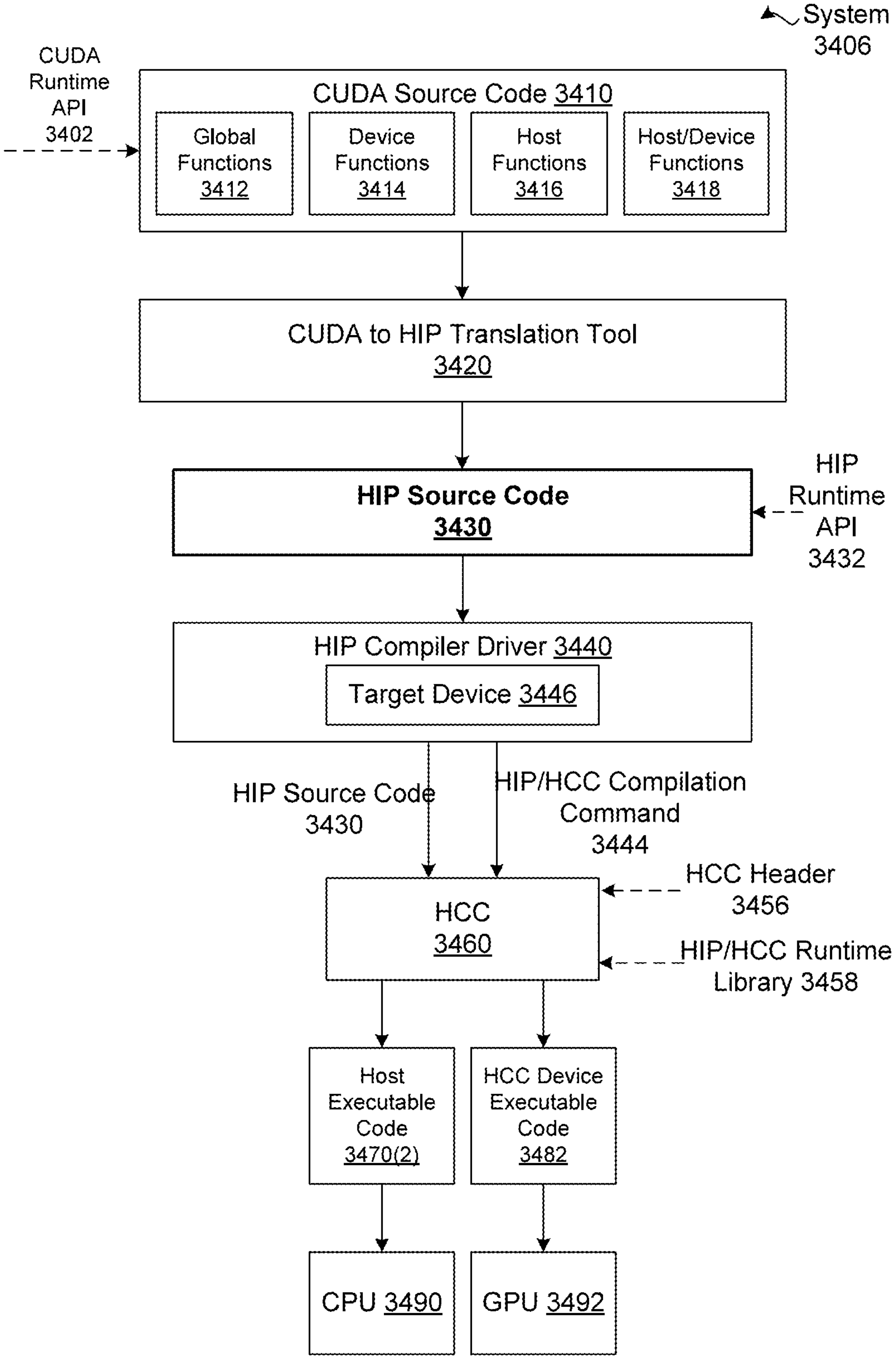
FIG. 34C illustrates a system configured to compile and execute CUDA source code of FIG. 34A using a CPU and a non-CUDA-enabled GPU, in accordance with at least one embodiment.

FIG. 34C illustrates a system 3406 configured to compile and execute CUDA source code 3410 of FIG. 34A using CPU 3490 and non-CUDA-enabled GPU 3492, in accordance with at least one embodiment. In at least one embodiment, system 3406 includes, without limitation, CUDA source code 3410, CUDA to HIP translation tool 3420, HIP source code 3430, HIP compiler driver 3440, HCC 3460, host executable code 3470(2), HCC device executable code 3482, CPU 3490, and GPU 3492.

In at least one embodiment and as described previously herein in conjunction with FIG. 34A, CUDA source code 3410 includes, without limitation, any number (including zero) of global functions 3412, any number (including zero) of device functions 3414, any number (including zero) of host functions 3416, and any number (including zero) of host/device functions 3418. In at least one embodiment, CUDA source code 3410 also includes, without limitation, any number of calls to any number of functions that are specified in any number of CUDA APIs.

In at least one embodiment, CUDA to HIP translation tool 3420 translates CUDA source code 3410 to HIP source code 3430. In at least one embodiment, CUDA to HIP translation tool 3420 converts each kernel call in CUDA source code 3410 from a CUDA syntax to a HIP syntax and converts any number of other CUDA calls in source code 3410 to any number of other functionally similar HIP calls.

In at least one embodiment, HIP compiler driver 3440 subsequently determines that target device 3446 is not CUDA-enabled and generates HIP/HCC compilation command 3444. In at least one embodiment, HIP compiler driver 3440 then configures HCC 3460 to execute HIP/HCC compilation command 3444 to compile HIP source code 3430. In at least one embodiment, HIP/HCC compilation command 3444 configures HCC 3460 to use, without limitation, a HIP/HCC runtime library 3458 and an HCC header 3456 to generate host executable code 3470(2) and HCC device executable code 3482. In at least one embodiment, HIP/

HCC runtime library 3458 corresponds to HIP runtime API 3432. In at least one embodiment, HCC header 3456 includes, without limitation, any number and type of interoperability mechanisms for HIP and HCC. In at least one embodiment, host executable code 3470(2) and HCC device executable code 3482 may be executed on, respectively, CPU 3490 and GPU 3492.

In at least one embodiment, at least one component shown or described with respect to FIGS. 34A-34C is utilized to implement techniques and/or functions described in connection with FIGS. 1-6. In at least one embodiment, at least one component of FIGS. 34A-34C is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIGS. 34A-34C performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 35:
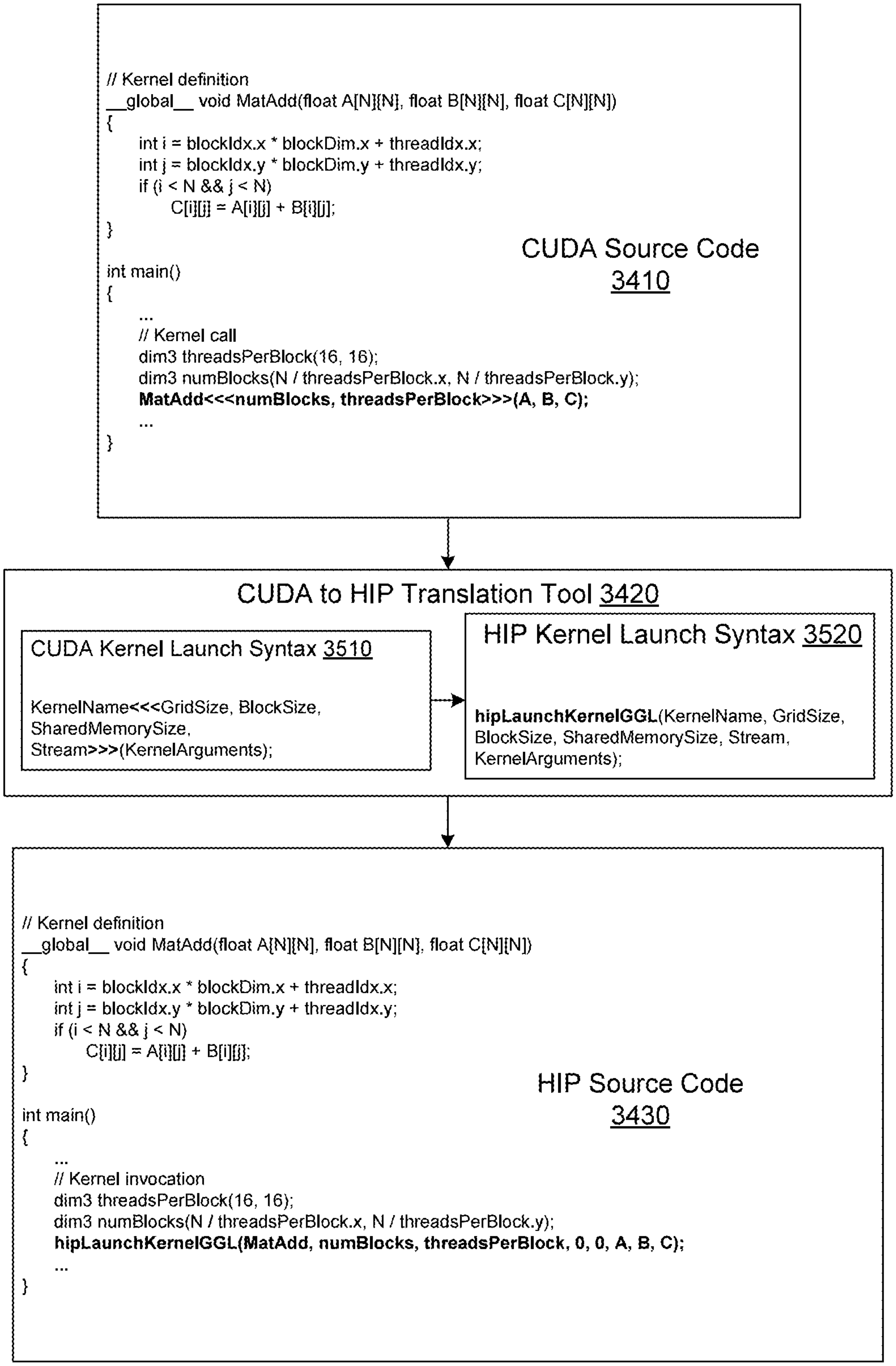
FIG. 35 illustrates an exemplary kernel translated by CUDA-to-HIP translation tool of FIG. 34C, in accordance with at least one embodiment.

FIG. 35 illustrates an exemplary kernel translated by CUDA-to-HIP translation tool 3420 of FIG. 34C, in accordance with at least one embodiment. In at least one embodiment, CUDA source code 3410 partitions an overall problem that a given kernel is designed to solve into relatively coarse sub-problems that can independently be solved using thread blocks. In at least one embodiment, each thread block includes, without limitation, any number of threads. In at least one embodiment, each sub-problem is partitioned into relatively fine pieces that can be solved cooperatively in parallel by threads within a thread block. In at least one embodiment, threads within a thread block can cooperate by sharing data through shared memory and by synchronizing execution to coordinate memory accesses.

In at least one embodiment, CUDA source code 3410 organizes thread blocks associated with a given kernel into a one-dimensional, a two-dimensional, or a three-dimensional grid of thread blocks. In at least one embodiment, each thread block includes, without limitation, any number of threads, and a grid includes, without limitation, any number of thread blocks.

In at least one embodiment, a kernel is a function in device code that is defined using a "__global__" declaration specifier. In at least one embodiment, the dimension of a grid that executes a kernel for a given kernel call and associated streams are specified using a CUDA kernel launch syntax 3510. In at least one embodiment, CUDA kernel launch syntax 3510 is specified as "KernelName<<<GridSize, BlockSize, SharedMemorySize, Stream>>>(KemelArguments);". In at least one embodiment, an execution configuration syntax is a "<<< . . . >>>" construct that is inserted between a kernel name ("KernelName") and a parenthesized list of kernel arguments ("KernelArguments"). In at least one embodiment, CUDA kernel launch syntax 3510 includes, without limitation, a CUDA launch function syntax instead of an execution configuration syntax.

In at least one embodiment, "GridSize" is of a type dim3 and specifies the dimension and size of a grid. In at least one embodiment, type dim3 is a CUDA-defined structure that includes, without limitation, unsigned integers x, y, and z. In at least one embodiment, if z is not specified, then z defaults to one. In at least one embodiment, if y is not specified, then y defaults to one. In at least one embodiment, the number of thread blocks in a grid is equal to the product of GridSize.x, GridSize.y, and GridSize.z. In at least one embodiment, "BlockSize" is of type dim3 and specifies the dimension and size of each thread block. In at least one embodiment, the number of threads per thread block is equal to the product of BlockSize.x, BlockSize.y, and BlockSize.z. In at least one embodiment, each thread that executes a kernel is given a unique thread ID that is accessible within the kernel through a built-in variable (e.g., "threadIdx").

In at least one embodiment and with respect to CUDA kernel launch syntax 3510, "SharedMemorySize" is an optional argument that specifies a number of bytes in a shared memory that is dynamically allocated per thread block for a given kernel call in addition to statically allocated memory. In at least one embodiment and with respect to CUDA kernel launch syntax 3510, SharedMemorySize defaults to zero. In at least one embodiment and with respect to CUDA kernel launch syntax 3510, "Stream" is an optional argument that specifies an associated stream and defaults to zero to specify a default stream. In at least one embodiment, a stream is a sequence of commands (possibly issued by different host threads) that execute in order. In at least one embodiment, different streams may execute commands out of order with respect to one another or concurrently.

In at least one embodiment, CUDA source code 3410 includes, without limitation, a kernel definition for an exemplary kernel "MatAdd" and a main function. In at least one embodiment, main function is host code that executes on a host and includes, without limitation, a kernel call that causes kernel MatAdd to execute on a device. In at least one embodiment and as shown, kernel MatAdd adds two matrices A and B of size N×N, where N is a positive integer, and stores the result in a matrix C. In at least one embodiment, main function defines a threadsPerBlock variable as 16 by 16 and a numBlocks variable as N/16 by N/16. In at least one embodiment, main function then specifies kernel call "MatAdd<<<numBlocks, threadsPerBlock>>>(A, B, C);". In at least one embodiment and as per CUDA kernel launch syntax 3510, kernel MatAdd is executed using a grid of thread blocks having a dimension N/16 by N/16, where each thread block has a dimension of 16 by 16. In at least one embodiment, each thread block includes 256 threads, a grid is created with enough blocks to have one thread per matrix element, and each thread in such a grid executes kernel MatAdd to perform one pair-wise addition.

In at least one embodiment, while translating CUDA source code 3410 to HIP source code 3430, CUDA to HIP translation tool 3420 translates each kernel call in CUDA source code 3410 from CUDA kernel launch syntax 3510 to a HIP kernel launch syntax 3520 and converts any number of other CUDA calls in source code 3410 to any number of other functionally similar HIP calls. In at least one embodiment, HIP kernel launch syntax 3520 is specified as "hipLaunchKernelGGL(KernelName,GridSize, BlockSize, SharedMemorySize, Stream, KernelArguments);". In at least one embodiment, each of KernelName, GridSize, BlockSize, ShareMemorySize, Stream, and KernelArguments has the same meaning in HIP kernel launch syntax 3520 as in CUDA kernel launch syntax 3510 (described previously herein). In at least one embodiment, arguments SharedMemorySize and Stream are required in HIP kernel launch syntax 3520 and are optional in CUDA kernel launch syntax 3510.

In at least one embodiment, a portion of HIP source code 3430 depicted in FIG. 35 is identical to a portion of CUDA source code 3410 depicted in FIG. 35 except for a kernel call that causes kernel MatAdd to execute on a device. In at least one embodiment, kernel MatAdd is defined in HIP source code 3430 with the same "__global__" declaration specifier with which kernel MatAdd is defined in CUDA source code 3410. In at least one embodiment, a kernel call in HIP source code 3430 is "hipLaunchKernelGGL(MatAdd, numBlocks, threadsPerBlock, 0, 0, A, B, C);", while a corresponding kernel call in CUDA source code 3410 is "MatAdd<<<numBlocks, threadsPerBlock>>>(A, B, C);".

In at least one embodiment, at least one component shown or described with respect to FIG. 35 is utilized to implement techniques and/or functions described in connection with FIGS. 1-6. In at least one embodiment, at least one component of FIG. 35 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 35 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 36:
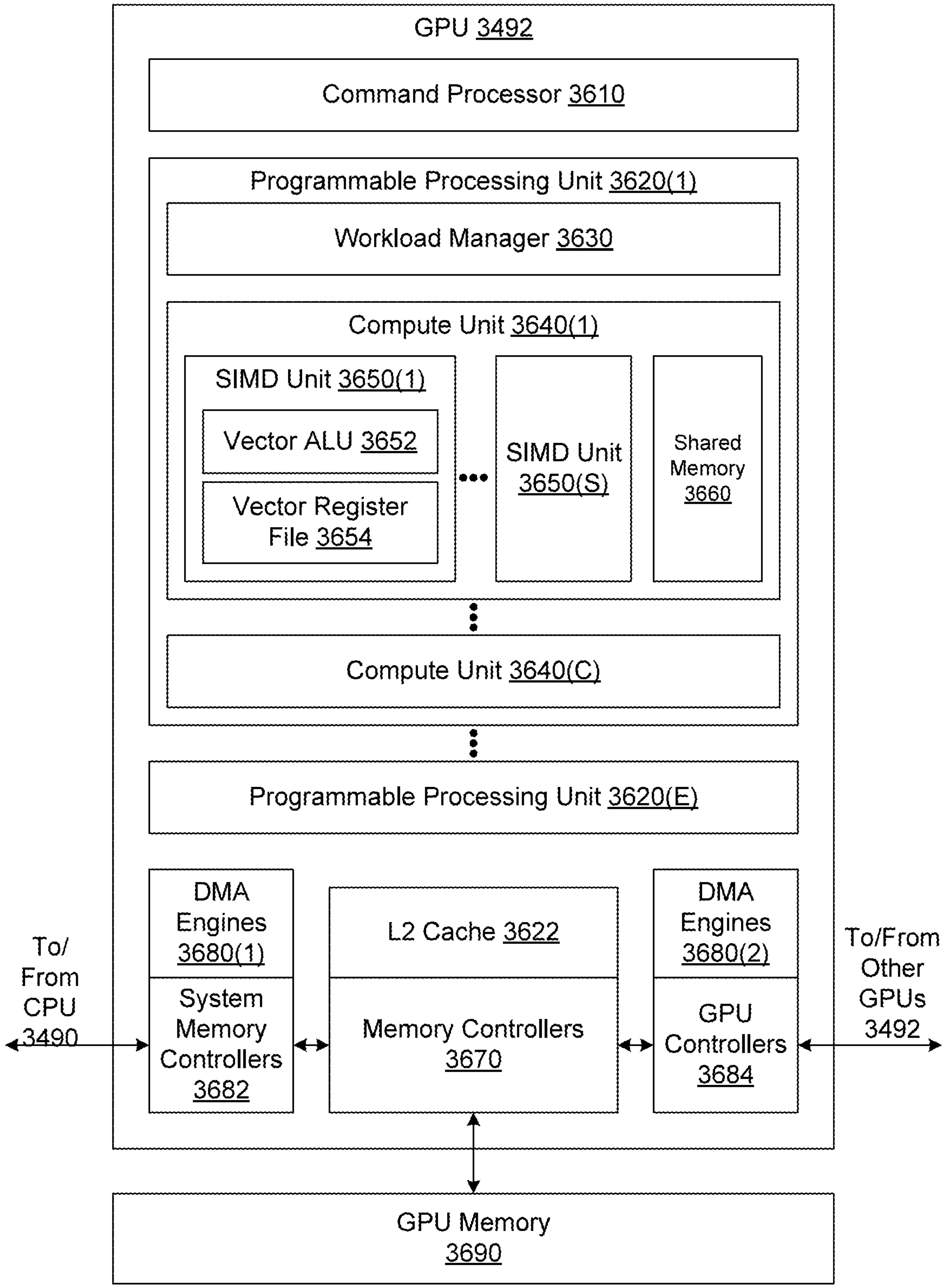
FIG. 36 illustrates non-CUDA-enabled GPU of FIG. 34C in greater detail, in accordance with at least one embodiment.

FIG. 36 illustrates non-CUDA-enabled GPU 3492 of FIG. 34C in greater detail, in accordance with at least one embodiment. In at least one embodiment, GPU 3492 is developed by AMD corporation of Santa Clara. In at least one embodiment, GPU 3492 can be configured to perform compute operations in a highly-parallel fashion. In at least one embodiment, GPU 3492 is configured to execute graphics pipeline operations such as draw commands, pixel operations, geometric computations, and other operations associated with rendering an image to a display. In at least one embodiment, GPU 3492 is configured to execute operations unrelated to graphics. In at least one embodiment, GPU 3492 is configured to execute both operations related to graphics and operations unrelated to graphics. In at least one embodiment, GPU 3492 can be configured to execute device code included in HIP source code 3430.

In at least one embodiment, GPU 3492 includes, without limitation, any number of programmable processing units 3620, a command processor 3610, an L2 cache 3622, memory controllers 3670, DMA engines 3680(1), system memory controllers 3682, DMA engines 3680(2), and GPU controllers 3684. In at least one embodiment, each programmable processing unit 3620 includes, without limitation, a workload manager 3630 and any number of compute units 3640. In at least one embodiment, command processor 3610 reads commands from one or more command queues (not shown) and distributes commands to workload managers 3630. In at least one embodiment, for each programmable processing unit 3620, associated workload manager 3630 distributes work to compute units 3640 included in programmable processing unit 3620. In at least one embodiment, each compute unit 3640 may execute any number of thread blocks, but each thread block executes on a single compute unit 3640. In at least one embodiment, a workgroup is a thread block.

In at least one embodiment, each compute unit 3640 includes, without limitation, any number of SIMD units 3650 and a shared memory 3660. In at least one embodiment, each SIMD unit 3650 implements a SIMD architecture and is configured to perform operations in parallel. In at least one embodiment, each SIMD unit 3650 includes, without limitation, a vector ALU 3652 and a vector register file 3654. In at least one embodiment, each SIMD unit 3650 executes a different warp. In at least one embodiment, a warp is a group of threads (e.g., 16 threads), where each thread in the warp belongs to a single thread block and is configured to process a different set of data based on a single set of instructions. In at least one embodiment, predication can be used to disable one or more threads in a warp. In at least one embodiment, a lane is a thread. In at least one embodiment, a work item is a thread. In at least one embodiment, a wavefront is a warp. In at least one embodiment, different wavefronts in a thread block may synchronize together and communicate via shared memory 3660. In at least one embodiment, compute unit 3640 includes one or more distributed shared memories (or distributed shared memory) that enable direct streaming multiprocessor (SM) to streaming multiple processor (SM) for operations related to loading, storing, and performing atomics across multiple SM shared memory blocks. compute unit 3640 includes one or more cluster distributed shared memories (DSMEM), which are blocks of memory within a cluster that enabled to access each other's shared memory directly.

In at least one embodiment, programmable processing units 3620 are referred to as "shader engines." In at least one embodiment, each programmable processing unit 3620 includes, without limitation, any amount of dedicated graphics hardware in addition to compute units 3640. In at least one embodiment, each programmable processing unit 3620 includes, without limitation, any number (including zero) of geometry processors, any number (including zero) of rasterizers, any number (including zero) of render back ends, workload manager 3630, and any number of compute units 3640.

In at least one embodiment, compute units 3640 share L2 cache 3622. In at least one embodiment, L2 cache 3622 is partitioned. In at least one embodiment, a GPU memory 3690 is accessible by all compute units 3640 in GPU 3492. In at least one embodiment, memory controllers 3670 and system memory controllers 3682 facilitate data transfers between GPU 3492 and a host, and DMA engines 3680(1) enable asynchronous memory transfers between GPU 3492 and such a host. In at least one embodiment, memory controllers 3670 and GPU controllers 3684 facilitate data transfers between GPU 3492 and other GPUs 3492, and DMA engines 3680(2) enable asynchronous memory transfers between GPU 3492 and other GPUs 3492.

In at least one embodiment, GPU 3492 includes, without limitation, any amount and type of system interconnect that facilitates data and control transmissions across any number and type of directly or indirectly linked components that may be internal or external to GPU 3492. In at least one embodiment, GPU 3492 includes, without limitation, any number and type of I/O interfaces (e.g., PCIe) that are coupled to any number and type of peripheral devices. In at least one embodiment, GPU 3492 may include, without limitation, any number (including zero) of display engines and any number (including zero) of multimedia engines. In at least one embodiment, GPU 3492 implements a memory subsystem that includes, without limitation, any amount and type of memory controllers (e.g., memory controllers 3670 and system memory controllers 3682) and memory devices (e.g., shared memories 3660) that may be dedicated to one component or shared among multiple components. In at least one embodiment, GPU 3492 implements a cache subsystem that includes, without limitation, one or more cache memories (e.g., L2 cache 3622) that may each be private to or shared between any number of components (e.g., SIMD units 3650, compute units 3640, and programmable processing units 3620).

In at least one embodiment, at least one component shown or described with respect to FIG. 36 is utilized to implement techniques and/or functions described in connection with FIGS. 1-6. In at least one embodiment, at least one component of FIG. 36 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 36 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 37:
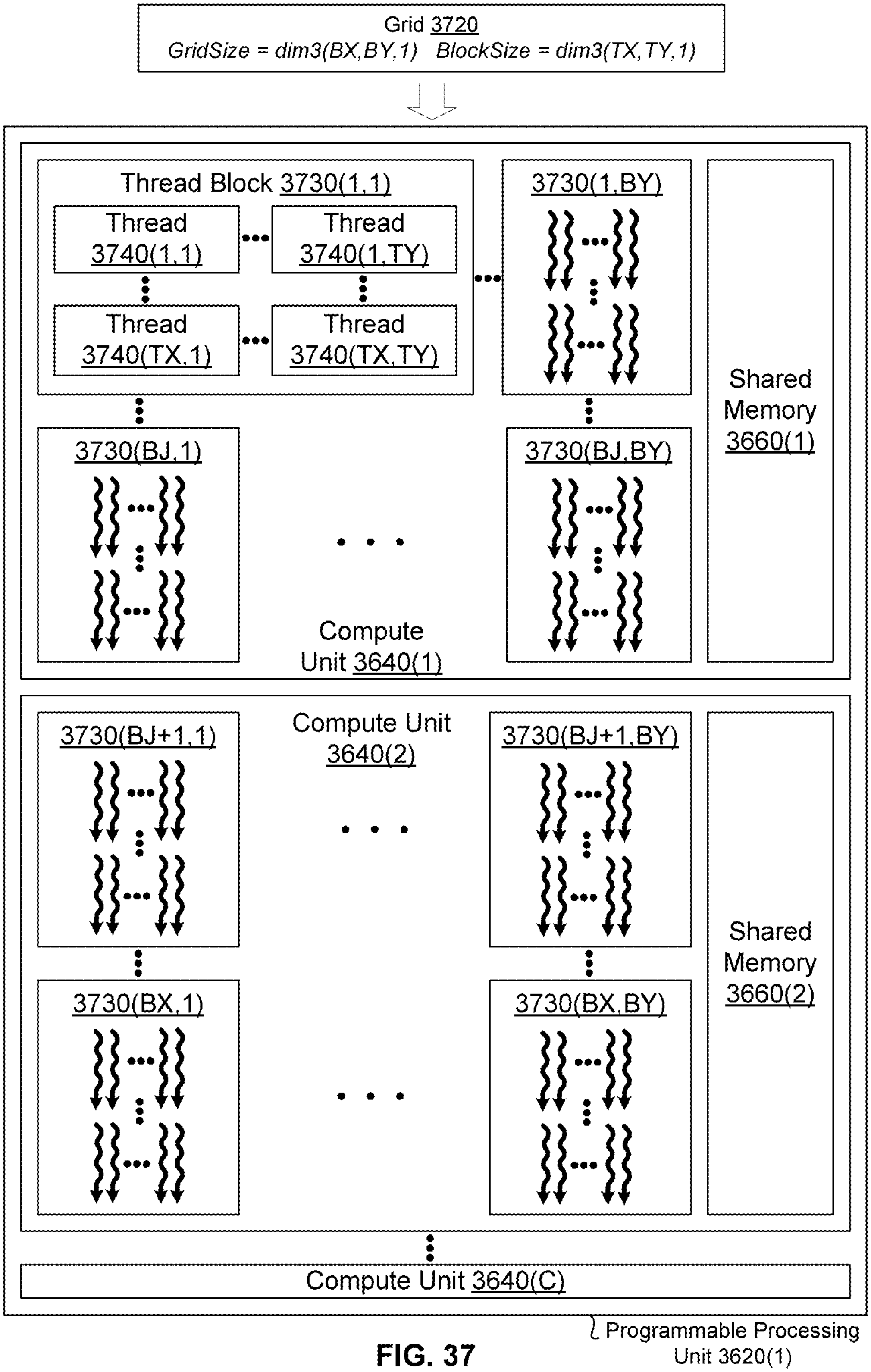
FIG. 37 illustrates how threads of an exemplary CUDA grid are mapped to different compute units of FIG. 36, in accordance with at least one embodiment.

FIG. 37 illustrates how threads of an exemplary CUDA grid 3720 are mapped to different compute units 3640 of FIG. 36, in accordance with at least one embodiment. In at least one embodiment and for explanatory purposes only, grid 3720 has a GridSize of BX by BY by 1 and a BlockSize of TX by TY by 1. In at least one embodiment, grid 3720 therefore includes, without limitation, (BX*BY) thread blocks 3730 and each thread block 3730 includes, without limitation, (TX*TY) threads 3740. Threads 3740 are depicted in FIG. 37 as squiggly arrows.

In at least one embodiment, grid 3720 is mapped to programmable processing unit 3620(1) that includes, without limitation, compute units 3640(1)-3640(C). In at least one embodiment and as shown, (BJ*BY) thread blocks 3730 are mapped to compute unit 3640(1), and the remaining thread blocks 3730 are mapped to compute unit 3640(2). In at least one embodiment, each thread block 3730 may include, without limitation, any number of warps, and each warp is mapped to a different SIMD unit 3650 of FIG. 36.

In at least one embodiment, warps in a given thread block 3730 may synchronize together and communicate through shared memory 3660 included in associated compute unit 3640. For example and in at least one embodiment, warps in thread block 3730(BJ,1) can synchronize together and communicate through shared memory 3660(1). For example and in at least one embodiment, warps in thread block 3730(BJ+1,1) can synchronize together and communicate through shared memory 3660(2).

In at least one embodiment, at least one component shown or described with respect to FIG. 37 is utilized to implement techniques and/or functions described in connection with FIGS. 1-6. In at least one embodiment, at least one component of FIG. 37 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 37 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 38:
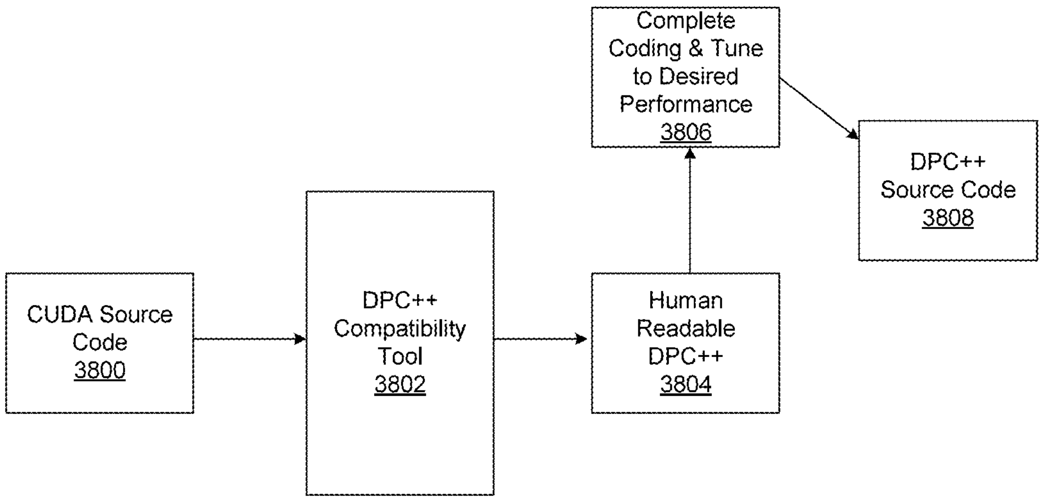
FIG. 38 illustrates how to migrate existing CUDA code to Data Parallel C++ code, in accordance with at least one embodiment.

FIG. 38 illustrates how to migrate existing CUDA code to Data Parallel C++ code, in accordance with at least one embodiment. Data Parallel C++(DPC++) may refer to an open, standards-based alternative to single-architecture proprietary languages that allows developers to reuse code across hardware targets (CPUs and accelerators such as GPUs and FPGAs) and also perform custom tuning for a specific accelerator. DPC++ use similar and/or identical C and C++ constructs in accordance with ISO C++ which developers may be familiar with. DPC++ incorporates standard SYCL from The Khronos Group to support data parallelism and heterogeneous programming. SYCL refers to a cross-platform abstraction layer that builds on underlying concepts, portability and efficiency of OpenCL that enables code for heterogeneous processors to be written in a "single-source" style using standard C++. SYCL may enable single source development where C++ template functions can contain both host and device code to construct complex algorithms that use OpenCL acceleration, and then re-use them throughout their source code on different types of data.

In at least one embodiment, a DPC++ compiler is used to compile DPC++ source code which can be deployed across diverse hardware targets. In at least one embodiment, a DPC++ compiler is used to generate DPC++ applications that can be deployed across diverse hardware targets and a DPC++ compatibility tool can be used to migrate CUDA applications to a multiplatform program in DPC++. In at least one embodiment, a DPC++ base tool kit includes a DPC++ compiler to deploy applications across diverse hardware targets; a DPC++ library to increase productivity and performance across CPUs, GPUs, and FPGAs; a DPC++ compatibility tool to migrate CUDA applications to multiplatform applications; and any suitable combination thereof.

In at least one embodiment, a DPC++ programming model is utilized to simply one or more aspects relating to programming CPUs and accelerators by using modern C++ features to express parallelism with a programming language called Data Parallel C++. DPC++ programming language may be utilized to code reuse for hosts (e.g., a CPU) and accelerators (e.g., a GPU or FPGA) using a single source language, with execution and memory dependencies being clearly communicated. Mappings within DPC++ code can be used to transition an application to run on a hardware or set of hardware devices that best accelerates a workload. A host may be available to simplify development and debugging of device code, even on platforms that do not have an accelerator available.

In at least one embodiment, CUDA source code 3800 is provided as an input to a DPC++ compatibility tool 3802 to generate human readable DPC++ 3804. In at least one embodiment, human readable DPC++ 3804 includes inline comments generated by DPC++ compatibility tool 3802 that guides a developer on how and/or where to modify DPC++ code to complete coding and tuning to desired performance 3806, thereby generating DPC++ source code 3808.

In at least one embodiment, CUDA source code 3800 is or includes a collection of human-readable source code in a CUDA programming language. In at least one embodiment, CUDA source code 3800 is human-readable source code in a CUDA programming language. In at least one embodiment, a CUDA programming language is an extension of the C++ programming language that includes, without limitation, mechanisms to define device code and distinguish between device code and host code. In at least one embodiment, device code is source code that, after compilation, is executable on a device (e.g., GPU or FPGA) and may include or more parallelizable workflows that can be executed on one or more processor cores of a device. In at least one embodiment, a device may be a processor that is optimized for parallel instruction processing, such as CUDA-enabled GPU, GPU, or another GPGPU, etc. In at least one embodiment, host code is source code that, after compilation, is executable on a host. In least one embodiment, some or all of host code and device code can be executed in parallel across a CPU and GPU/FPGA. In at least one embodiment, a host is a processor that is optimized for sequential instruction processing, such as CPU. CUDA source code 3800 described in connection with FIG. 38 may be in accordance with those discussed elsewhere in this document.

In at least one embodiment, DPC++ compatibility tool 3802 refers to an executable tool, program, application, or any other suitable type of tool that is used to facilitate migration of CUDA source code 3800 to DPC++ source code 3808. In at least one embodiment, DPC++ compatibility tool 3802 is a command-line-based code migration tool available as part of a DPC++ tool kit that is used to port existing CUDA sources to DPC++. In at least one embodiment, DPC++ compatibility tool 3802 converts some or all source code of a CUDA application from CUDA to DPC++ and generates a resulting file that is written at least partially in DPC++, referred to as human readable DPC++ 3804. In at least one embodiment, human readable DPC++ 3804 includes comments that are generated by DPC++ compatibility tool 3802 to indicate where user intervention may be necessary. In at least one embodiment, user intervention is necessary when CUDA source code 3800 calls a CUDA API that has no analogous DPC++ API; other examples where user intervention is required are discussed later in greater detail.

In at least one embodiment, a workflow for migrating CUDA source code 3800 (e.g., application or portion thereof) includes creating one or more compilation database files; migrating CUDA to DPC++ using a DPC++ compatibility tool3802; completing migration and verifying correctness, thereby generating DPC++ source code 3808; and compiling DPC++ source code 3808 with a DPC++ compiler to generate a DPC++ application. In at least one embodiment, a compatibility tool provides a utility that intercepts commands used when Makefile executes and stores them in a compilation database file. In at least one embodiment, a file is stored in JSON format. In at least one embodiment, an intercept-built command converts Makefile command to a DPC compatibility command.

In at least one embodiment, intercept-build is a utility script that intercepts a build process to capture compilation options, macro defs, and include paths, and writes this data to a compilation database file. In at least one embodiment, a compilation database file is a JSON file. In at least one embodiment, DPC++ compatibility tool 3802 parses a compilation database and applies options when migrating input sources. In at least one embodiment, use of intercept-build is optional, but highly recommended for Make or CMake based environments. In at least one embodiment, a migration database includes commands, directories, and files: command may include necessary compilation flags; directory may include paths to header files; file may include paths to CUDA files.

In at least one embodiment, DPC++ compatibility tool 3802 migrates CUDA code (e.g., applications) written in CUDA to DPC++ by generating DPC++ wherever possible. In at least one embodiment, DPC++ compatibility tool 3802 is available as part of a tool kit. In at least one embodiment, a DPC++ tool kit includes an intercept-build tool. In at least one embodiment, an intercept-built tool creates a compilation database that captures compilation commands to migrate CUDA files. In at least one embodiment, a compilation database generated by an intercept-built tool is used by DPC++ compatibility tool 3802 to migrate CUDA code to DPC++. In at least one embodiment, non-CUDA C++ code and files are migrated as is. In at least one embodiment, DPC++ compatibility tool 3802 generates human readable DPC++ 3804 which may be DPC++ code that, as generated by DPC++ compatibility tool 3802, cannot be compiled by DPC++ compiler and requires additional plumbing for verifying portions of code that were not migrated correctly, and may involve manual intervention, such as by a developer. In at least one embodiment, DPC++ compatibility tool 3802 provides hints or tools embedded in code to help developers manually migrate additional code that could not be migrated automatically. In at least one embodiment, migration is a one-time activity for a source file, project, or application.

In at least one embodiment, DPC++ compatibility tool 38002 is able to successfully migrate all portions of CUDA code to DPC++ and there may simply be an optional step for manually verifying and tuning performance of DPC++ source code that was generated. In at least one embodiment, DPC++ compatibility tool 3802 directly generates DPC++ source code 3808 which is compiled by a DPC++ compiler without requiring or utilizing human intervention to modify DPC++ code generated by DPC++ compatibility tool 3802. In at least one embodiment, DPC++ compatibility tool generates compile-able DPC++ code which can be optionally tuned by a developer for performance, readability, maintainability, other various considerations; or any combination thereof.

In at least one embodiment, one or more CUDA source files are migrated to DPC++ source files at least partially using DPC++ compatibility tool 3802. In at least one embodiment, CUDA source code includes one or more header files which may include CUDA header files. In at least one embodiment, a CUDA source file includes a <cuda.h> header file and a <stdio.h> header file which can be used to print text. In at least one embodiment, a portion of a vector addition kernel CUDA source file may be written as or related to:

```
#include <cuda.h>
#include <stdio.h>
#define VECTOR_SIZE 256
[ ] global_void VectorAddKernel(float* A, float* B, float* C)
{
    A[threadIdx.x] = threadIdx.x + 1.0f;
    B[threadIdx.x] = threadIdx.x + 1.0f;
    C[threadIdx.x] = A[threadIdx.x] + B[threadIdx.x];
}
int main( )
{
    float *d_A, *d_B, *d_C;
    cudaMalloc(&d_A, VECTOR_SIZE*sizeof(float));
    cudaMalloc(&d_B, VECTOR_SIZE*sizeof(float));
    cudaMalloc(&d_C, VECTOR_SIZE*sizeof(float));
    VectorAddKernel<<<1, VECTOR_SIZE>>>(d_A, d_B, d_C);
    float Result[VECTOR_SIZE] = { };
    cudaMemcpy(Result, d_C, VECTOR_SIZE*sizeof(float),
cudaMemcpyDeviceToHost);
    cudaFree(d_A);
    cudaFree(d_B);
    cudaFree(d_C);
    for (int i=0; i<VECTOR_SIZE; i++ {
      if (i % 16 == 0) {
        printf("\n");
      }
```

-continued

```
        printf("%f ", Result[i]);
    }
    return 0;
}
```

In at least one embodiment and in connection with CUDA source file presented above, DPC++ compatibility tool 3802 parses a CUDA source code and replaces header files with appropriate DPC++ and SYCL header files. In at least one embodiment, DPC++ header files includes helper declarations. In CUDA, there is a concept of a thread ID and correspondingly, in DPC++ or SYCL, for each element there is a local identifier.

In at least one embodiment and in connection with CUDA source file presented above, there are two vectors A and B which are initialized and a vector addition result is put into vector C as part of VectorAddKernel( ). In at least one embodiment, DPC++ compatibility tool 3802 converts CUDA thread IDs used to index work elements to SYCL standard addressing for work elements via a local ID as part of migrating CUDA code to DPC++ code. In at least one embodiment, DPC++ code generated by DPC++ compatibility tool 3802 can be optimized—for example, by reducing dimensionality of an nd_item, thereby increasing memory and/or processor utilization.

In at least one embodiment and in connection with CUDA source file presented above, memory allocation is migrated. In at least one embodiment, cudaMalloc( ) is migrated to a unified shared memory SYCL call malloc_device( ) to which a device and context is passed, relying on SYCL concepts such as platform, device, context, and queue. In at least one embodiment, a SYCL platform can have multiple devices (e.g., host and GPU devices); a device may have multiple queues to which jobs can be submitted; each device may have a context; and a context may have multiple devices and manage shared memory objects.

In at least one embodiment and in connection with CUDA source file presented above, a main( ) function invokes or calls VectorAddKernel( ) to add two vectors A and B together and store result in vector C. In at least one embodiment, CUDA code to invoke VectorAddKernel( ) is replaced by DPC++ code to submit a kernel to a command queue for execution. In at least one embodiment, a command group handler cgh passes data, synchronization, and computation that is submitted to the queue, parallel_for is called for a number of global elements and a number of work items in that work group where VectorAddKernel( ) is called.

In at least one embodiment and in connection with CUDA source file presented above, CUDA calls to copy device memory and then free memory for vectors A, B, and C are migrated to corresponding DPC++ calls. In at least one embodiment, C++ code (e.g., standard ISO C++ code for printing a vector of floating point variables) is migrated as is, without being modified by DPC++ compatibility tool 3802. In at least one embodiment, DPC++ compatibility tool 3802 modify CUDA APIs for memory setup and/or host calls to execute kernel on the acceleration device. In at least one embodiment and in connection with CUDA source file presented above, a corresponding human readable DPC++ 3804 (e.g., which can be compiled) is written as or related to:

```
#include <CL/sycl.hpp>
#include <dpct/dpct.hpp>
#define VECTOR_SIZE 256
void VectorAddKernel(float* A, float* B, float* C,
        sycl::nd_item<3> item_ct1)
{
  A[item_ct1.get_local_id(2)] = item_ct1.get_local_id(2) + 1.0f;
  B[item_ct1.get_local_id(2)] = item_ct1.get_local_id(2) +1.0f;
  C[item_ct1.get_local_id(2)] =
      A[item_ct1.get_local_id(2)] + B[item_ct1.get_local_id(2)];
}
int main( )
{
  float *d_A, *d_B, *d_C;
  d_A = (float *)sycl::malloc_device(VECTOR_SIZE * sizeof(float),
    dpct::get_current_device( ),
    dpct::get_default_context( ));
  d_B = (float *)sycl::malloc_device(VECTOR_SIZE * sizeof(float),
    dpct::get_current_device( ),
    dpct::get_default_context( ));
  d_C = (float *)sycl::malloc_device(VECTOR_SIZE * sizeof(float),
    dpct::get_current_device( ),
    dpct::get_default_context( ));
  dpct::get_default_queue_wait( ).submit([&](sycl::handler &cgh) {
    cgh.parallel_for(
      sycl:nd_range<3>(sycl::range<3>(1, 1, 1) *
          sycl::range<3>(1, 1, VECTOR_SIZE) *
          sycl::range<3>(1, 1, VECTOR_SIZE)),
      [=](sycl::nd_items<3> item_ct1) {
        VectorAddKernel(d_A, d_B, d_C, item_ct1);
      });
  });
  float Result[VECTOR_SIZE] = { };
  dpct::get_default_queue_wait( )
    .memcpy(Result, d_C, VECTOR_SIZE * sizeof(float))
    .wait( );
  sycl::free(d_A, dpct::get_default_context( ));
  sycl::free(d_B, dpct::get_default_context( ));
  sycl::free(d_C, dpct::get_default_context( ));
  for (int i = 0; i<VECTOR_SIZE; i++ {
    if (i % 16 == 0) {
      printf("\n");
    }
    printf("%f ", Result[i]);
  }
  return 0;
}
```

In at least one embodiment, human readable DPC++ 3804 refers to output generated by DPC++ compatibility tool 3802 and may be optimized in one manner or another. In at least one embodiment, human readable DPC++ 3804 generated by DPC++ compatibility tool 3802 can be manually edited by a developer after migration to make it more maintainable, performance, or other considerations. In at least one embodiment, DPC++ code generated by DPC++ compatibility tool 38002 such as DPC++ disclosed can be optimized by removing repeat calls to get_current_device( ) and/or get_default_context( ) for each malloc_device( ) call. In at least one embodiment, DPC++ code generated above uses a 3 dimensional nd_range which can be refactored to use only a single dimension, thereby reducing memory usage. In at least one embodiment, a developer can manually edit DPC++ code generated by DPC++ compatibility tool 3802 replace uses of unified shared memory with accessors. In at least one embodiment, DPC++ compatibility tool 3802 has an option to change how it migrates CUDA code to DPC++ code. In at least one embodiment, DPC++ compatibility tool 3802 is verbose because it is using a general template to migrate CUDA code to DPC++ code that works for a large number of cases.

In at least one embodiment, a CUDA to DPC++ migration workflow includes steps to: prepare for migration using intercept-build script; perform migration of CUDA projects to DPC++ using DPC++ compatibility tool 3802; review and edit migrated source files manually for completion and correctness; and compile final DPC++ code to generate a DPC++ application. In at least one embodiment, manual review of DPC++ source code may be required in one or more scenarios including but not limited to: migrated API does not return error code (CUDA code can return an error code which can then be consumed by the application but SYCL uses exceptions to report errors, and therefore does not use error codes to surface errors); CUDA compute capability dependent logic is not supported by DPC++; statement could not be removed. In at least one embodiment, scenarios in which DPC++ code requires manual intervention may include, without limitation: error code logic replaced with (*,0) code or commented out; equivalent DPC++ API not available; CUDA compute capability-dependent logic; hardware-dependent API (clocko); missing features unsupported API; execution time measurement logic; handling built-in vector type conflicts; migration of cuBLAS API; and more.

In at least one embodiment, one or more techniques described herein utilize a oneAPI programming model. In at least one embodiment, a oneAPI programming model refers to a programming model for interacting with various compute accelerator architectures. In at least one embodiment, oneAPI refers to an application programming interface (API) designed to interact with various compute accelerator architectures. In at least one embodiment, a oneAPI programming model utilizes a DPC++ programming language. In at least one embodiment, a DPC++ programming language refers to a high-level language for data parallel programming productivity. In at least one embodiment, a DPC++ programming language is based at least in part on C and/or C++ programming languages. In at least one embodiment, a oneAPI programming model is a programming model such as those developed by Intel Corporation of Santa Clara, CA.

In at least one embodiment, oneAPI and/or oneAPI programming model is utilized to interact with various accelerator, GPU, processor, and/or variations thereof, architectures. In at least one embodiment, oneAPI includes a set of libraries that implement various functionalities. In at least one embodiment, oneAPI includes at least a oneAPI DPC++ library, a oneAPI math kernel library, a oneAPI data analytics library, a oneAPI deep neural network library, a oneAPI collective communications library, a oneAPI threading building blocks library, a oneAPI video processing library, and/or variations thereof.

In at least one embodiment, a oneAPI DPC++ library, also referred to as oneDPL, is a library that implements algorithms and functions to accelerate DPC++ kernel programming. In at least one embodiment, oneDPL implements one or more standard template library (STL) functions. In at least one embodiment, oneDPL implements one or more parallel STL functions. In at least one embodiment, oneDPL provides a set of library classes and functions such as parallel algorithms, iterators, function object classes, range-based API, and/or variations thereof. In at least one embodiment, oneDPL implements one or more classes and/or functions of a C++ standard library. In at least one embodiment, oneDPL implements one or more random number generator functions.

In at least one embodiment, a oneAPI math kernel library, also referred to as oneMKL, is a library that implements various optimized and parallelized routines for various mathematical functions and/or operations. In at least one embodiment, oneMKL implements one or more basic linear algebra subprograms (BLAS) and/or linear algebra package (LAPACK) dense linear algebra routines. In at least one embodiment, oneMKL implements one or more sparse BLAS linear algebra routines. In at least one embodiment, oneMKL implements one or more random number generators (RNGs). In at least one embodiment, oneMKL implements one or more vector mathematics (VM) routines for mathematical operations on vectors. In at least one embodiment, oneMKL implements one or more Fast Fourier Transform (FFT) functions.

In at least one embodiment, a oneAPI data analytics library, also referred to as oneDAL, is a library that implements various data analysis applications and distributed computations. In at least one embodiment, oneDAL implements various algorithms for preprocessing, transformation, analysis, modeling, validation, and decision making for data analytics, in batch, online, and distributed processing modes of computation. In at least one embodiment, oneDAL implements various C++ and/or Java APIs and various connectors to one or more data sources. In at least one embodiment, oneDAL implements DPC++ API extensions to a traditional C++ interface and enables GPU usage for various algorithms.

In at least one embodiment, a oneAPI deep neural network library, also referred to as oneDNN, is a library that implements various deep learning functions. In at least one embodiment, oneDNN implements various neural network, machine learning, and deep learning functions, algorithms, and/or variations thereof.

In at least one embodiment, a oneAPI collective communications library, also referred to as oneCCL, is a library that implements various applications for deep learning and machine learning workloads. In at least one embodiment, oneCCL is built upon lower-level communication middleware, such as message passing interface (MPI) and libfabrics. In at least one embodiment, oneCCL enables a set of deep learning specific optimizations, such as prioritization, persistent operations, out of order executions, and/or variations thereof. In at least one embodiment, oneCCL implements various CPU and GPU functions.

In at least one embodiment, a oneAPI threading building blocks library, also referred to as oneTBB, is a library that implements various parallelized processes for various applications. In at least one embodiment, oneTBB is utilized for task-based, shared parallel programming on a host. In at least one embodiment, oneTBB implements generic parallel algorithms. In at least one embodiment, oneTBB implements concurrent containers. In at least one embodiment, oneTBB implements a scalable memory allocator. In at least one embodiment, oneTBB implements a work-stealing task scheduler. In at least one embodiment, oneTBB implements low-level synchronization primitives. In at least one embodiment, oneTBB is compiler-independent and usable on various processors, such as GPUs, PPUs, CPUs, and/or variations thereof.

In at least one embodiment, a oneAPI video processing library, also referred to as oneVPL, is a library that is utilized for accelerating video processing in one or more applications. In at least one embodiment, oneVPL implements various video decoding, encoding, and processing functions. In at least one embodiment, oneVPL implements various functions for media pipelines on CPUs, GPUs, and other accelerators. In at least one embodiment, oneVPL implements device discovery and selection in media centric and video analytics workloads. In at least one embodiment, oneVPL implements API primitives for zero-copy buffer sharing.

In at least one embodiment, a oneAPI programming model utilizes a DPC++ programming language. In at least one embodiment, a DPC++ programming language is a programming language that includes, without limitation, functionally similar versions of CUDA mechanisms to define device code and distinguish between device code and host code. In at least one embodiment, a DPC++ programming language may include a subset of functionality of a CUDA programming language. In at least one embodiment, one or more CUDA programming model operations are performed using a oneAPI programming model using a DPC++ programming language.

In at least one embodiment, at least one component shown or described with respect to FIG. 38 is utilized to implement techniques and/or functions described in connection with FIGS. 1-6. In at least one embodiment, at least one component of FIG. 38 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 38 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

Figure 39:
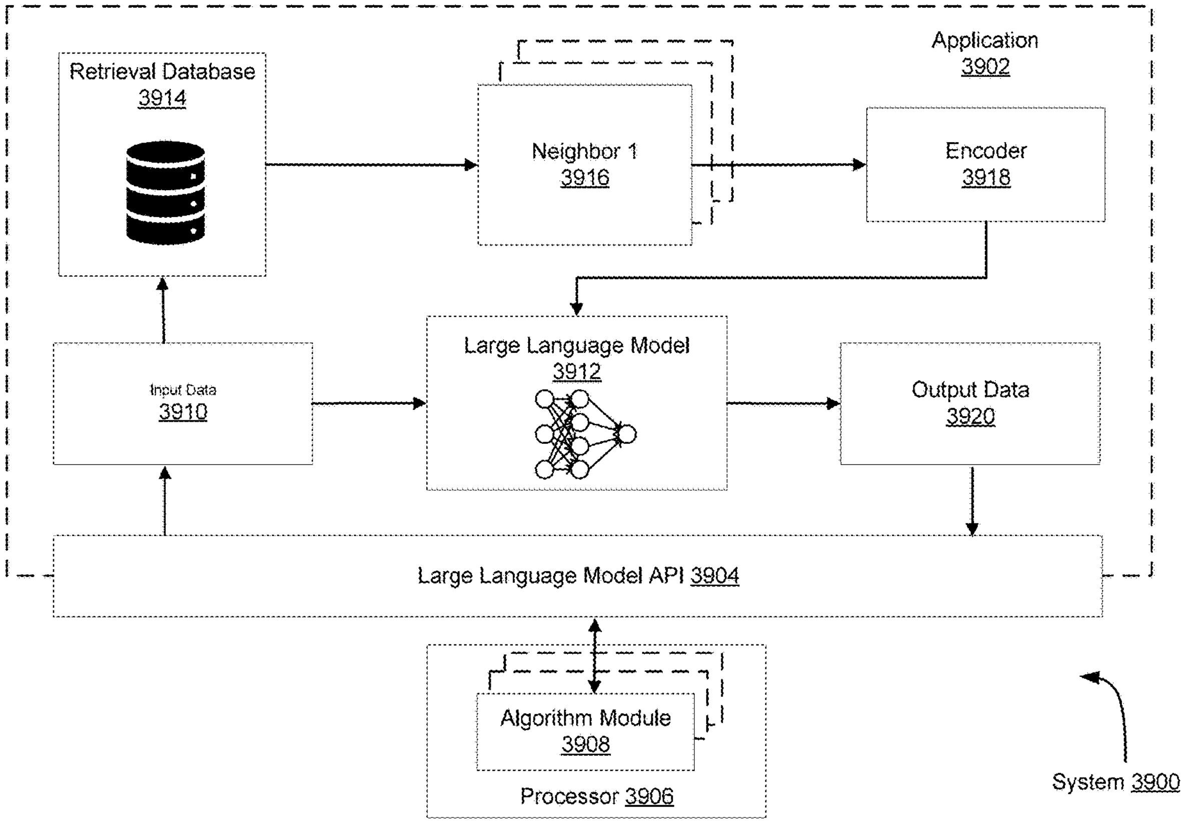
FIG. 39 illustrates components of a system to access a large language model, according to at least one embodiment.

FIG. 39 is a system diagram illustrating system 3900 for interfacing with an application 3902 to process data, according to at least one embodiment. In at least one embodiment, application 3902 uses large language model (LLM) 3912 to generate output data 3920 based, at least in part, on input data 3910. In at least one embodiment, input data 3910 is a text prompt. In at least one embodiment, input data 3910 includes unstructured text. In at least one embodiment, input data 3910 includes a sequence of tokens. In at least one embodiment, a token is a portion of input data. In at least one embodiment, a token is a word. In at least one embodiment, a token is a character. In at least one embodiment, a token is a subword. In at least one embodiment, input data 3910 is formatted in Chat Markup Language (ChatML). In at least one embodiment, input data 3910 is an image. In at least one embodiment, input data 3910 is one or more video frames. In at least one embodiment, input data 3910 is any other expressive medium.

In at least one embodiment, large language model 3912 comprises a deep neural network. In at least one embodiment, a deep neural network is a neural network with two or more layers. In at least one embodiment, large language model 3912 comprises a transformer model. In at least one embodiment, large language model 3912 comprises a neural network configured to perform natural language processing. In at least one embodiment, large language model 3912 is configured to process one or more sequences of data. In at least one embodiment, large language model 3912 is configured to process text. In at least one embodiment, weights and biases of a large language model 3912 are configured to process text. In at least one embodiment, large language model 3912 is configured to determine patterns in data to perform one or more natural language processing tasks. In at least one embodiment, a natural language processing task comprises text generation. In at least one embodiment, a natural language processing task comprises question answering. In at least one embodiment, performing a natural language processing task results in output data 3920.

In at least one embodiment, a processor uses input data 3910 to query retrieval database 3914. In at least one embodiment, retrieval database 3914 is a key-value store. In at least one embodiment, retrieval database 3914 is a corpus used to train large language model 3912. In at least one embodiment, a processor uses retrieval database 3914 to provide large language model 3912 with updated information. In at least one embodiment, retrieval database 3914 comprises data from an internet source. In at least one embodiment, large language model 3912 does not use retrieval database 3914 to perform inferencing.

In at least one embodiment, an encoder encodes input data 3910 into one or more feature vectors. In at least one embodiment, an encoder encodes input data 3910 into a sentence embedding vector. In at least one embodiment, a processor uses said sentencing embedding vector to perform a nearest neighbor search to generate one or more neighbors 3916. In at least one embodiment, one or more neighbors 3916 is value in retrieval database 3914 corresponding to a key comprising input data 3910. In at least one embodiment, one or more neighbors 3916 comprise text data. In at least one embodiment, encoder 3918 encodes one or more neighbors 3916. In at least one embodiment, encoder 3918 encodes one or more neighbors 3916 into a text embedding vector. In at least one embodiment, encoder 3918 encodes one or more neighbors 3916 into a sentence embedding vector. In at least one embodiment, large language model 3916 uses input data 3910 and data generated by encoder 3918 to generate output data 3920. In at least one embodiment, processor 3906 interfaces with application 3902 using large language model (LLM) application programming interface(s) (API(s)) 3904. In at least one embodiment, processor 3906 accesses large language model 3916 using large language model (LLM) application programming interface(s) (API(s)) 3904.

In at least one embodiment, output data 3920 comprise computer instructions. In at least one embodiment, output data 3920 comprise instructions written in CUDA programming language. In at least one embodiment, output data 3920 comprise instructions to be performed by processor 3906. In at least one embodiment, output data 3920 comprise instructions to control execution of one or more algorithm modules 3908. In at least one embodiment, one or more algorithm modules 3908 comprise, for example, one or more neural networks to perform pattern recognition. In at least one embodiment, one or more algorithm modules 3908 comprise, for example, one or more neural networks to perform frame generation. In at least one embodiment, one or more algorithm modules 3908 comprise, for example, one or more neural networks to generate a drive path. In at least one embodiment, one or more algorithm modules 3908 comprise, for example, one or more neural networks to generate a 5G signal. In at least one embodiment, processor 3906 interfaces with application 3902 using large language model (LLM) application programming interface(s) (API(s)) 3904. In at least one embodiment, processor 3906 may use one or more parallel computing platforms and/or programming models (e.g., NVIDIA's CUDA model).

In at least one embodiment, aspects of systems and techniques described herein in relation to FIG. 39 are incorporated into aspects of preceding figure(s). In at least one embodiment, for example, an apparatus depicted in preceding figure(s) includes processor 3906.

In at least one embodiment, for example, system 3900 uses ChatGPT to write CUDA code. In at least one embodiment, for example, system 3900 uses ChatGPT to train an object classification neural network. In at least one embodiment, for example, system 3900 uses ChatGPT and a neural network to identify a driving path. In at least one embodiment, for example, system 3900 uses ChatGPT and a neural network to generate a 5G signal.

In at least one embodiment, at least one component shown or described with respect to FIG. 39 is utilized to implement techniques and/or functions described in connection with FIGS. 1-6. In at least one embodiment, at least one component of FIG. 39 is used to cause one or more first threads performed by one or more processors to update one or more semaphores accessible to one or more second threads performed by one or more second processors, based, at least in part, on one or more dependencies between said one or more first threads and said one or more second threads. In at least one embodiment, at least one component of FIG. 39 performs at least one aspect described with respect to process 100 of FIG. 1, adapter 202A, adapter 202B, processor(s) 204A, processor(s) 204B, thread(s) 106A, thread(s) 206B, channel progress counter 208, and/or cross-adapter monitor counter 210 of FIG. 2, system 300 of FIG. 3, process 400 of FIG. 4, process 500 of FIG. 5, and/or processor 600 of FIG. 6.

It should be noted that, while example embodiments described herein may relate to a CUDA programming model, techniques described herein can be utilized with any suitable programming model, such HIP, oneAPI (e.g., using oneAPI-based programming to perform or implement a method disclosed herein), and/or variations thereof.

In at least one embodiment, one or more components of systems and/or processors disclosed above can communicate with one or more CPUs, ASICs, GPUs, FPGAs, or other hardware, circuitry, or integrated circuit components that include, e.g., an upscaler or upsampler to upscale an image, an image blender or image blender component to blend, mix, or add images together, a sampler to sample an image (e.g., as part of a DSP), a neural network circuit that is configured to perform an upscaler to upscale an image (e.g., from a low resolution image to a high resolution image), or other hardware to modify or generate an image, frame, or video to adjust its resolution, size, or pixels; one or more components of systems and/or processors disclosed above can use components described in this disclosure to perform methods, operations, or instructions that generate or modify an image.

At least one embodiment of the disclosure can be described in view of the following clauses:

1. A processor, comprising: one or more circuits to cause one or more first threads performed by the processor to update one or more semaphores accessible to one or more second threads performed by one or more second processors, based, at least in part, on one or more dependencies between the one or more first threads and the one or more second threads.
2. The processor of clause 1, wherein the one or more dependencies are based at least in part on a graph.
3. The processor of clause 1 or 2, wherein the one or more first threads are to use direct memory access to store the one or more semaphores in a memory accessible to the one or more second threads.
4. The processor of clauses 1-3, wherein the one or more first threads are associated with a first display adapter and the one or more second threads are associated with a second display adapter.
5. The processor of clauses 1-4, wherein the one or more first threads store the one or more semaphores in a memory accessible to another of the one or more first threads.
6. The processor of clauses 1-5, wherein the one or more circuits further cause the one or more second threads to: access the one or more semaphores; detect a change in the one or more semaphores; and in response to detecting the change in the one or more semaphores, perform an operation.
7. The processor of clauses 1-6, wherein the one or more semaphores accessible to the one or more second threads are stored in one or more storage locations of the one or more second processors.
8. A system comprising: one or more processors to cause one or more first threads performed by the one or more processors to update one or more semaphores accessible to one or more second threads performed by one or more second processors, based, at least in part, on one or more dependencies between the one or more first threads and the one or more second threads.
9. The system of clause 8, wherein the one or more dependencies are based at least in part on a graph.
10. The system of clauses 8 or 9, wherein the one or more first threads are to use direct memory access to store the one or more semaphores in a memory accessible to the one or more second threads.
11. The system of clauses 8-10, wherein the one or more first threads are associated with a first display adapter and the one or more second threads are associated with a second display adapter.
12. The system of clauses 8-11, wherein the one or more first threads store the one or more semaphores in a memory accessible to another of the one or more first threads.
13. The system of clauses 8-12, wherein the one or more processors are further to cause the one or more second threads to: access the one or more semaphores; detect a change in the one or more semaphores; and in response to detecting the change in the one or more semaphores, perform an operation.
14. The system of clauses 8-13, wherein the one or more semaphores accessible to the one or more second threads are stored in one or more storage locations of the one or more second processors.
15. A method comprising: causing one or more first threads performed by one or more processors to update one or more semaphores accessible to one or more second threads performed by one or more second processors, based, at least in part, on one or more dependencies between the one or more first threads and the one or more second threads.
16. The method of clause 15, wherein the one or more dependencies are based at least in part on a graph.
17. The method of clauses 15 or 16, wherein the one or more first threads are to use direct memory access to store the one or more semaphores in a memory accessible to the one or more second threads.
18. The method of clauses 15-17, wherein the one or more first threads are associated with a first display adapter and the one or more second threads are associated with a second display adapter.
19. The method of clauses 15-18, wherein the one or more first threads store the one or more semaphores in a memory accessible to another of the one or more first threads.

20. The method of clauses 15-19, further comprising causing the one or more second threads to: access the one or more semaphores; detect a change in the one or more semaphores; and in response to detecting the change in the one or more semaphores, perform an operation.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). A number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In at least one embodiment, an arithmetic logic unit is a set of combinational logic circuitry that takes one or more inputs to produce a result. In at least one embodiment, an arithmetic logic unit is used by a processor to implement mathematical operation such as addition, subtraction, or multiplication. In at least one embodiment, an arithmetic logic unit is used to implement logical operations such as logical AND/OR or XOR. In at least one embodiment, an arithmetic logic unit is stateless, and made from physical switching components such as semiconductor transistors arranged to form logical gates. In at least one embodiment, an arithmetic logic unit may operate internally as a stateful logic circuit with an associated clock. In at least one embodiment, an arithmetic logic unit may be constructed as an asynchronous logic circuit with an internal state not maintained in an associated register set. In at least one embodiment, an arithmetic logic unit is used by a processor to combine operands stored in one or more registers of the processor and produce an output that can be stored by the processor in another register or a memory location.

In at least one embodiment, as a result of processing an instruction retrieved by the processor, the processor presents one or more inputs or operands to an arithmetic logic unit, causing the arithmetic logic unit to produce a result based at least in part on an instruction code provided to inputs of the arithmetic logic unit. In at least one embodiment, the instruction codes provided by the processor to the ALU are based at least in part on the instruction executed by the processor. In at least one embodiment combinational logic in the ALU processes the inputs and produces an output which is placed on a bus within the processor. In at least one embodiment, the processor selects a destination register, memory location, output device, or output storage location on the output bus so that clocking the processor causes the results produced by the ALU to be sent to the desired location.

In present document, references may be made to obtaining, acquiring, receiving, or inputting analog or digital data into a subsystem, computer system, or computer-implemented machine. Process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. One or more processors, comprising:

circuitry to:

identify one or more cross-adapter dependencies between one or more first threads performed by the one or more processors and one or more second threads performed by one or more second processors, and cause the one or more first threads, in response to completion of work of the one or more first threads and based, at least in part, on the one or more cross-adapter dependencies, to update one or more semaphores accessible to the one or more second threads.

2. The one or more processors of claim 1, wherein the one or more cross-adapter dependencies are to be identified based, at least in part, on one or more graphs corresponding to the one or more first threads and the one or more second threads.

3. The one or more processors of claim 1, wherein the one or more first threads are to use direct memory access to store the one or more semaphores in a memory accessible to the one or more second threads.

4. The one or more processors of claim 1, wherein the one or more first threads are associated with a first display adapter and the one or more second threads are associated with a second display adapter.

5. The one or more processors of claim 1, wherein the one or more first threads store the one or more semaphores in a memory accessible to another thread performed by the one or more processors.

6. The one or more processors of claim 1, wherein the circuitry further causes the one or more second threads to:

access the one or more semaphores;

detect a change in the one or more semaphores; and in response to detecting the change in the one or more semaphores, perform an operation.

7. The one or more processors of claim 1, wherein the one or more semaphores accessible to the one or more second threads are stored in one or more storage locations of the one or more second processors.

8. A system comprising:

one or more processors to:

identify one or more cross-adapter dependencies between one or more first threads performed by the one or more processors and one or more second threads performed by one or more second processors, and cause the one or more first threads, in response to completion of work of the one or more first threads and based, at least in part, on the one or more cross-adapter dependencies, to update one or more semaphores accessible to the one or more second threads.

9. The system of claim 8, wherein the one or more cross-adapter dependencies are to be identified based, at least in part, on one or more graphs corresponding to the one or more first threads and the one or more second threads.

10. The system of claim 8, wherein the one or more first threads are to use direct memory access to store the one or more semaphores in a memory accessible to the one or more second threads.

11. The system of claim 8, wherein the one or more first threads are associated with a first display adapter and the one or more second threads are associated with a second display adapter.

12. The system of claim 8, wherein the one or more first threads store the one or more semaphores in a memory accessible to another thread performed by the one or more processors.

13. The system of claim 8, wherein the one or more processors are further to cause the one or more second threads to:

access the one or more semaphores;

detect a change in the one or more semaphores; and in response to detecting the change in the one or more semaphores, perform an operation.

14. The system of claim 8, wherein the one or more semaphores accessible to the one or more second threads are stored in one or more storage locations of the one or more second processors.

15. A method comprising:

identifying one or more cross-adapter dependencies between one or more first threads performed by one or more processors and one or more second threads performed by one or more second processors, and causing the one or more first threads, in response to completion of work of the one or more first threads and based, at least in part, on the one or more cross-adapter dependencies, to update one or more semaphores accessible to the one or more second threads.

16. The method of claim 15, wherein the one or more cross-adapter dependencies are to be identified based, at least in part, on one or more graphs corresponding to the one or more first threads and the one or more second threads.

17. The method of claim 15, wherein the one or more first threads are to use direct memory access to store the one or more semaphores in a memory accessible to the one or more second threads.

18. The method of claim 15, wherein the one or more first threads are associated with a first display adapter and the one or more second threads are associated with a second display adapter.

19. The method of claim 15, wherein the one or more first threads store the one or more semaphores in a memory accessible to another thread performed by the one or more processors.

20. The method of claim 15, further comprising causing the one or more second threads to:

access the one or more semaphores;

detect a change in the one or more semaphores; and in response to detecting the change in the one or more semaphores, perform an operation.

* * * * *